(12) United States Patent
Sull et al.

(10) Patent No.: US 7,548,565 B2
(45) Date of Patent: Jun. 16, 2009

(54) METHOD AND APPARATUS FOR FAST METADATA GENERATION, DELIVERY AND ACCESS FOR LIVE BROADCAST PROGRAM

(75) Inventors: Sanghoon Sull, Seoul (KR); Hyeokman Kim, Seoul (KR); Ja-Cheon Yoon, Seoul (KR); Min Gyo Chung, SungNam (KR)

(73) Assignee: VMark, Inc., Palo Alto, CA (US)

( * ) Notice: Subject to any disclaimer, the term of this patent is extended or adjusted under 35 U.S.C. 154(b) by 1027 days.

(21) Appl. No.: 10/369,333

(22) Filed: Feb. 19, 2003

(65) Prior Publication Data

US 2003/0177503 A1    Sep. 18, 2003

Related U.S. Application Data

(63) Continuation-in-part of application No. 09/911,293, filed on Jul. 23, 2001, and a continuation-in-part of application No. PCT/US01/23631, filed on Jul. 23, 2001.

(60) Provisional application No. 60/221,394, filed on Jul. 24, 2000, provisional application No. 60/221,843, filed on Jul. 28, 2000, provisional application No. 60/222,373, filed on Jul. 31, 2000, provisional application No. 60/271,908, filed on Feb. 27, 2001, provisional application No. 60/291,728, filed on May 17, 2001.

(51) Int. Cl.
| | |
|---|---|
| *H04J 3/06* | (2006.01) |
| *H04L 7/00* | (2006.01) |
| *G06F 3/00* | (2006.01) |
| *H04J 3/04* | (2006.01) |
| *H04N 7/173* | (2006.01) |
| *H04N 7/16* | (2006.01) |

(52) U.S. Cl. .................. 370/503; 370/535; 725/39; 725/100; 725/110; 725/111; 725/131; 725/151; 375/354; 715/721

(58) Field of Classification Search ............... 370/503, 370/535; 725/39, 100, 105, 110, 111, 131, 725/151; 375/354; 715/721
See application file for complete search history.

(56) References Cited

U.S. PATENT DOCUMENTS 5,892,536 A    4/1999  Logan et al. ............... 348/13

(Continued)

FOREIGN PATENT DOCUMENTS

EP    1142340 B1 *   7/2003

(Continued)

OTHER PUBLICATIONS

Bretl-Fimoff, MPEG 2 Tutorial Introduction and Contents, Jan. 15, 2000, http://www.bretl.com/mpeghtml/ATSCPSIP.HTM.*

(Continued)

*Primary Examiner*—Hoang-Vu A Nguyen-Ba
(74) *Attorney, Agent, or Firm*—Jones Day; Edward L. Pencoske

(57) ABSTRACT

Techniques for fast indexing of live video broadcasts are provided which incorporate both efficient manual processing and automatic indexing steps to generate semantically meaningful and practically usable highlight hierarchy of broadcast television programs in real-time. In one technique, a list of predefined keywords is provided, describing the highlights, and the manual marking process can be implemented by just a few mouse clicks. A technique is provided for grouping highlights into a semantic hierarchy in real-time. A technique is provided for efficiently generating highlight metadata on live broadcast programs, using a coarse-to-fine indexing methodology in order for a operator to quickly generate highlight summaries of live broadcast programs.

21 Claims, 32 Drawing Sheets

U.S. PATENT DOCUMENTS

| | | | | |
|---|---|---|---|---|
| 5,982,370 | A | | 11/1999 | Kamper ..................... 345/356 |
| 5,986,692 | A | | 11/1999 | Logan et al. .................. 348/13 |
| 6,065,050 | A | * | 5/2000 | DeMoney .................. 709/219 |
| 6,199,076 | B1 | * | 3/2001 | Logan et al. ............. 715/501.1 |
| 6,278,446 | B1 | | 8/2001 | Liou et al. .................. 345/328 |
| 6,357,042 | B2 | | 3/2002 | Srinivasan et al. ............ 725/32 |
| 6,360,234 | B2 | | 3/2002 | Jain et al. ................ 707/500.1 |
| 6,381,278 | B1 | | 4/2002 | Shin et al. ............. 375/240.16 |
| 6,426,778 | B1 | * | 7/2002 | Valdez, Jr. ................. 348/461 |
| 6,549,245 | B1 | | 4/2003 | Lee ........................... 348/700 |
| 6,754,437 | B1 | * | 6/2004 | Hirai et al. .................... 386/83 |
| 2001/0014210 | A1 | | 8/2001 | Kang .......................... 386/96 |
| 2002/0120925 | A1 | | 8/2002 | Logan .......................... 725/9 |
| 2002/0194607 | A1 | * | 12/2002 | Connelly .................... 725/87 |
| 2003/0078930 | A1 | * | 4/2003 | Surcouf et al. ............... 707/10 |
| 2003/0093790 | A1 | * | 5/2003 | Logan et al. ................. 725/38 |

FOREIGN PATENT DOCUMENTS

| | | |
|---|---|---|
| KR | 1999-013419 | 2/1999 |
| KR | 20010014443 | 2/2001 |
| KR | 10-0313713 | 10/2001 |
| KR | 2003-0070480 | 8/2003 |

OTHER PUBLICATIONS

MPEG Tutorial—Introduction and Contents, Jan. 15, 2000, http://www.bretl.com/mpeghtml/MPEGindex.htm.*

ATSC and PSIP, Jan. 15, 2000, http://www.bretl.com/mpeghtml/ATSCPSIP.HTM.*

Babaguchi et al., Event Based Indexing of Broadcasted Sports Video by Intermodal Collaboration, Mar. 2002, IEEE Transactions on Multimedia, vol. 4, No. 1.*

An efficient graphical shot verifier incorporating visual rhythm, by H. Kim, J. Lee and S. M. Song, Proceedings of IEEE International Conference on Multimedia Computing and Systems, pp. 827-834, Jun. 1999.

"Visual rhythm and shot verification", H. Kim, et al., Multimedia Tools and Applications, Kluwer Academic Publishers, vol. 15, No. 3 (2001).

Synchronizing Applications and Media, http://www.mhp-interactive.org/tutorial/synchronization.html.

"myTV: a practical implementation of TV-Anytime on DVB and the Internet", McParland, et al., BBC R&D White Paper, WHP 020, Jan. 2002, pp. 1-11. www.bbc.co.uk/rd/pubs/whp/whp-pdf-files/WHP020.pdf.

* cited by examiner

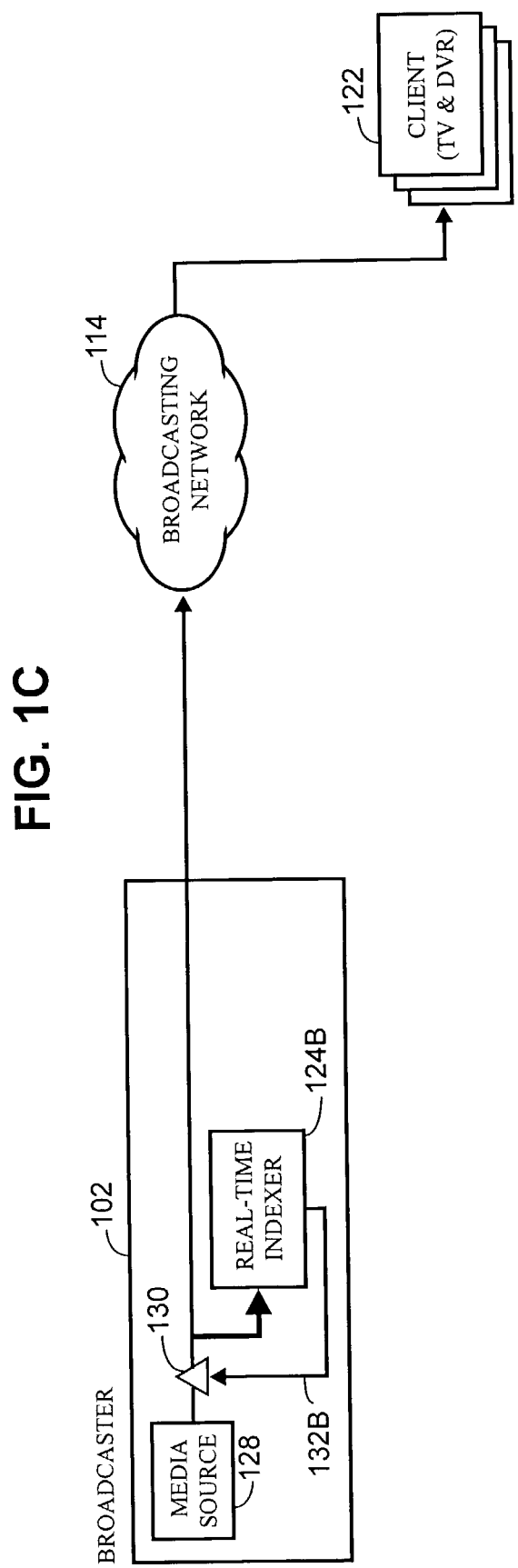

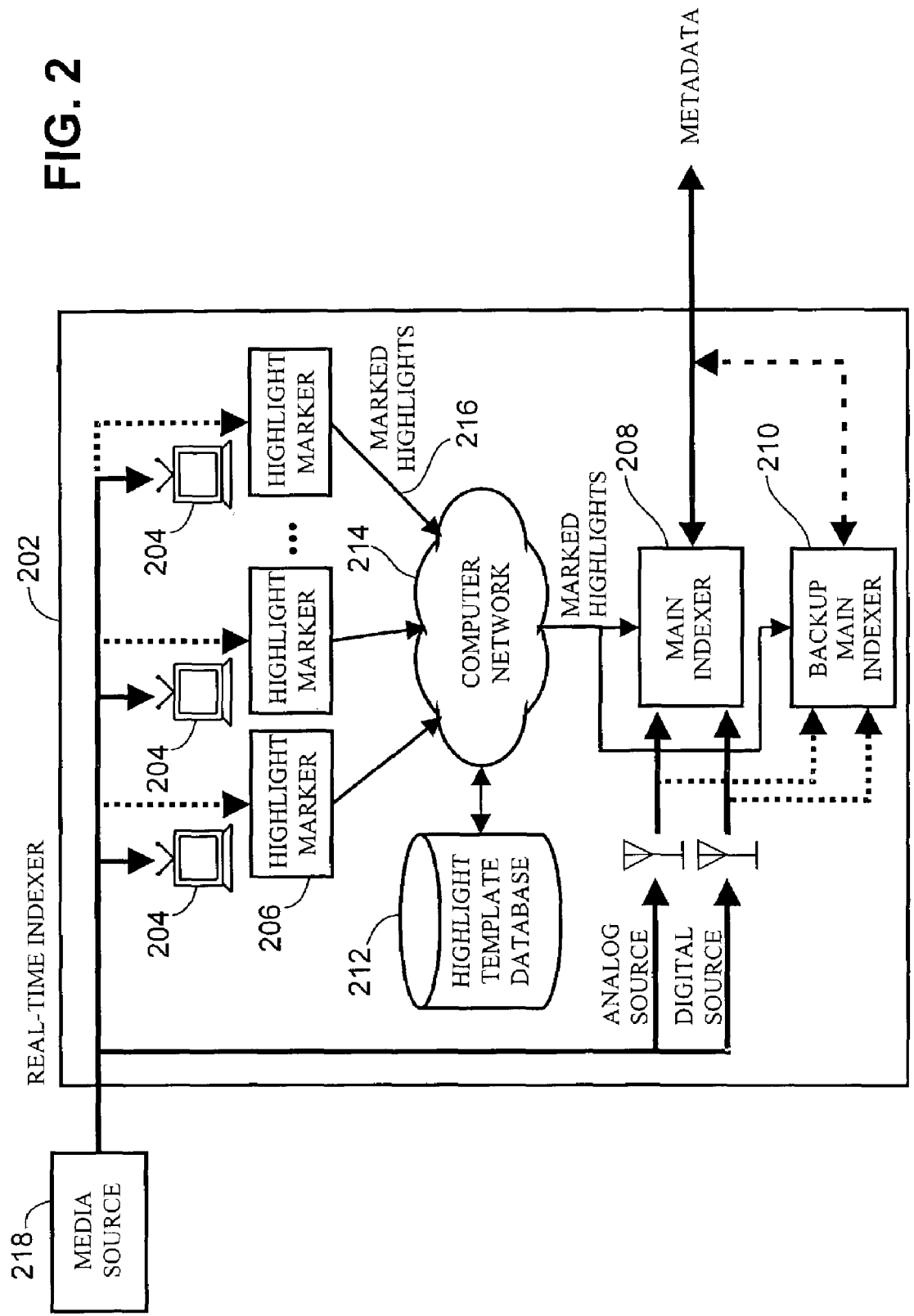

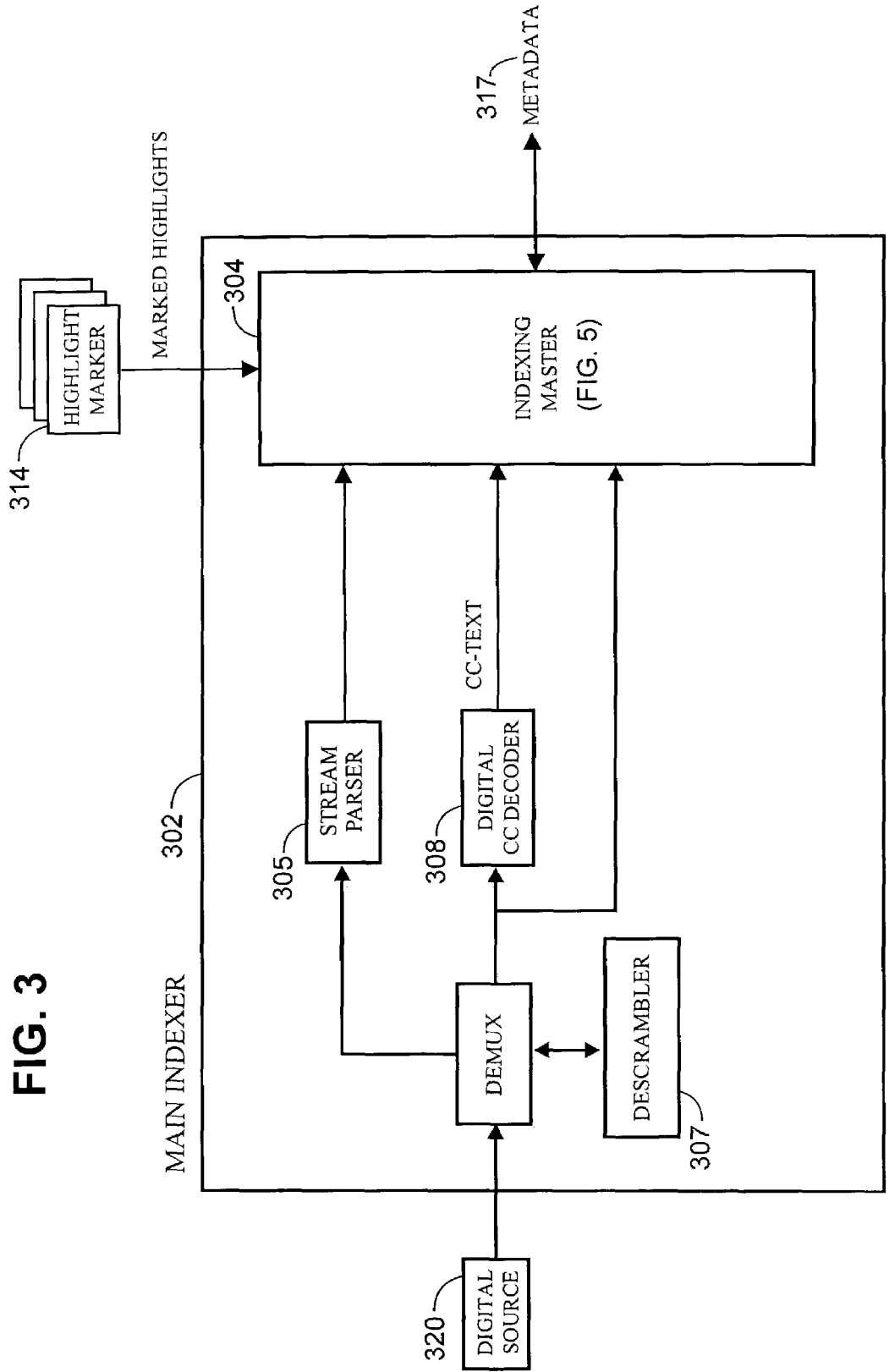

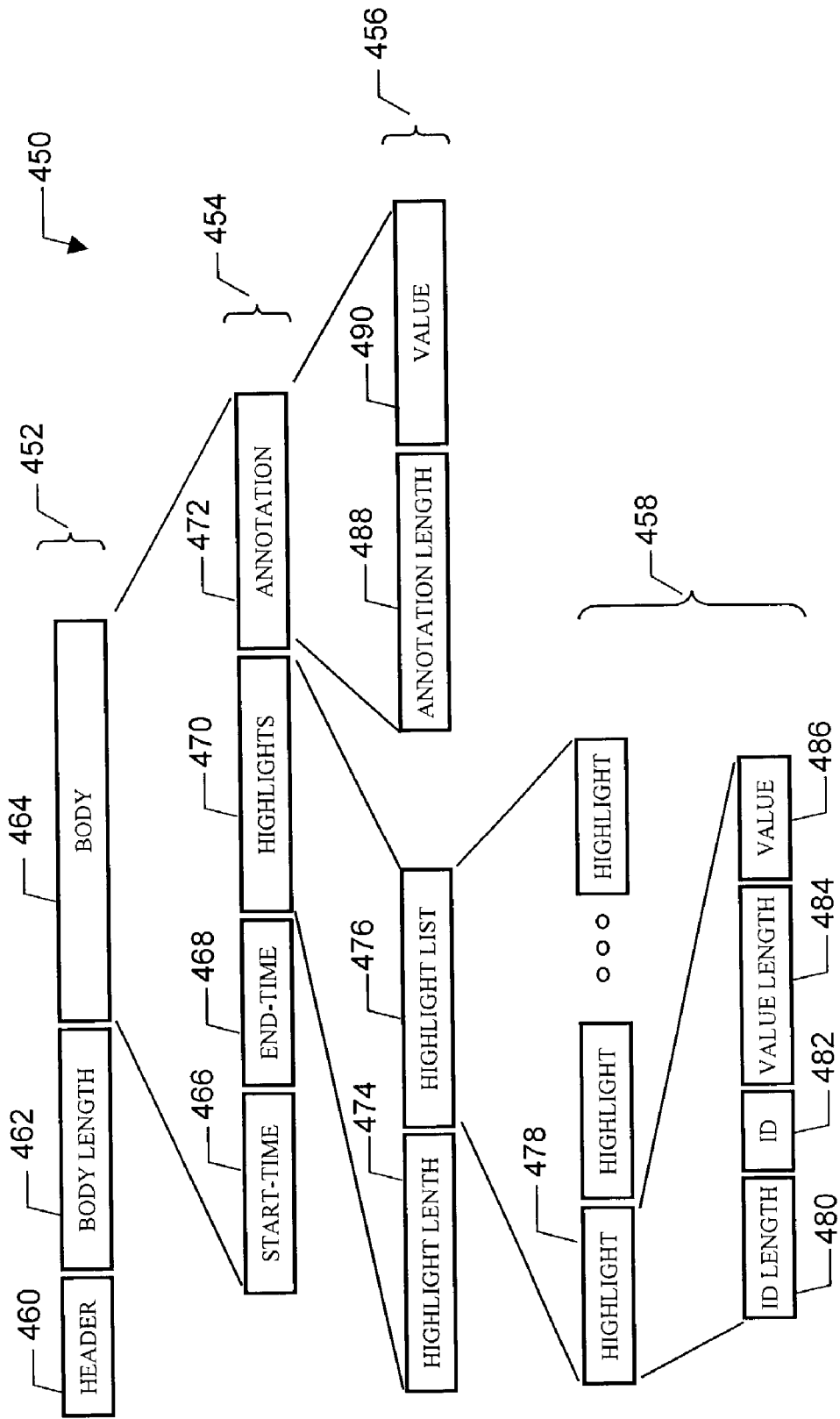

| TIME₁ | Byte Position₁ |
|---|---|
| TIME₂ | Byte Position₂ |
| TIME₃ | Byte Position₃ |

| TIMEₙ | Byte Positionₙ |
|---|---|

1820 / 1810

METHOD AND APPARATUS FOR FAST METADATA GENERATION, DELIVERY AND ACCESS FOR LIVE BROADCAST PROGRAM

CROSS-REFERENCE TO RELATED APPLICATIONS

This is a continuation-in-part of U.S. patent application Ser. No. 09/911,293 filed Jul. 23, 2001 (published as US2002/0069218A1 on Jun. 6, 2002) by Sull, et al., which is a non-provisional of:

provisional application No. 60/221,394 filed Jul. 24, 2000;
provisional application No. 60/221,843 filed Jul. 28, 2000;
provisional application No. 60/222,373 filed Jul. 31, 2000;
provisional application No. 60/271,908 filed Feb. 27, 2001; and
provisional application No. 60/291,728 filed May 17, 2001.

This is a continuation-in-part of PCT Patent Application No. PCT/US01/23631 filed Jul. 23, 2001 (published as WO 02/08948 A2 on Jan. 31, 2002).

TECHNICAL FIELD OF THE INVENTION

The invention relates to the processing of video signals, and more particularly to techniques for video indexing and browsing.

BACKGROUND OF THE INVENTION

Recently, digital set-top boxes (STBs) with local storage called digital video recorder (DVR) begin to penetrate TV households. With this new consumer device, television viewers can record broadcast programs into the local storage of their DVR in a digital video compression format such as MPEG-2. A DVR allows television viewers to watch programs in the way they want and when they want. Due to the nature of digitally recorded video, viewers now have the capability of directly accessing to a certain point of recorded programs in addition to the traditional video cassette recorder (VCR) controls such as fast forward and rewind. Furthermore, if segmentation metadata for a recorded program is available, viewers can browse the program by selecting some of predefined video segments within the recorded program and play highlights as well as summary of the recorded program. The metadata of the recorded program can be delivered to DVR by television broadcasters or third-party service providers. The delivered metadata can be stored in a local storage of DVR for later use by viewers. The metadata can be described in proprietary formats or in international open standard specifications such as MPEG-7 or TV-Anytime.

To provide DVR users with advanced features such as browsing of recorded TV programs, it is needed to develop a cost-effective method for efficiently indexing TV broadcast programs, delivering metadata to STB and efficient random accessing to sub-parts of the recorded programs in DVR.

Real-Time Indexing TV Programs

Consider a scenario, called "quick metadata service" on live broadcasting, where descriptive metadata of a broadcast program is also delivered to a DVR while the program is being recorded. In case of live broadcasting of sports games such as football, television viewers might want to selectively view highlight events of a game as well as plays of their favorite players while watching the live game. Without the metadata describing the program, it is not easy for viewers to locate the video segments corresponding to the highlight events or objects (players in case of sports games) by using the conventional controls such as fast forwarding. The metadata includes time positions such as start time positions, duration and textual descriptions for each video segment corresponding to semantically meaningful highlight events or objects. If the metadata is generated in real-time and incrementally delivered to viewers at a predefined interval or whenever new highlight event or object occurs, the metadata can then be stored at the local storage of DVR for more informative and interactive TV viewing experience such as the navigation of content by highlight events or objects. The metadata can also be delivered just one time immediately after its corresponding broadcast television program has finished.

One of the key components for the quick metadata service is a real-time indexing of broadcast television programs. Various methods have been proposed for real-time video indexing.

U.S. Pat. No. 6,278,446 ("Liou"), the entire disclosure of which is incorporated by reference herein, discloses a system for interactively indexing and browsing video with easy-to-use interfaces. Specifically, Liou teaches automatic indexing in conjunction with human interactions for verification and correction provides a meaningful video table of contents.

U.S. Pat. No. 6,360,234 ("Jain"), the entire disclosure of which is incorporated by reference herein, discloses a video cataloger system and method for capturing and indexing video in real-time or non-real time, and publishing intelligent video via the World Wide Web. In parallel to the indexing process, the system of Jain allows users to navigate through the video by using the index to go directly to the exact point of interest, rather than streaming it from start to finish.

The conventional methods can generate low-level metadata in real-time by decoding closed-caption texts, detecting and clustering shots, selecting key frames, recognizing faces or speech all of which are automatically performed and synchronized with video. However, with the current state-of-art technologies on image understanding and speech recognition, it is very difficult to accurately detect highlights and generate semantically meaningful and practically usable highlight summary of events or objects in real-time. That is, the conventional methods do not provide semantically meaningful and practically usable metadata in real-time or even in non real-time for the following reasons:

First, as described earlier, it is hard to automatically recognize diverse semantically meaningful highlights. For example, a keyword "touchdown" can be identified from decoded closed-caption texts in order to automatically find touchdown highlights, resulting in many false alarms. Therefore, generating semantically meaningful and practically usable highlights will still require the intervention of a human operator.

Second, the conventional methods do not provide an efficient way for manually marking distinguished highlights in real-time. Consider a case when a series of highlights occurs at short intervals. Since it takes time for a human operator to type in a title and extra textual description of a new highlight, there might be a possibility to miss the immediately following events.

The media localization within a given temporal video stream can be described using either the byte location information or the media time information that specifies a time point that is contained in media data. In other words, in order to describe the location of a specific video frame within a video stream, a byte offset, i.e. the number of bytes to be skipped from the beginning of the video stream can be used.

Alternatively, a media time describing a relative time point from the beginning of the video stream can be used.

In U.S. Pat. No. 6,360,234 ("Jain"), to access a certain position of an encoded video stream, the relative time from the beginning of the encoded video stream file is used. In the case of a VOD (Video On Demand) through interactive Internet or high-speed network, the start and end positions of each video program can be defined unambiguously in terms of media time as zero and the length of the video program, respectively, since each program is stored in the form of a separate media file in the storage at the head end and, further, each video program is delivered through streaming on each client's demand. Thus, a user at the client side can gain access to the appropriate temporal positions or video frames within the selected video stream as described in the metadata. However, in the case of TV broadcasting, since a digital stream or analog signal is continuously broadcast, the start and end positions of each broadcast program are not clearly defined. Since a media time or byte offset are usually defined with reference to the start of a media file, it could be ambiguous to describe a specific temporal location of a broadcast program using media times or byte offsets in order to relate an interactive application or event, and access to a specific location within a video program.

U.S. Pat. No. 6,357,042 ("Anand"), the entire disclosure of which is incorporated by reference herein, discloses that an authoring system for interactive video has two or more authoring stations for providing authored metadata to be related to a main video data stream and a multiplexer for relating authored metadata from the authoring sources to the main video data stream. Specifically, Anand uses the PTS (Presentation Time Stamp) of video frames when the authoring stations annotate created metadata from main video, and the multiplexer relates the metadata to the main video stream. Thus, Anand uses a value of PTS for random access to a specific position of media stream.

The PTS is a field that may be present in a PES (Packetized Elementary Stream in defined in MPEG-2) packet header that indicates the time that a presentation unit is presented in the system target decoder. However, the use of PTS values is not appropriate especially for digitally broadcast media streams, because it requires parsing of PES layers, and thus it is computationally more expensive. Further, for scrambled broadcast media streams, it is necessary to descramble them in order to access to PESs that contains PTSs. The MPEG-2 System specification describes a scrambling mode of the transport stream (TS) packet payload containing PES where the payload shall be scrambled but the TS packet header, and the adaptation field, when present, shall not be scrambled. Thus, if a broadcast media stream is scrambled, the descrambling is needed to access the PTS located in TS payload.

The Multimedia Home Platform (MHP) defines a generic interface between interactive digital applications and the terminals on which those applications execute. According to http://www.mhp-interactive.org/tutorial/synchroniza-tion.html, the association of an application with a specific TV show requires synchronization of the behavior of the application to the action on screen. Since there is no real concept of media time for a broadcast MPEG-2 stream, MHP uses DSM-CC Normal Play Time (NPT) that is a time code embedded in a special descriptor in an MPEG-2 private section, and provides a known time reference for a piece of media. Although NPT values typically increase throughout a single piece of media if they are present, they may have discontinuities either forwards or backwards. Thus, even if a stream containing NPT is edited (either to be made shorter, or to have advertisements inserted) then NPT values will not need updating and will remain the same for that piece of media. However, one of the issues on the use of NPT values is whether it is being broadcast.

"A practical implementation of TV-Anytime on DVB (Digital Video Broadcasting) and the Internet" in www.bbc-.co.uk/rd/pubs/whp/whp-pdf-files/WHP020.pdf describes a segmentation scenario allowing a service provider to refer to different sub-parts of programs. The segmentation allows that segments in TV-Anytime metadata reference sub-parts of the program by time on an unambiguous, continuous time-line defined for the program. Thus, it was proposed that MPEG-2 DSM-CC NPT (Normal Playtime) should be for these time lines. It is required that both head ends and receiving terminal can handle NPT accurately.

U.S. patent application Publication. Pub. No. US 2001/0014210 A1 ("Kang"), the entire disclosure of which is incorporated by reference herein, discloses a personal TV with improved functions. Specifically, Kang, by using synchronized encoding and indexing allows users to intelligently navigate through the video by using the index to go directly to the exact point of interest, rather than streaming it from start to finish. Kang suggests the use of byte offset values of group of pictures (GOP: A GOP serves as a basic access unit, with an I-picture serving as an entry point to facilitate random access) for media localization. However, to generate an offset table that contains media times and their byte offset values of the corresponding GOPs, it would be computationally expensive to parse into the video PES in order to compute the values of GOP offset. Further, the process of descrambling is needed when a recorded media stream is scrambled. Alternatively, Kang specifies that GOP offset values can be transmitted. Kang's system generates an index file by capturing and analyzing the stream before the stream is input to the MPEG-2 stream transmitter in a broadcast system. It is required to install Kang's system at the location that is tightly connected to the broadcast system. Thus, the cost of Kang's scheme could be expensive and further it is a sensitive issue for the third parties to freely access the stream inside a broadcast system.

U.S. Pat. No. 5,986,692 ("Logan '692"), the entire disclosure of which is incorporated by reference herein, discloses a scheme for computer enhanced broadcast monitoring. A time stamp signal is generated at time-spaced intervals to be used a time-based index for broadcast signal.

U.S. Application 2002/0120925A1 ("Logan '925") the entire disclosure of which is incorporated by reference herein, discloses a system for utilizing metadata created either at a central station or at each user's location. Logan '925 focuses on the automatic generation of metadata. In case of DVRs for analog broadcasting such as from Tivo and ReplayTV, the analog broadcast signal is digitized and then encoded in MPEG-2 and then the encoded stream is stored in the STB storage. The broadcast analog TV signal such NTSC (National Television Standards Committee) does not contain time information such as PTS and broadcasting time. Thus, for analog broadcasting, it is not obvious to devise a method for efficiently indexing analog TV broadcast programs based on an appropriate time line, delivering metadata to DVRs and random accessing to the specific positions of media streams described in the metadata in DVRs. In case of DVRs for digital broadcasting, it is still difficult to devise an efficient time-based index for video stream localization to be used both in indexer and DVR clients.

As such, there still remains a need of a system and method that provides cost-effective and efficient indexing, delivery of metadata and accessing to recorded media streams in DVRs for digital TV broadcast programs as well as analog TV broadcast programs.

GLOSSARY

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used in the description contained herein:

| | |
|---|---|
| API | Application Program Interface |
| ASF | Advanced Streaming Format. |
| ATSC | Advanced Television Systems Committee |
| CC-text | closed-caption text |
| codec | enCOder/DECoder |
| DAC | digital-to-analog converter |
| DVB | Digital Video Broadcasting Project |
| DVR | Digital Video Recorder |
| EPG | Electronic Program(ming) Guide |
| GUI | Graphical User Interface |
| IP | Internet Protocol |
| keyframe | also key frame, key frame, keyframe image. a single, still image derived from a video program comprising a plurality of images. |
| MHP | Multimedia Home Platform, a standard interface between interactive digital applications and the terminals |
| MPEG | Motion Pictures Expert Group, a standards organization dedicated primarily to digital motion picture encoding |
| MPEG-2 | an encoding standard for digital television (officially designated as ISO/IEC 13818, in 9 parts) |
| MPEG-4 | an encoding standard for multimedia applications (officially designated as ISO/IEC 14496, in 6 parts) |
| MPEG-7 | the content representation standard for information search (officially designated as ISO/IEC 15938) |
| NTP | Network Time Protocol |
| PCR | program clock reference |
| PES | Packetized Elementary Stream |
| PSTN | Public Switched Telephone Network |
| PTS | presentation time stamp |
| STB | set top box |
| TCP/IP | Transmission Control Protocol/Internet Protocol. This is the suite of protocols that defines the Internet. Originally designed for the UNIX operating system, TCP/IP software is now available for every major kind of computer operating system. To be truly on the Internet, your computer must have TCP/IP software. |
| TS | transport stream |
| TV | television |
| TV-Anytime | The global TV-Anytime Forum is an association of organizations which seeks to develop specifications to enable audio-visual and other services based on mass-market high volume digital storage in consumer platforms - simply referred to as local storage. |
| Visual Rhythm | (also VR) The visual rhythm of a video is a single image, that is, a two-dimensional abstraction of the entire three-dimensional content of the video constructed by sampling certain group of pixels of each image sequence and temporally accumulating the samples along time. |
| XML | eXtensible Markup Language |

BRIEF DESCRIPTION (SUMMARY) OF THE INVENTION

It is therefore a general object of the invention to provide a cost-effective method and apparatus for efficiently indexing TV broadcast programs, delivering metadata to STB and efficient random accessing to sub-parts of the recorded programs in DVR.

According to the invention, techniques are provided for providing metadata service, particularly for a system efficiently delivering metadata generated from indexer to users.

According to the invention, an improved technique is provided for video indexing, particularly for live broadcasts (real-time), operating largely automatically with minimal human intervention (manual work).

The invention can be utilized for indexing audio programs, as well. As used herein, "audio/video" program includes audio and/or video program.

According to the invention, techniques are provided for real-time video indexing based on an operator's interactive cooperation to generate semantically meaningful and practically usable summaries of highlight events or objects.

According to the invention, techniques are provided which incorporate both efficient manual processing and automatic indexing steps to generate semantically meaningful and practically usable highlight hierarchy of broadcast television programs in real-time.

According to the invention, a technique is provided for marking the time positions corresponding to highlight video segments so that the marked position can be revisited later for more detailed indexing. To reduce the time of manual work, a list of predefined keywords is provided, describing the highlights. The manual marking process can be implemented by just a few mouse clicks. It can be combined with the existing automatic indexing process. In contrast with the present invention, conventional real-time indexing methods do not provide this kind of simple human interaction.

According to the invention, a technique is provided for grouping highlights into a semantic hierarchy in real-time. In football (American version) games, there are lots of highlight themes such as "touchdown", "field goal", "extra point", "two point conversion", "long run", "long pass", "intercept", "holding", "offside", "unsportsmanlike conduct", etc. The first four events can (for example) be categorized as "scoring", and the others as "feature plays". The "scoring" category can also have a subcategory titled "point after" which always follows a "touchdown". The "point after" subcategory consists of "extra point" and "two point conversion". With the list of categorized highlight themes, the marked highlights can be automatically grouped into a predefined semantic hierarchy in real-time just by manual but simple examination of the highlight themes attached to each marked highlight. In the browsing interface of DVR, television viewers can then navigate through the list of categorized highlight themes and selectively watch highlights of their favorite themes. In contrast with the present invention, with a flat list of uncategorized highlight themes, it is very hard to generate this kind of semantic hierarchy in real time.

In an embodiment of the invention, a real-time indexer includes:
  a highlight template database for providing various lists of categorized highlight themes for diverse program contents or genre,
  highlight markers for manually marking highlights in real-time, and
  a main indexer for automatically indexing video with minimal manual work if needed and automatically organizing hierarchical highlight summary in real time.

According to a feature of the invention, a real-time indexing method implements a cooperative process between a main indexer and highlight markers by utilizing a highlight template database. The highlight marker is mainly responsible for quickly marking the positions corresponding to highlights of interests whereas a detailed description for each marked highlight is generated in the main indexer.

According to an aspect of the invention, a technique is provided for efficiently generating highlight metadata on live broadcast programs. More particularly, the technique provides a coarse-to-fine indexing methodology in order for an operator to quickly generate highlight summaries of live broadcast programs.

According to an aspect of the invention, the real-time highlight generation scheme proceeds as a two-step process including coarse indexing and fine indexing. For coarse indexing, the highlight marker marks a moment (or time point) of a desired highlight, and attaches to the marked highlight relevant highlight themes which are selected by the operator from a highlight template. The marked highlight which is captured is then delivered to the main indexer. For fine indexing, the main indexer then turns the marked highlight into a complete one by associating it with a time interval and attaching a detailed description to the captured highlight. During the fine indexing step, the association of time interval is done by automatic shot detection and clustering, and the textual description is attached by using decoded closed-caption texts with the detected shots. The result from fine indexing automatically done at the main indexer is further refined by manual adjustment of interval and additional annotations. After the refined description of a new highlight is generated, the main indexer inserts it into appropriate positions of a highlight hierarchy corresponding to the highlight template used.

According to an aspect of the invention, a technique is provided for video highlight browsing methods on TV screen through the use of a simple graphical user interface (GUI).

According to another aspect of the invention, a graphical user interface (GUI) is provided for the highlight marker that supports the effective and efficient capturing of interesting highlights in real-time. The GUI simultaneously visualizes (displays) the status of five major components:

list of highlight event themes, list of highlight object themes, list of captured highlights, panel of control buttons, and text input area.

The operator initially selects an appropriate template from a highlight template database and loads it into the highlight marker, for example, a football template from a variety of templates of sports games. The categorized highlight themes of events and objects of the selected template are displayed as the lists of highlight event and object themes respectively. All of the marked highlights are shown under the list of captured highlights. A time position of a highlight is stored by clicking a mark-in button in the panel of control buttons when the operator finds an interesting highlight while watching a broadcast television program on a TV. After marking the new highlight, the operator then selects the appropriate highlight themes. At this point, the operator might want to add detailed explanation of the new highlight. The highlight marker does not require any extra hardware such as a video codec or a capture board. It can run at a master computer where the main indexer is running, or at a separate computer connected to the master computer via computer networks. Also, any number of the highlight markers can be connected to the main indexer, thus cooperating with it simultaneously. With the simple and intuitive GUI, anyone who has a TV and a computer connected to the network can easily operate the highlight marker.

The highlight marker is a practical and economic implementation of capturing highlights which are semantically meaningful.

Further according to the invention, a system is provided for quick metadata services on live broadcasting. The system comprises the real-time indexer, metadata delivery channel and DVR clients. The real-time indexer generates metadata for a new highlight by cooperative coarse-to-fine indexing between the highlight markers and the main indexer, and stores it to the appropriate highlight hierarchy. The metadata is then delivered to DVRs directly through a back channel or to a broadcaster who multiplexes the metadata into a broadcast stream. The metadata can be delivered regularly, whenever the metadata is updated, or at the end of its corresponding broadcast program. The delivered metadata can also contain only newly added highlights or all available highlights in its entirety.

In another embodiment of the invention, a GUI is provided which supports the very simple and easy browsing of the highlight hierarchy interactively for DVR users having only a remote controller. The GUI is displayed on a TV screen connected to a DVR. The GUI visualizes (displays) the status of five major components: a view of main menu, a view of secondary menu, a view of highlights, a view of broadcast program, and a view of key frame. The view of main menu provides a list of menu items corresponding to the highlight categories defined in a highlight template. If a DVR user selects a menu item, its secondary menu appears on the view of secondary menu. The view of secondary menu provides a list of submenu items corresponding to the highlight subcategories of the selected menu or category defined in the same highlight template. After a submenu item is selected, a list of highlights that belong to the selected submenu item appears on the view of highlights while the two views of main and secondary menus disappearing. When a user selects a highlight, the GUI will disappear and the selected highlight will be played on the whole TV screen. When the GUI appears on the screen, the current broadcast video is still being played at the view of broadcast program, and a key frame image of the current main/submenu or highlight is displayed at the view of key frame. The GUI may be controlled by only six buttons on a DVR remote controller: a metadata button, four direction buttons pointing to up, down, left and right respectively, and a play button which is usually located at the center of the four direction buttons. When the metadata button is pressed, the GUI appears on TV screen instead of the broadcast program. If the metadata button is pressed again, the GUI disappears and the broadcast program is shown up again in the whole screen. The metadata button acts as a toggle. The four direction buttons are used for navigating main/submenu items and highlights. The play button is used for playing a selected highlight.

Further according to the invention, concerning metadata service, a method and system is provided for using broadcasting time, if present, as a reference time or time-based index of a program to localize a specific position of a broadcast video stream. First, a method and system is disclosed how to acquire the broadcasting time that is local time in a local broadcasting area. For digital broadcast stream, an indexer and DVRs utilize a broadcasting time that is frequently broadcast. For the analog broadcast signal, an indexer and DVRs utilize a time stamp that is synchronized with a remote time-server through NTP (Network Time Protocol), for example. Second, a method and system is disclosed for associating broadcasting time with broadcast signal by using artificial pattern generator that contains broadcasting time, channel number and other information.

Further according to the invention, a method and system is provided for fast accessing the position of recorded streams in DVRs by using a byte-offset table containing the information on the byte-offset positions of the recorded stream corresponding to broadcasting times.

Further according to the invention, a method and system is provided for frame-accurately accessing a temporal position or frame of a recorded video, pointed by a time-index contained in the metadata.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings (figures). The drawings are intended to be illustrative, not limiting, and it should be understood that it is not intended to limit the invention to the illustrated embodiments.

Elements of the figures are typically (but not necessarily) numbered as follows. The most significant digits (hundreds) of the reference number correspond to the figure number. For example, elements of FIG. 1 are typically numbered in the range of 100-199, and elements of FIG. 2 are typically numbered in the range of 200-299, and so forth. Similar elements throughout the figures may be referred to by similar reference numerals. For example, the element 199 in FIG. 1 may be similar (and, in some cases identical) to the element 299 in FIG. 2. Throughout the figures, each of a plurality of similar elements 199 may be referred to individually as 199*a*, 199*b*, 199*c*, etc. Such relationships, if any, between similar elements in the same or different figures will become apparent throughout the specification, including, if applicable, in the claims and abstract.

Light shading (cross-hatching) may be employed to help the reader distinguish between different ones of similar elements (e.g., adjacent pixels), or different portions of blocks.

Grayscale may be employed in views of television images, or in visual rhythm images of video streams. Line drawings may be included which can be substituted for these grayscale images.

The structure, operation, and advantages of the present preferred embodiment of the invention will become further apparent upon consideration of the following description taken in conjunction with the accompanying figures.

FIGS. 1A, 1B, 1C, 1D are block diagrams illustrating overall schemes for quick metadata service on live broadcasting where media content, such as in the form of MPEG-2 transport streams and its descriptive metadata, are delivered in real-time to a viewer with a set-top box client having DVR capability, according to the invention.

FIG. 2 is a block diagram of an embodiment of a real-time indexer, according to the invention.

FIG. 3 is a block diagram of an exemplary configuration of a main indexer that includes an indexing master as well as various hardware devices to deal with digital video source, according to the invention.

Figure 3A:
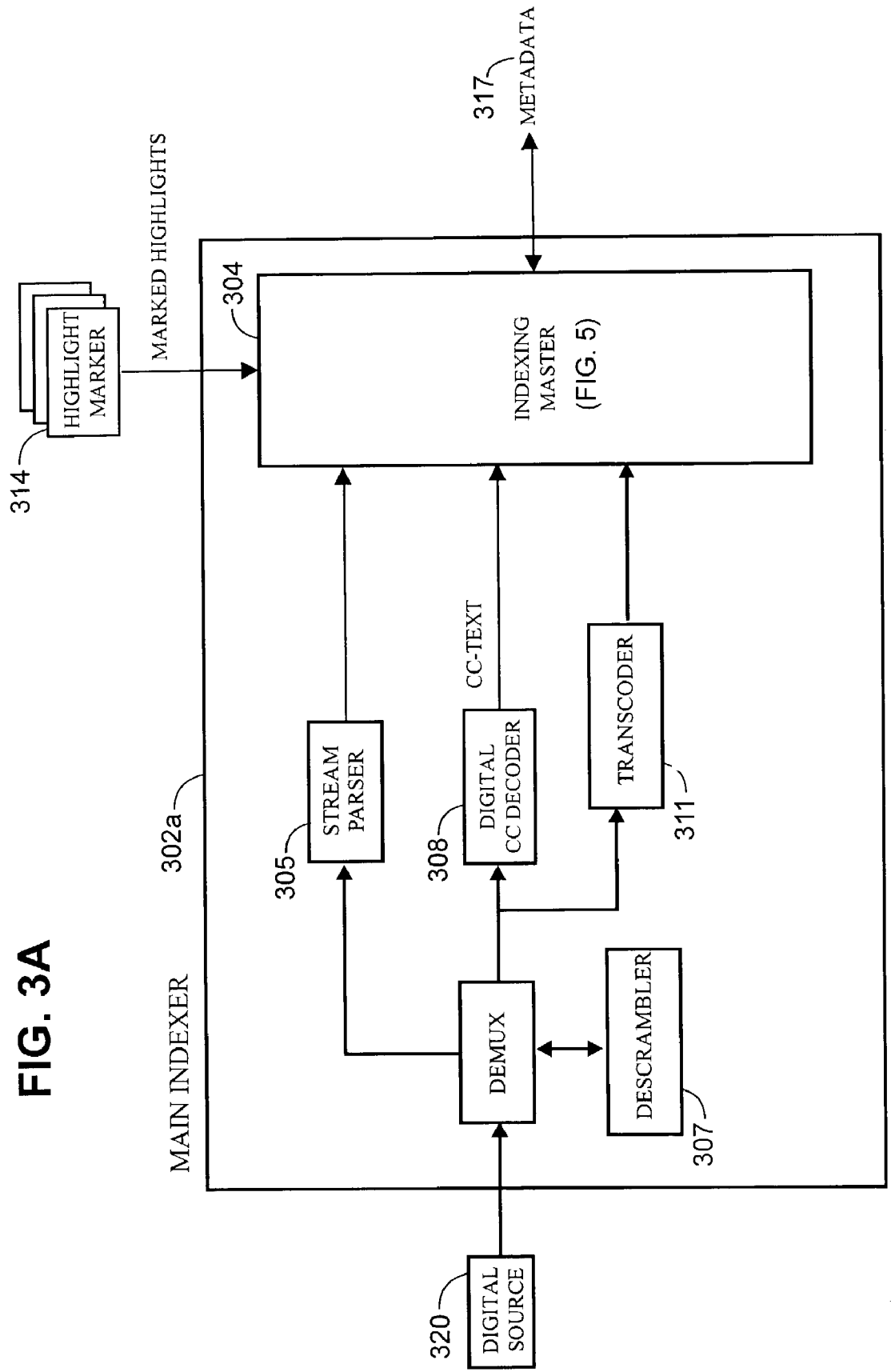

FIG. 3A is a block diagram of another exemplary configuration of a main indexer that includes an indexing master and a transcoder as well as various hardware devices to deal with digital video source, according to the invention.

Figure 3B:
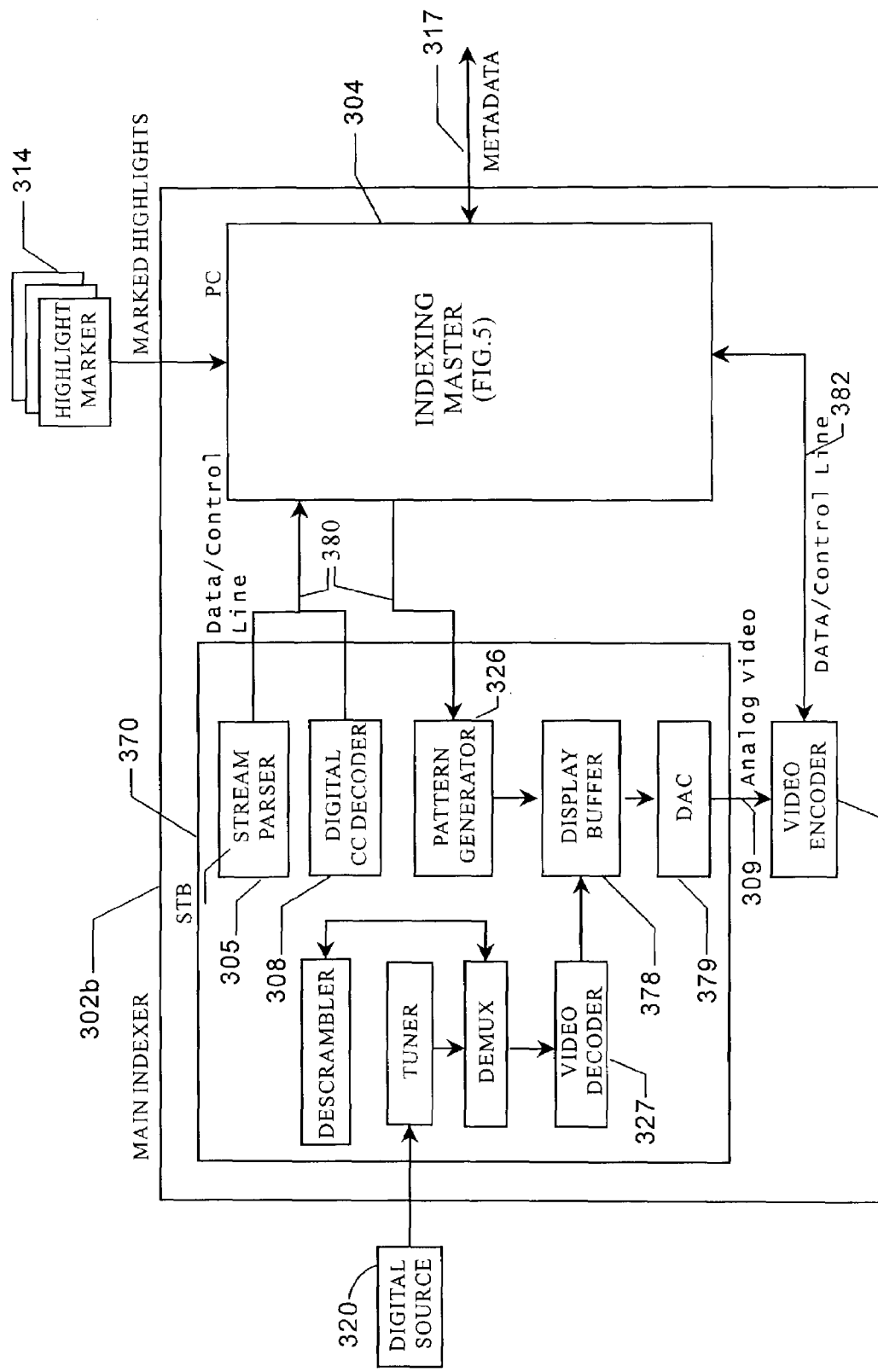

FIG. 3B is a block diagram of another exemplary configuration of a main indexer that includes an indexing master as well as various hardware devices to deal with digital video source, according to the invention.

Figure 3C:
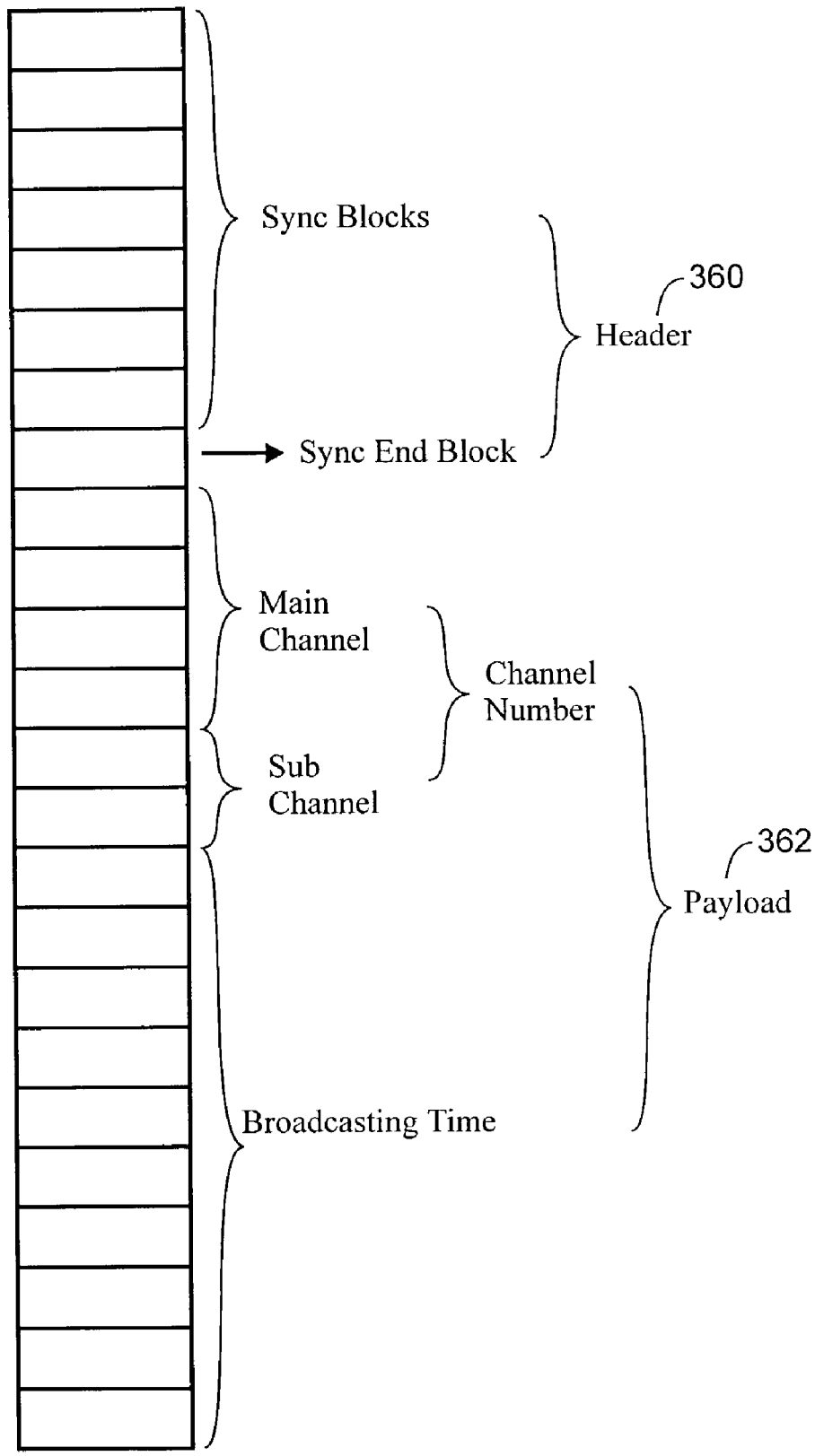

FIG. 3C is a exemplary structure of a color code to represent broadcasting time, according to the invention.

Figure 3D:
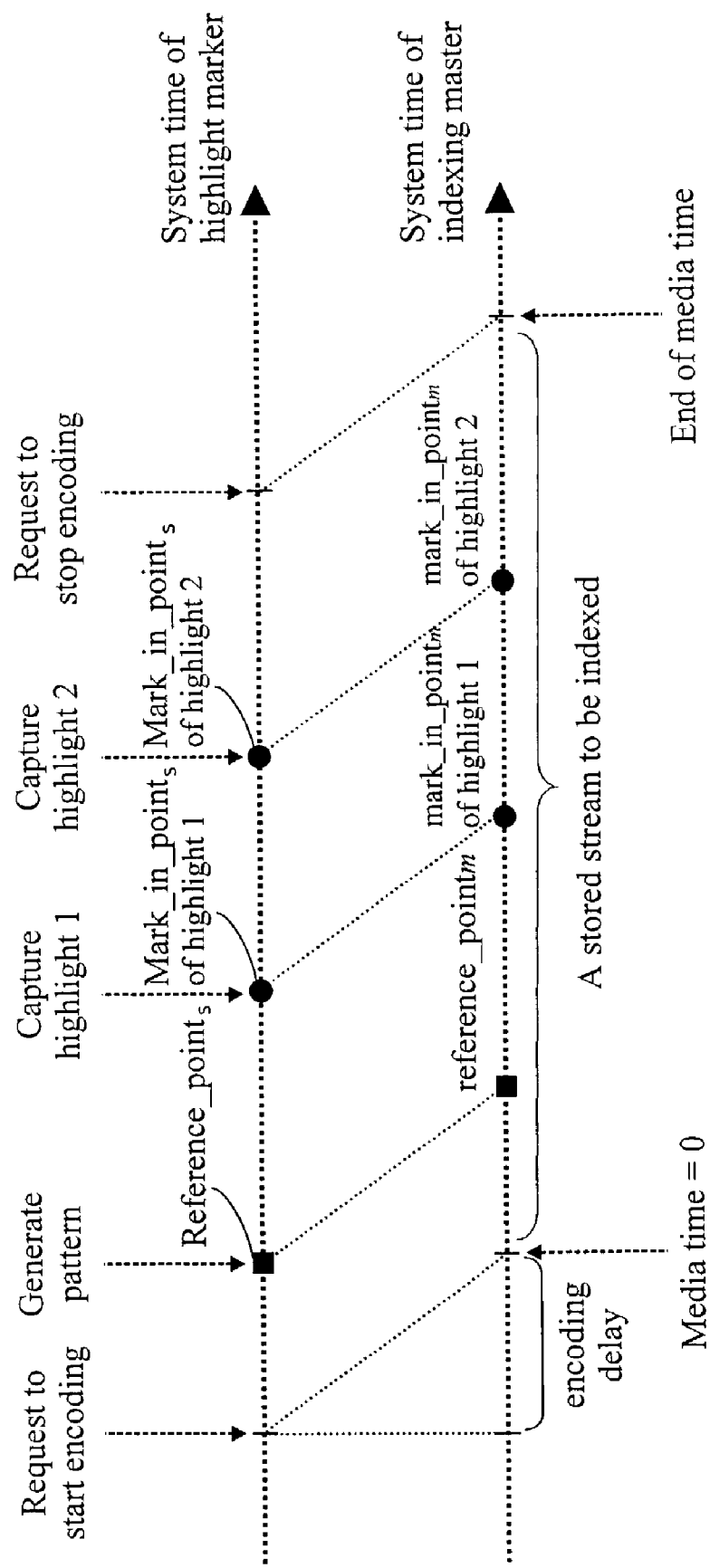

FIG. 3D is a diagram illustrating the relationship between the system times of the highlight marker and the indexing master, and the corresponding media times of its stored digital stream, according to the invention.

Figure 3E:
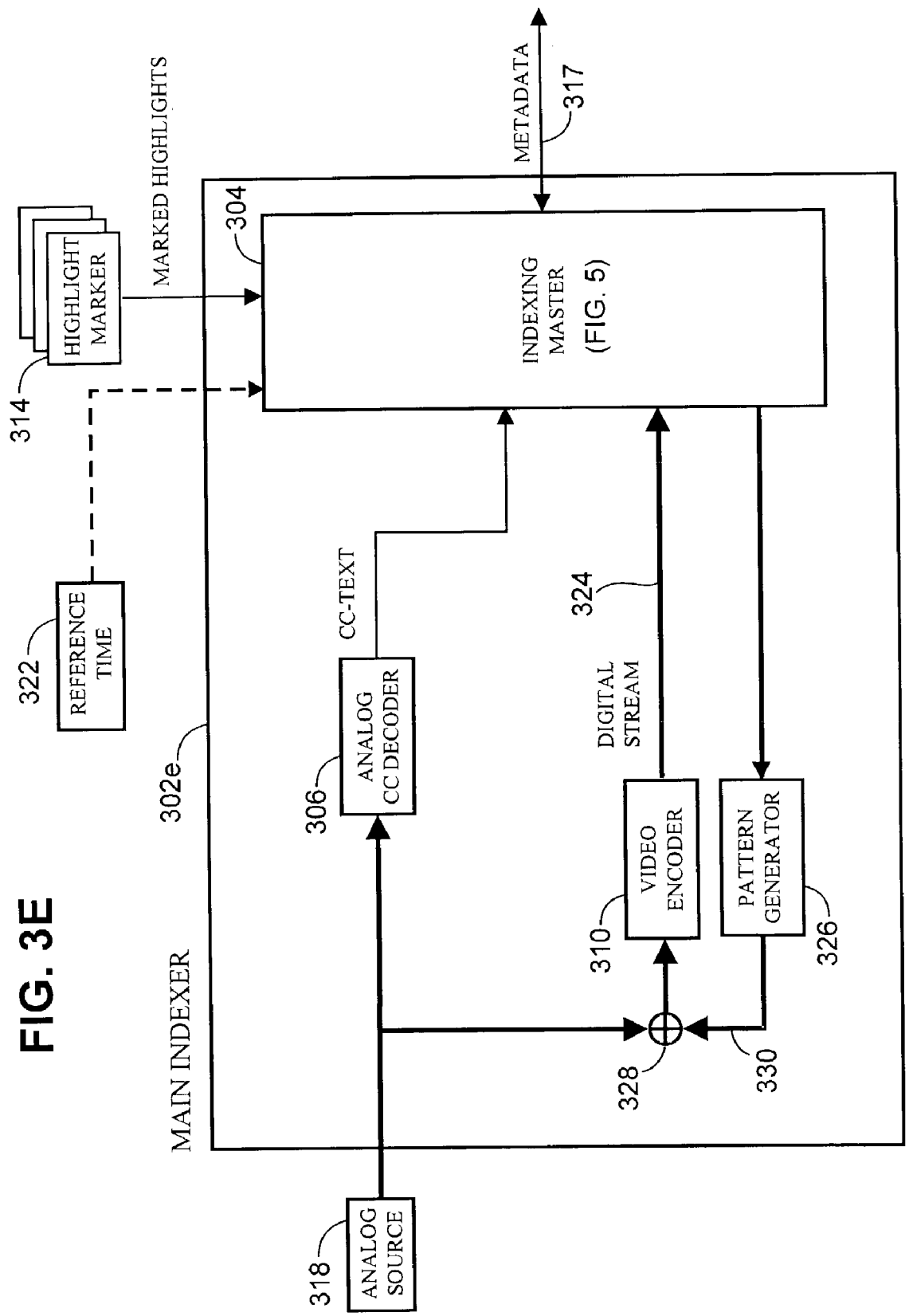

FIG. 3E is a block diagram of an exemplary configuration of a main indexer that includes an indexing master as well as various hardware devices to deal with analog video source, according to the invention.

Figure 4:
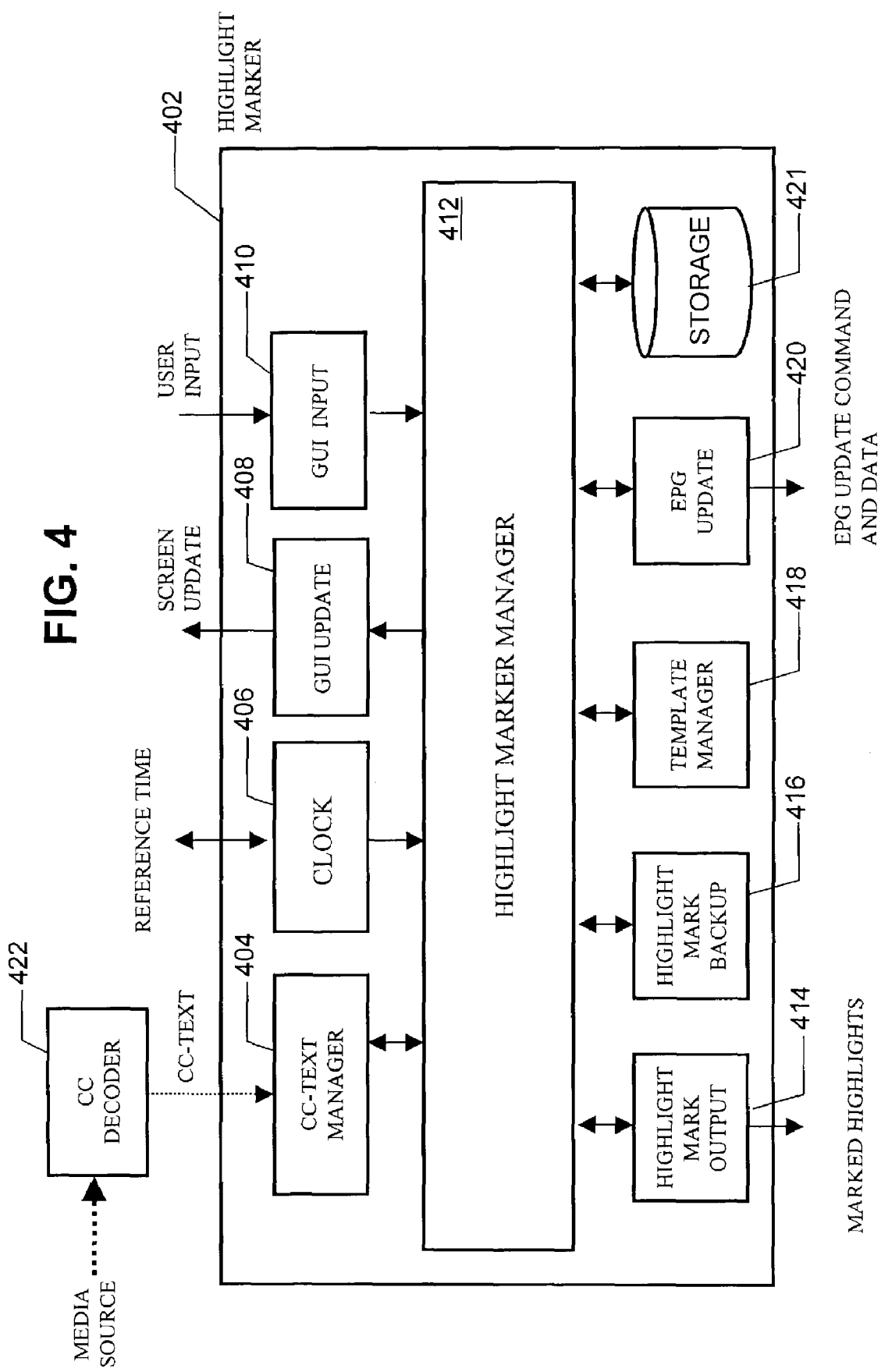

FIG. 4 is a block diagram illustrating an exemplary architecture of a highlight marker, a coarse indexing module of the real-time indexer, according to the invention.

FIG. 4A is diagram of an exemplary message format for the metadata that is sent to the main indexer, according to the invention.

Figure 5:
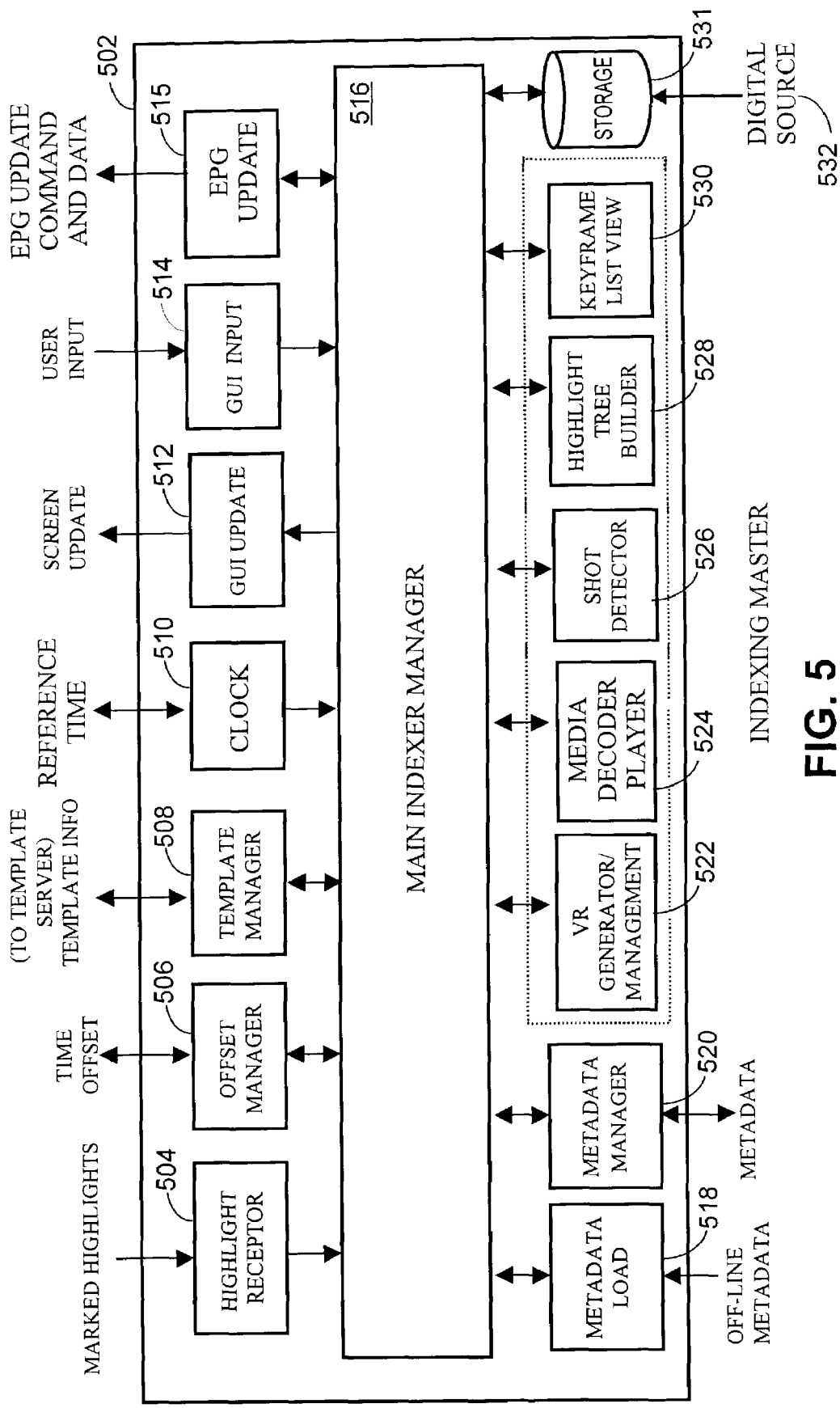

FIG. 5 is a block diagram illustrating an exemplary architecture of an indexing master, which is the fine indexing module, residing on the main indexer of the real-time indexer, according to the invention.

Figure 6:
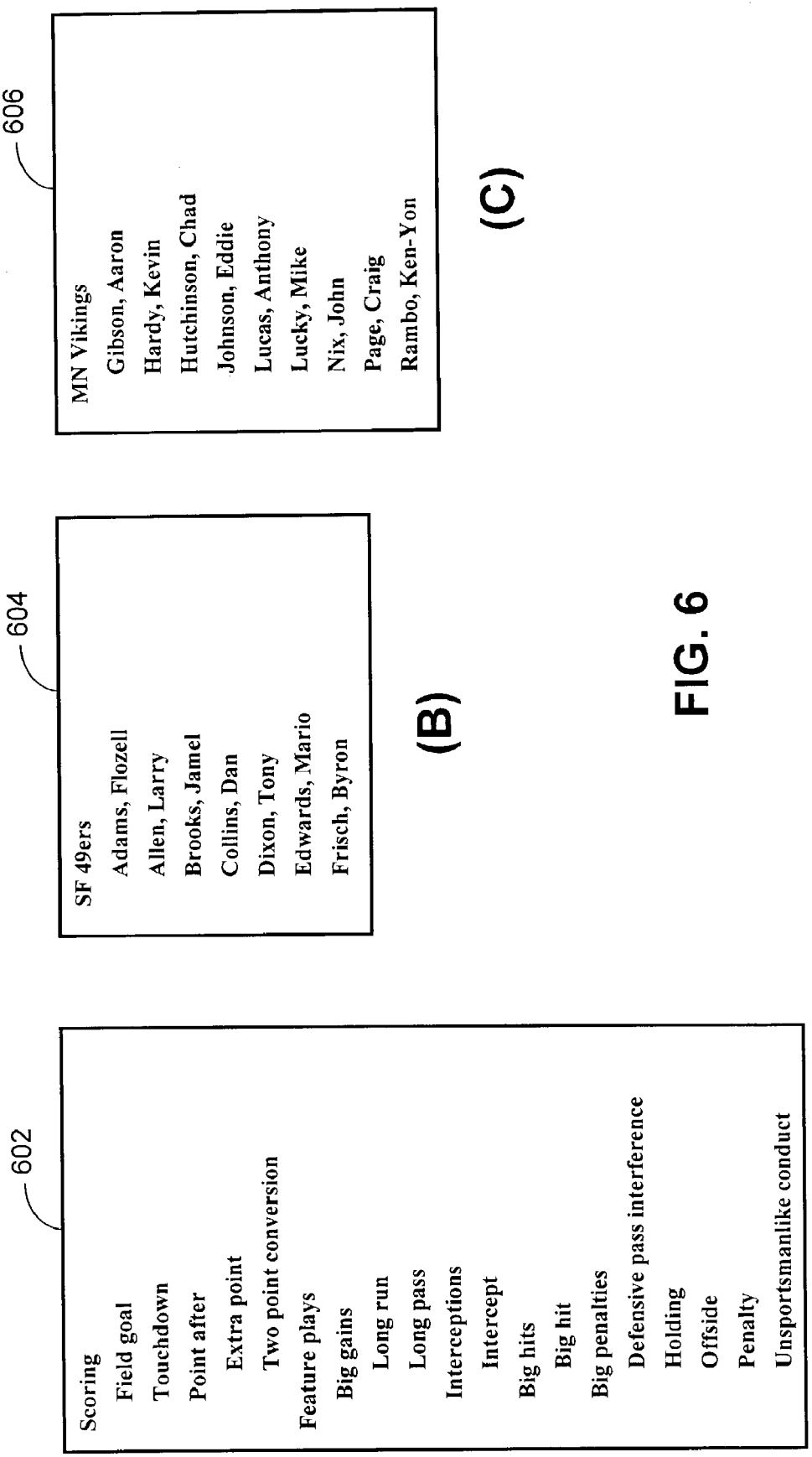

FIGS. 6(A,B,C) is a graphical representation of three exemplary highlight templates for football games in a highlight template database, according to the invention.

Figure 7:
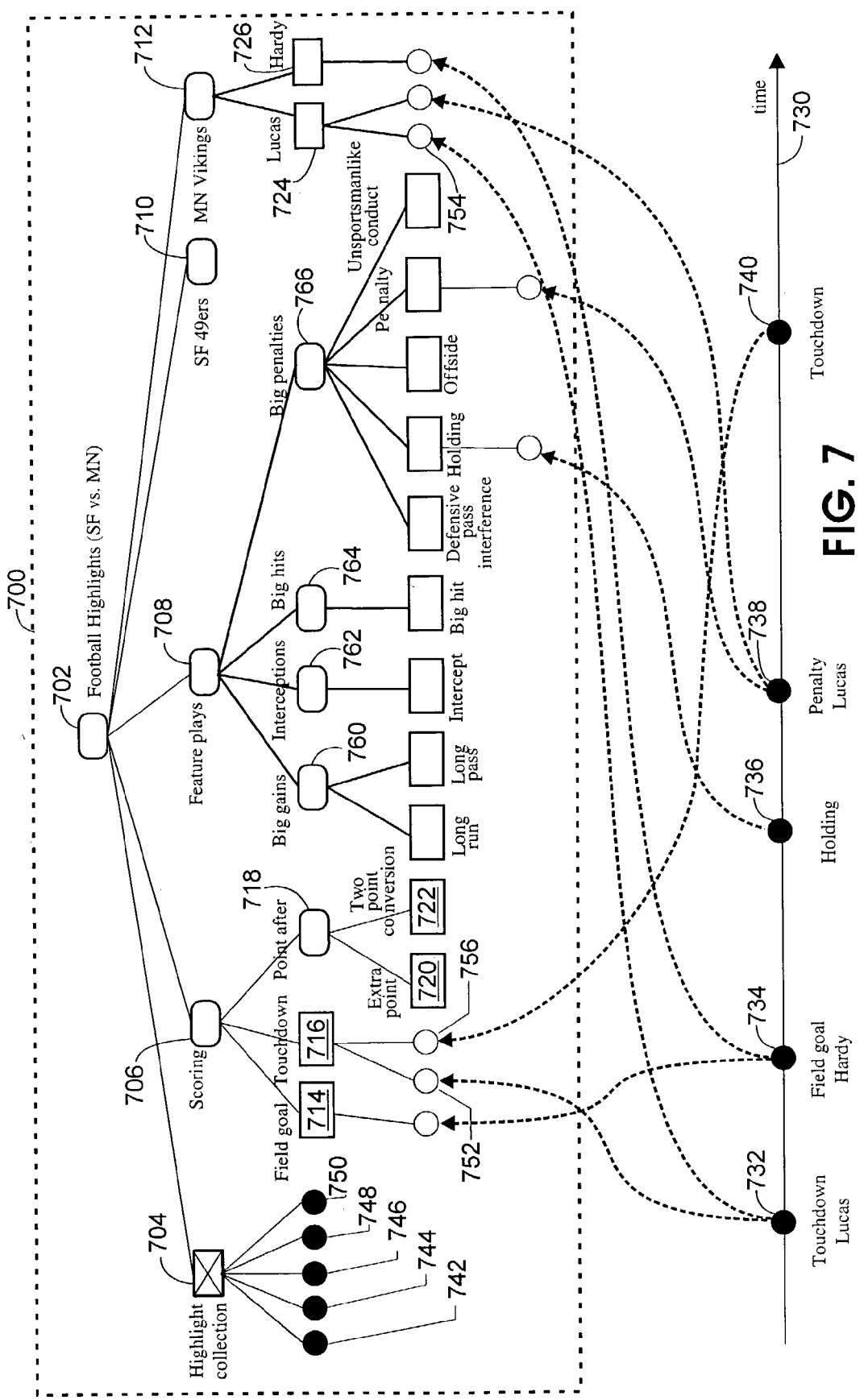

FIG. 7 is a diagram illustrating an exemplary highlight hierarchy that is automatically constructed by a highlight tree builder, and the relationship between the highlight hierarchy and the video highlights captured by the highlight marker, according to the invention.

Figure 8:
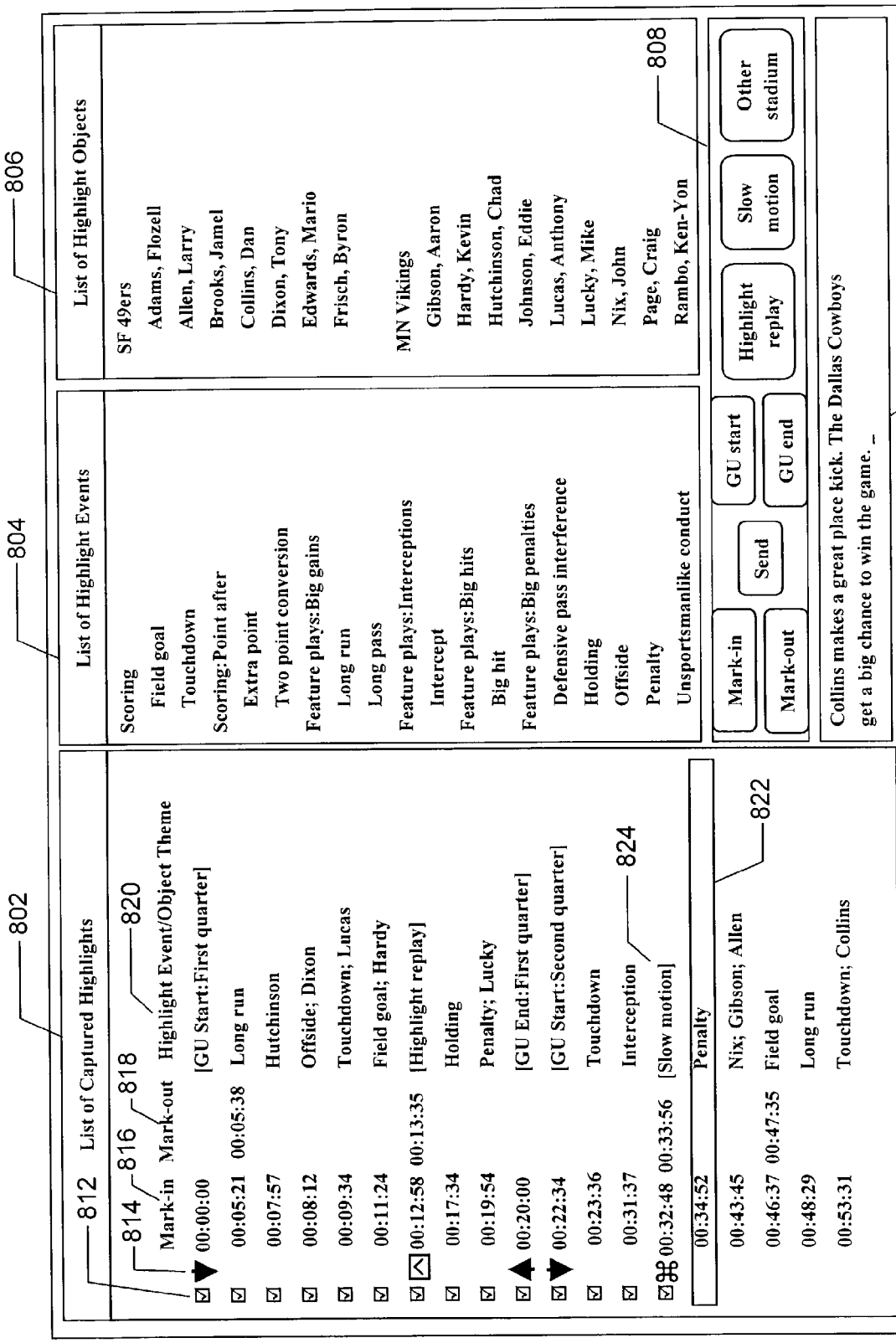

FIG. 8 is a graphical representation of an example GUI object to visualize the highlight marker, a coarse indexer, according to the invention.

Figure 9:
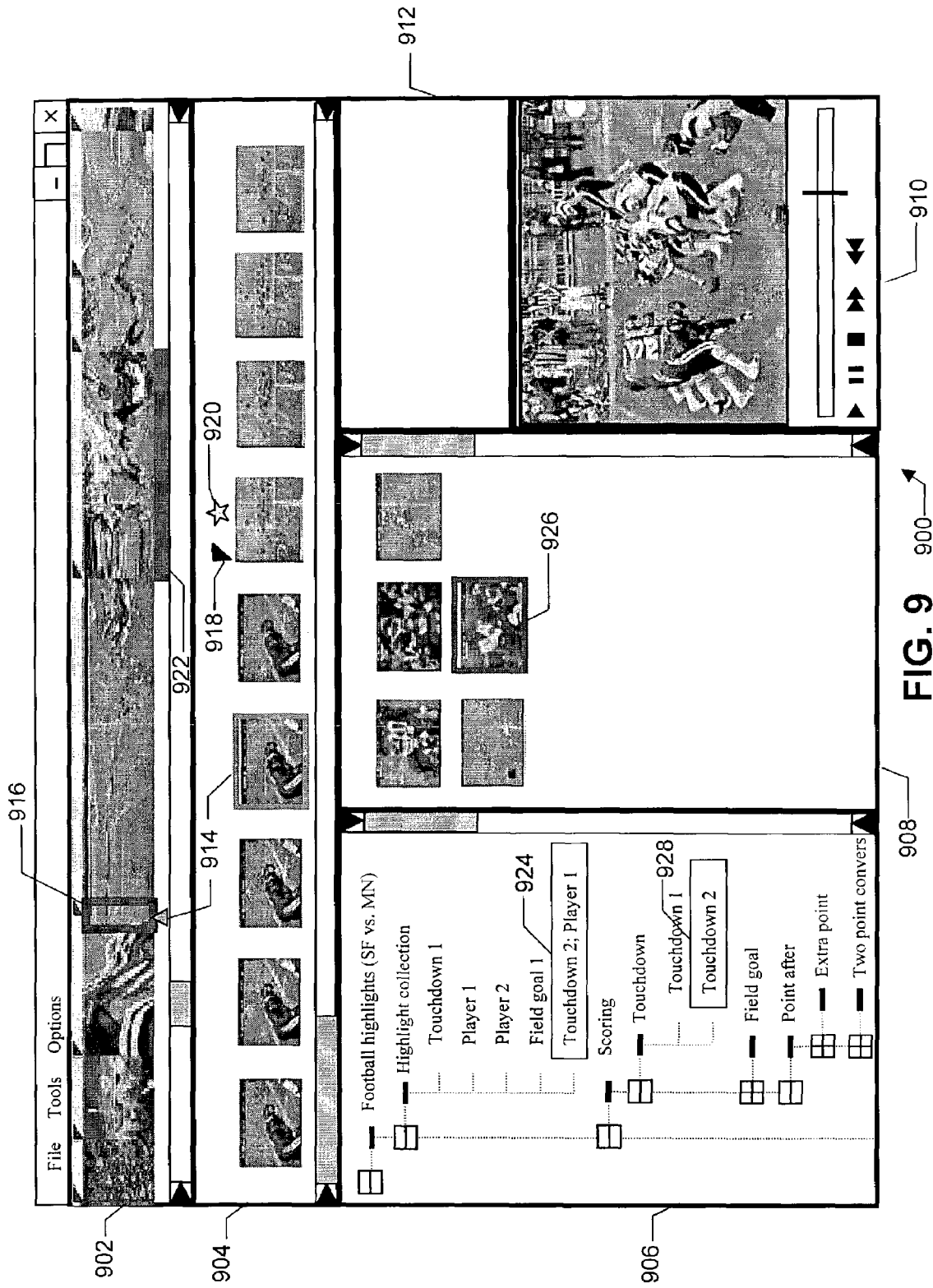

FIG. 9 is screen-shot of an exemplary GUI object to visualize the indexing master of the main indexer, a fine indexer, according to the invention.

FIGS. 10A-10E are screenshots of a typical highlight browser for football games running on DVR clients, according to the invention.

FIGS. 11(A)-(D) are diagrams illustrating some examples of sampling paths drawn over a video frame, for generating visual rhythms.

Figure 11:
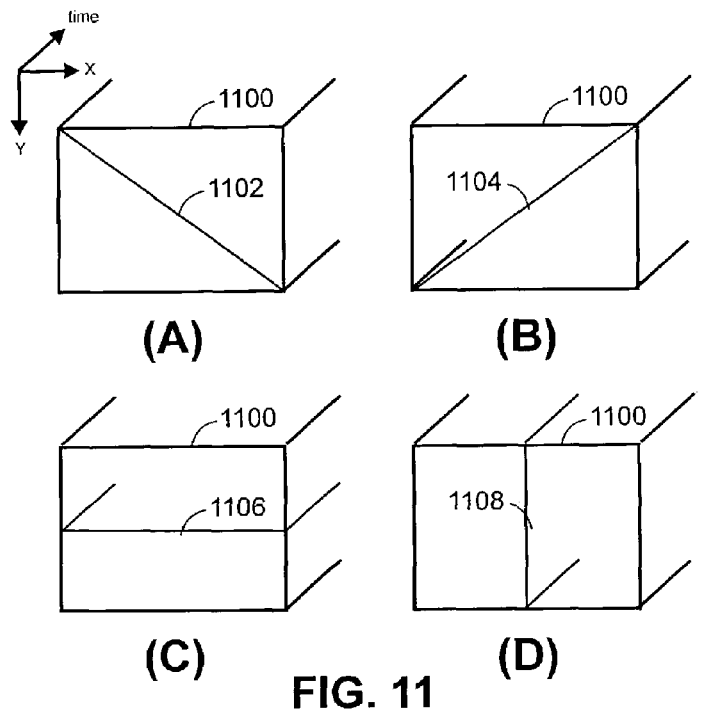
Figure 11E:
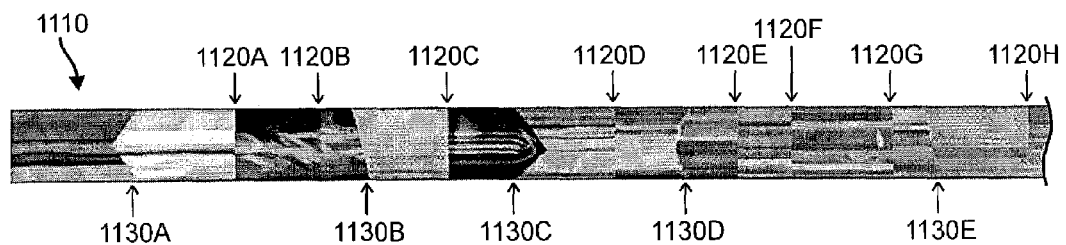

FIG. 11E is a visual rhythm image.

Figure 12:
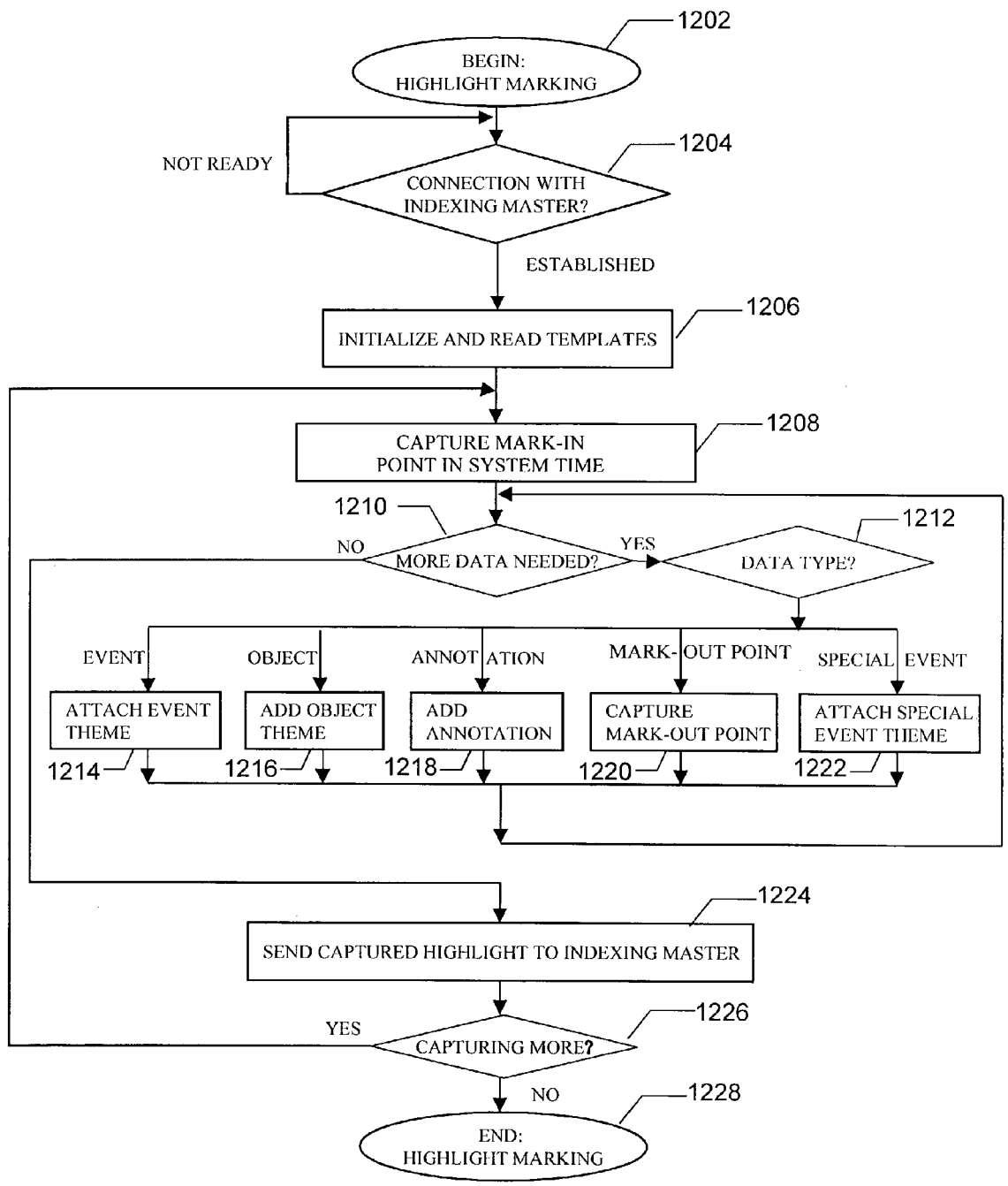

FIG. 12 is a flowchart of the process (highlight marking) of capturing coarse highlights, which is executed on the highlight marker, according to the invention.

Figure 13:
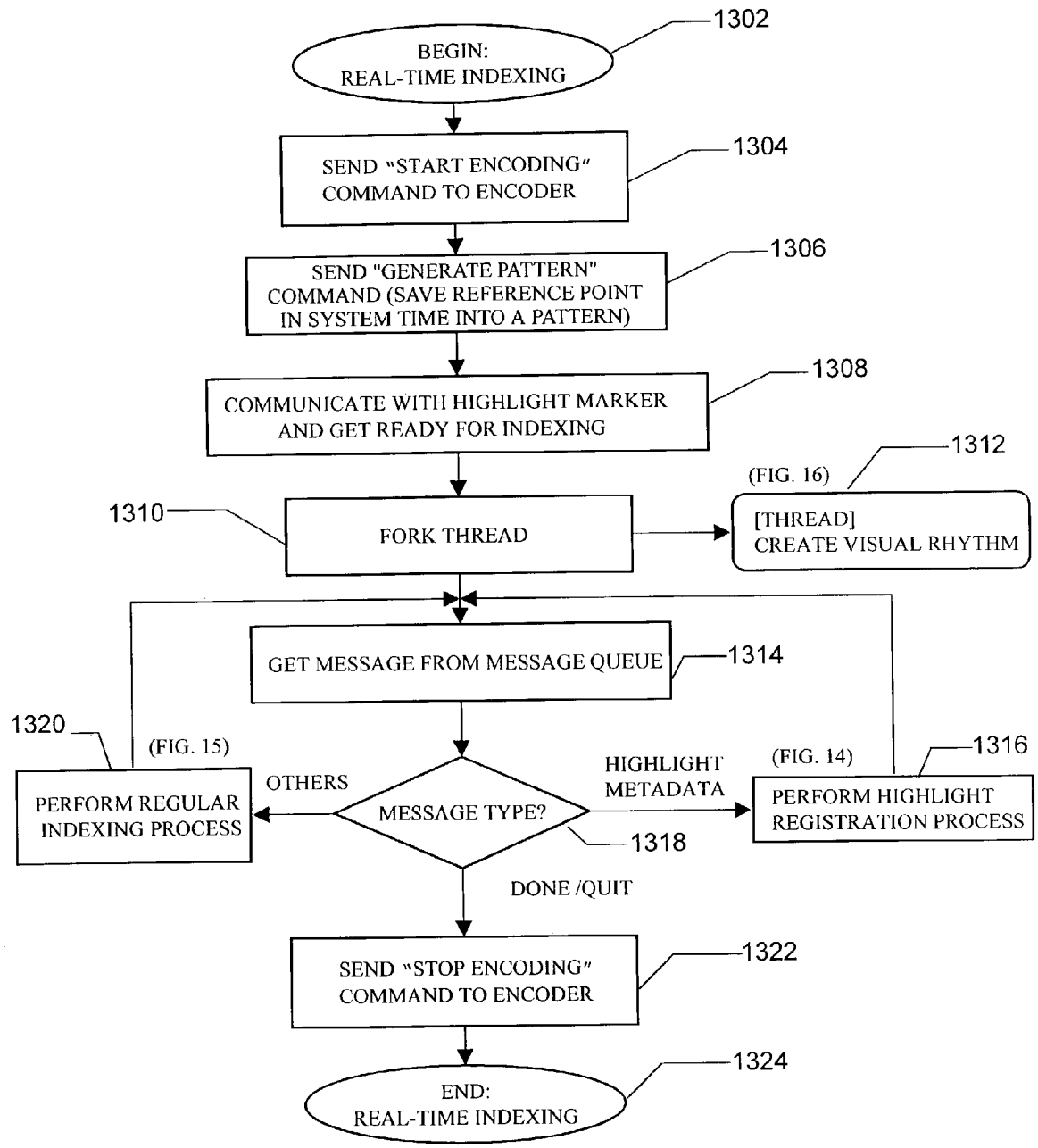

FIG. 13 is a flowchart of the process (real-time indexing) that is performed on the indexing master of the main indexer to refine the coarse metadata received from the highlight marker, according to the invention.

Figure 14:
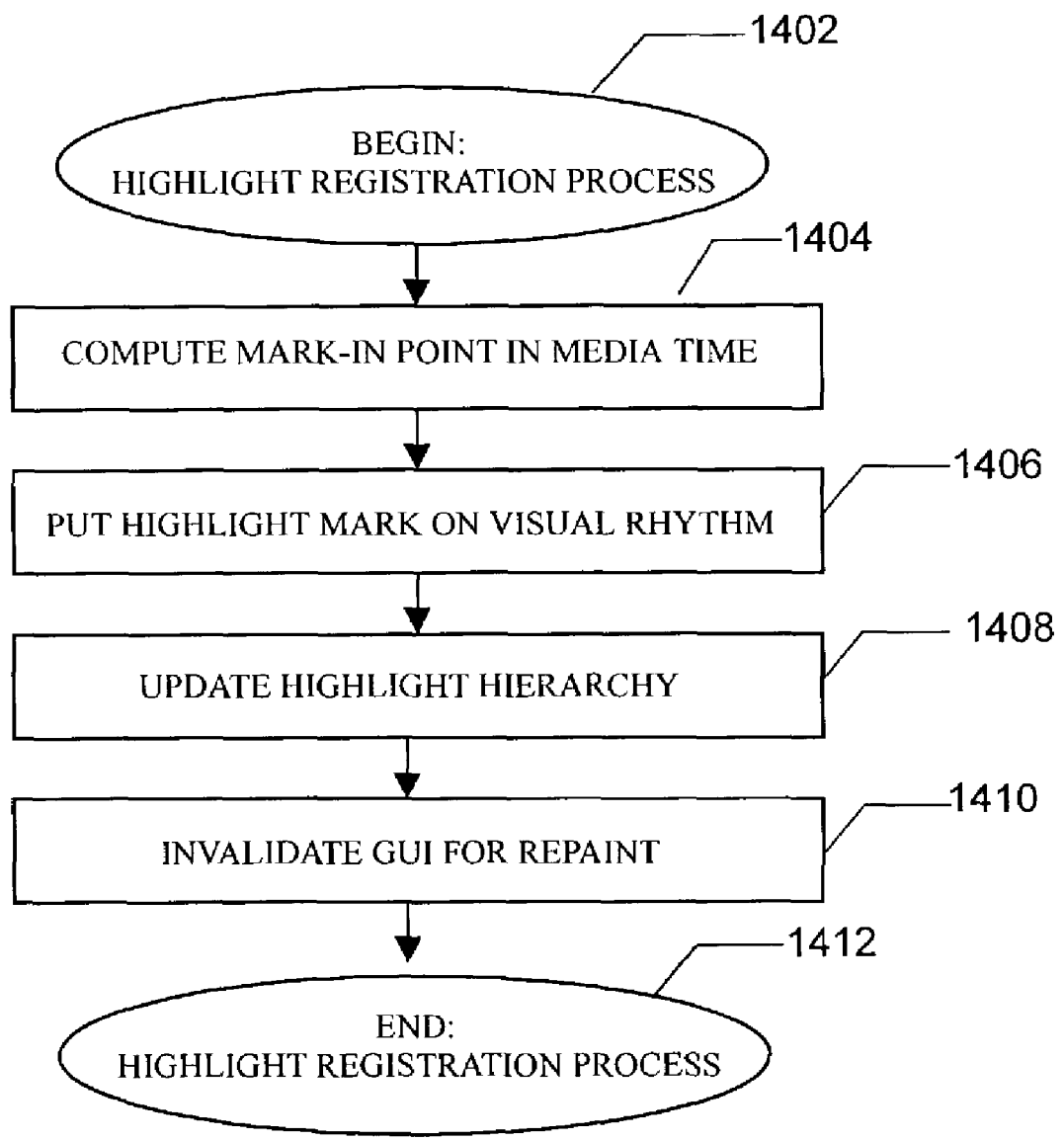

FIG. 14 is a flowchart showing the highlight registration process referred to in FIG. 13, according to the invention.

Figure 15:
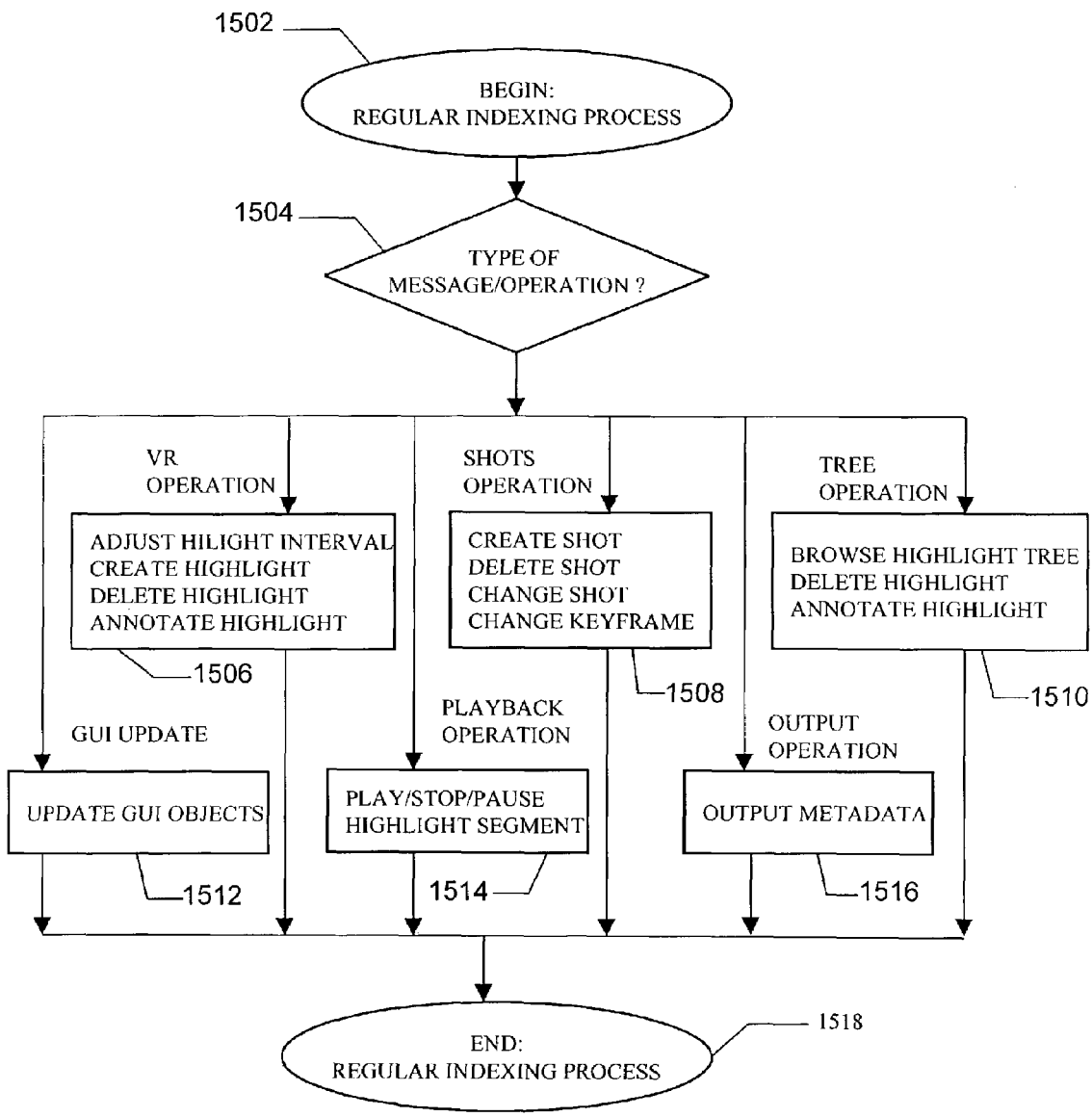

FIG. 15 is a flowchart showing the regular indexing process referred to in FIG. 13, according to the invention.

Figure 16:
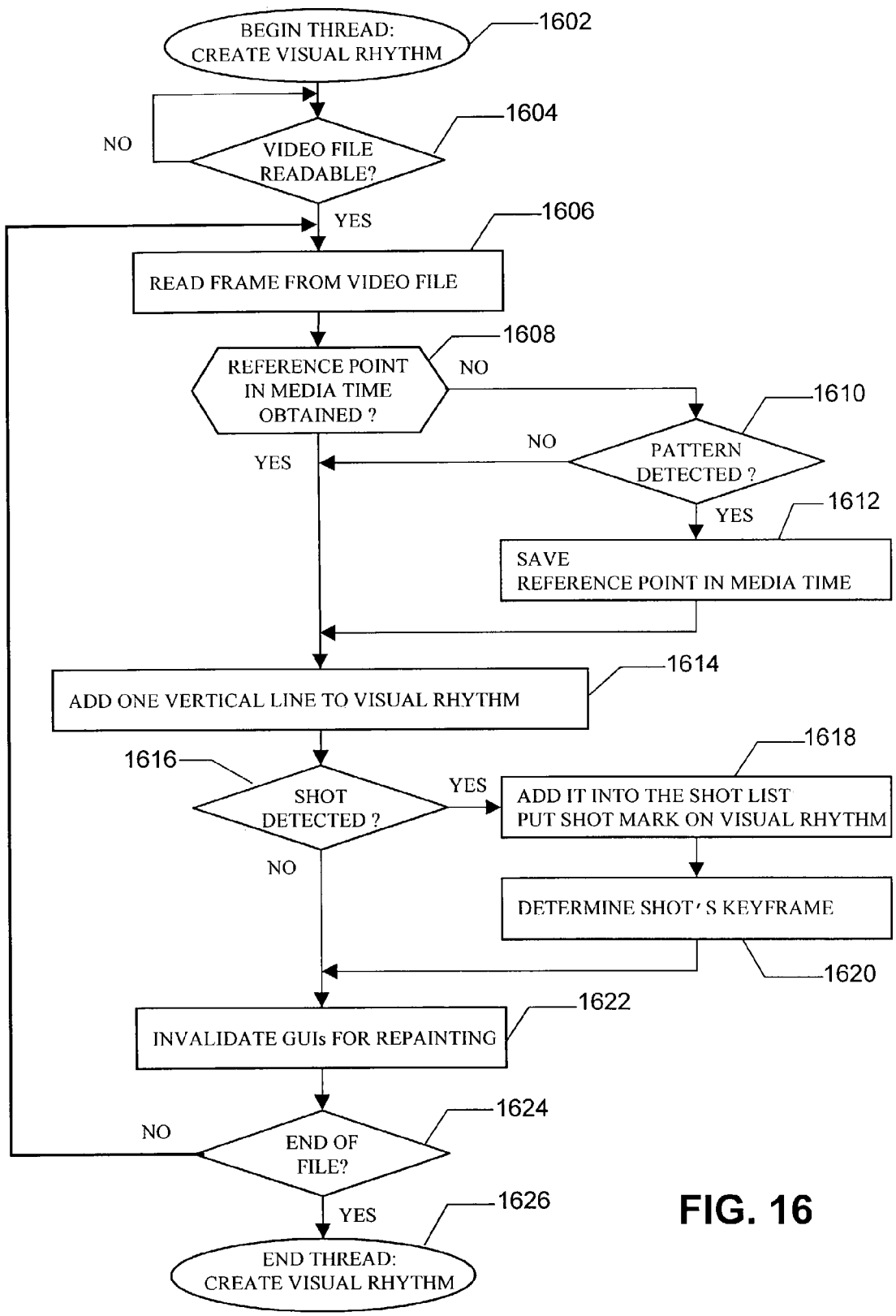

FIG. 16 is a flowchart showing the visual rhythm creation process referred to in FIG. 13, according to the invention.

Figures 17, 18:
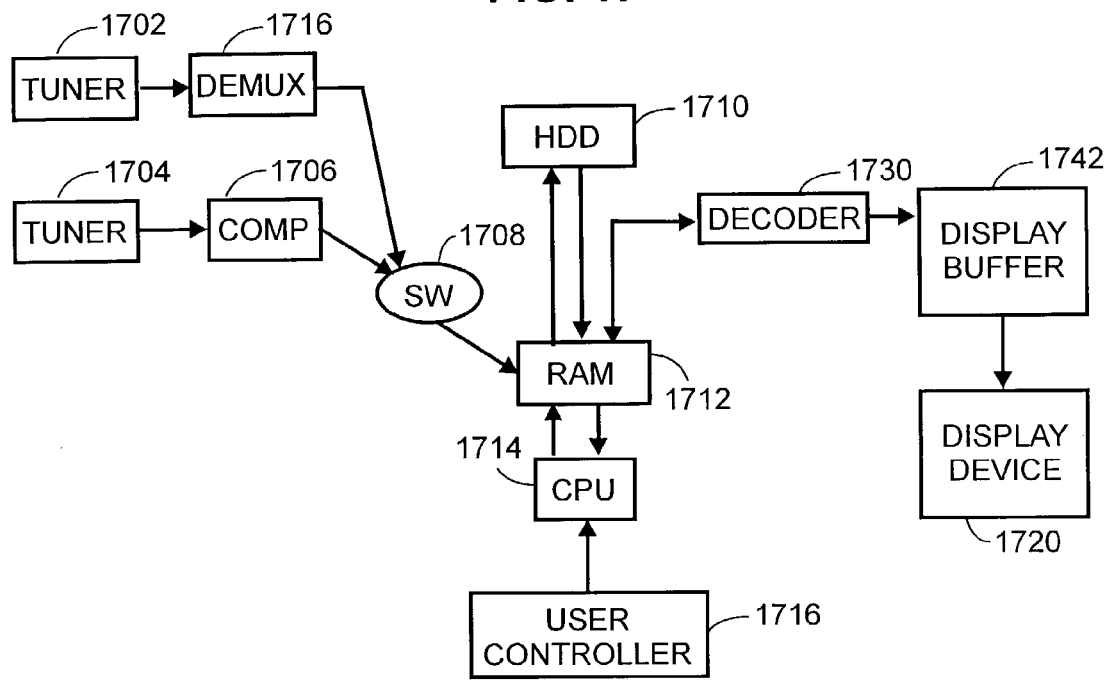

FIG. 17 is a block diagram of a digital video recorder for receiving, storing and viewing video programs, according to the invention.

FIG. 18 is a byte-offset table utilized in user device (i.e., DVR) for the purpose of fast accessing video segment of interests, according to the invention.

Figure 19:
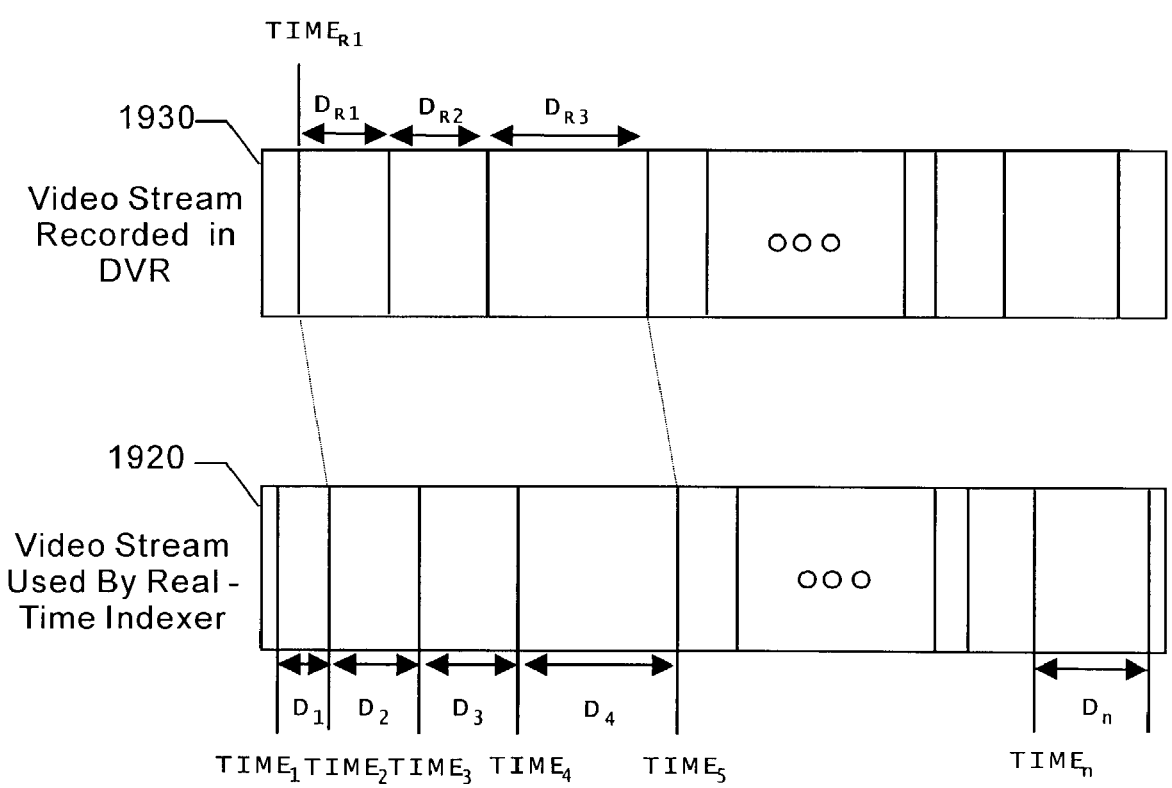

FIG. 19 is a detailed description used for frame-accurate access to a recorded stream based on a list of shot boundaries, according to the invention.

Figure 20:
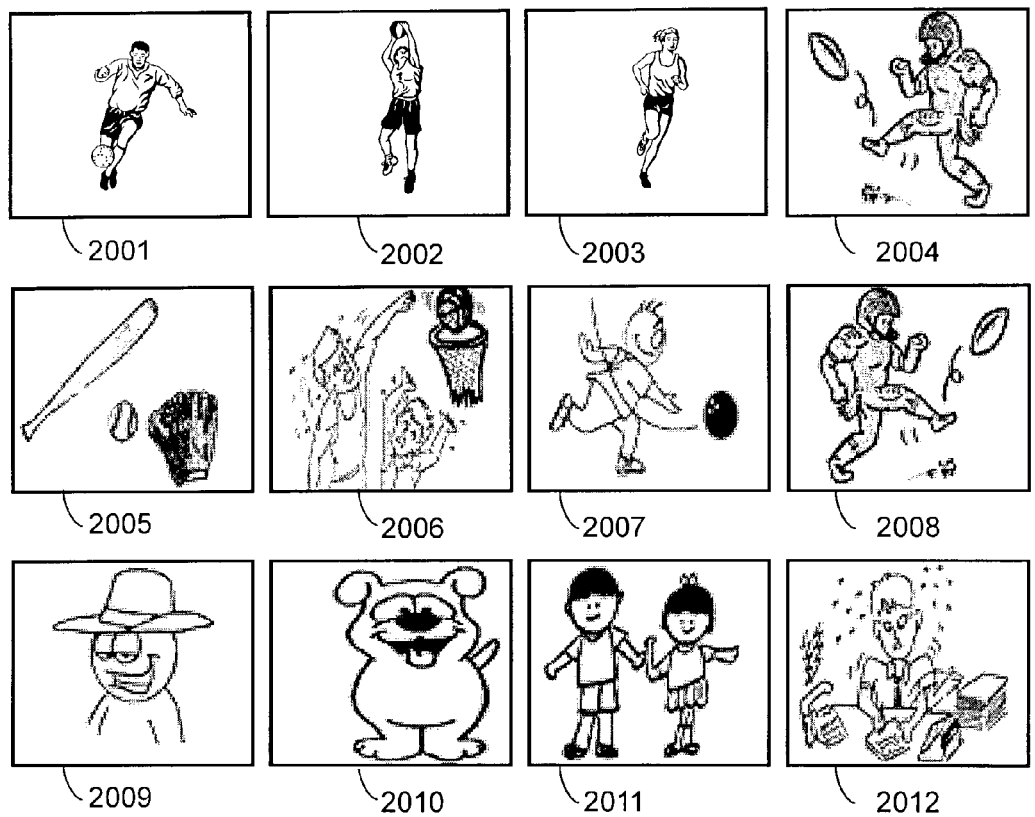

FIG. 20 is a collection of line drawing images, according to the prior art.

Figure 21:
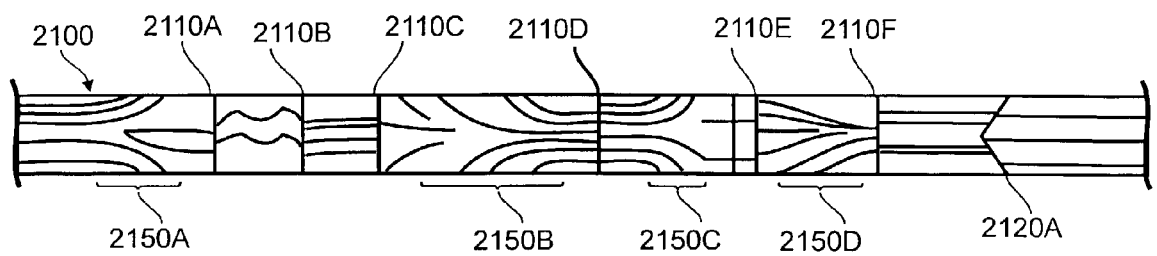

FIG. 21 is a diagram showing a portion of a visual rhythm image, according to the prior art.

DETAILED DESCRIPTION OF THE INVENTION

In the description that follows, various embodiments of the invention are described largely in the context of a familiar user interface, such as the Microsoft Windows™ operating system and graphic user interface (GUI) environment. It should be understood that although certain operations, such as clicking on a button, selecting a group of items, drag-and-drop and the like, are described in the context of using a graphical input device, such as a mouse, it is within the scope of the invention that other suitable input devices, such as keyboard, tablets, and the like, could alternatively be used to perform the described functions. Also, where certain items are described as being highlighted or marked, so as to be visually distinctive from other (typically similar) items in the graphical interface, that any suitable means of highlighting or marking the items can be employed, and that any and all such alternatives are within the intended scope of the invention.

Overall System

FIGS. 1A, 1B, 1C, 1D illustrates an overall technique for providing quick metadata service for live broadcasting. Media content from a media source 128, such as in the form of MPEG-2 transport streams (TSs), and its descriptive metadata, are delivered in real-time to viewers having a set-top box (STB) client 122 with TV and DVR capability. In the case of analog broadcasting, an analog signal is broadcast instead of digital streams.

A broadcaster 102 broadcasts media streams through the broadcasting network 114. One or more metadata service providers 104 (FIGS. 1A, 1B), can then use a real-time indexing tool 124A ("real-time indexer"), to analyze the broadcast streams and generate associated metadata in real-time. The metadata generated by the metadata service provider 104 is delivered to the DVR clients 122, using one of the following two metadata delivery methods.

As used herein, the term "broadcast stream" should be understood to include "broadcast signal", in the case of analog broadcasting. As used herein, the term "metadata service provider" should be understood to include at any location receiving the broadcast.

In a first delivery method (FIG. 1A), the real-time indexer 124A is situated at the metadata service provider 104, and the metadata is delivered to the client 122 through interactive data lines 112, 120, and a back channel 116. (The back channel comprises interactive data lines.)

The "back channel" usually means a two-way communication channel between the STB and the service provider, and it is usually the Internet.

In a second delivery method (FIG. 1B), the real-time indexer 124A is situated at the metadata service provider 104, and the metadata is delivered from the real time indexer 124A in the metadata service provider 104 to a multiplexer 130 of the broadcaster 102 through a feedback channel 132A. In the multiplexer 130, the delivered metadata is inserted into the video streams, and is thus broadcast together with the video streams (as a multiplexed signal) within the broadcast stream. This second method is only applicable to the case of digital broadcasting. A feedback loop is formed for efficient metadata delivery. The feedback loop comprises the broadcaster 102, the broadcasting network 114, the metadata service provider 104, and again the broadcaster 102. This second method is preferred in the case of digital broadcasting since it does not require that the clients be connected to the two-way data lines (112, 116, 120).

Alternatively (FIGS. 1C, 1D), the broadcaster 102 can provide the quick metadata service without an external metadata service provider 104. In this case, the metadata is generated by a real-time indexer 124B in the broadcaster 102. The generated metadata is either (FIG. 1C) broadcast multiplexed (130) together with video streams through a feedback channel 132B and the broadcasting network 114, or (FIG. 1D) is broadcast (delivered) in a separate stream through the interactive data lines 112, 120 and back channel 116.

Figure 1A:
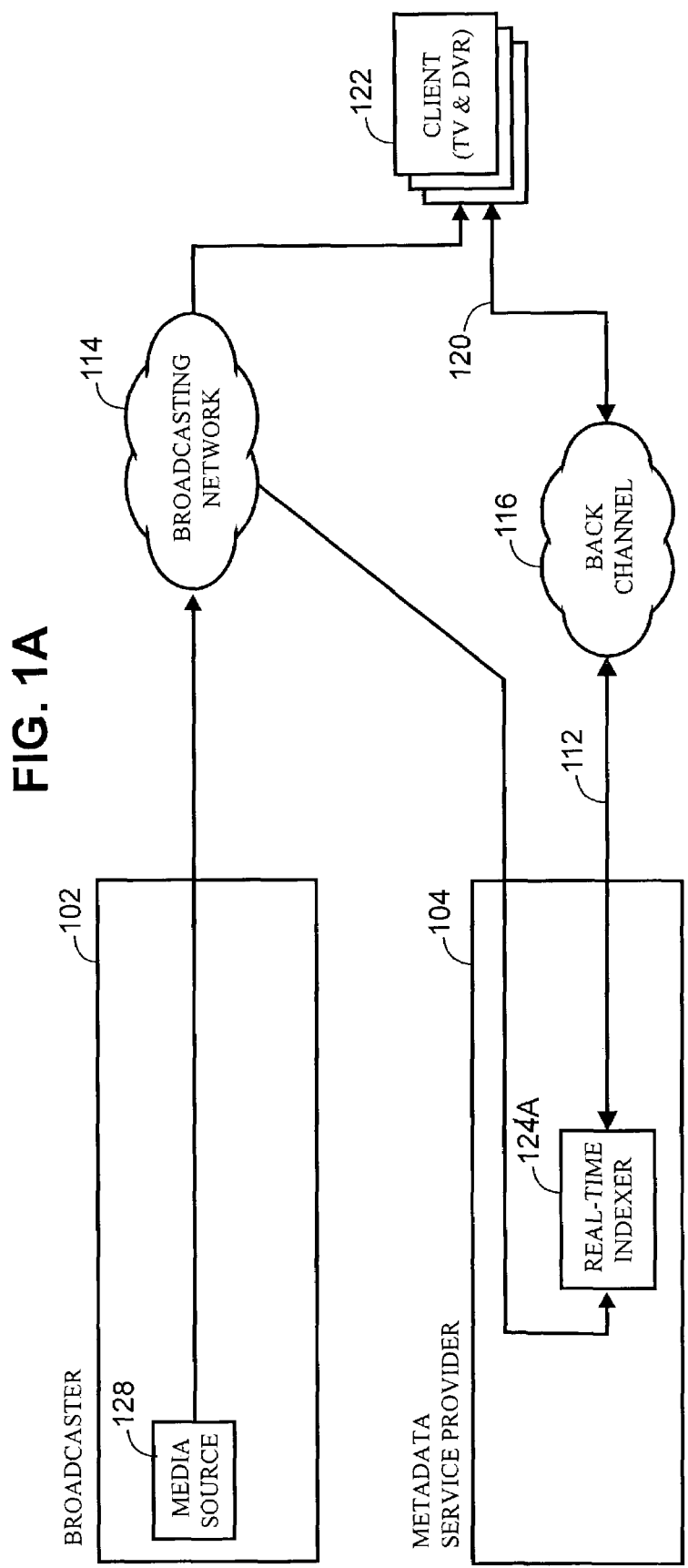
Figure 1B:
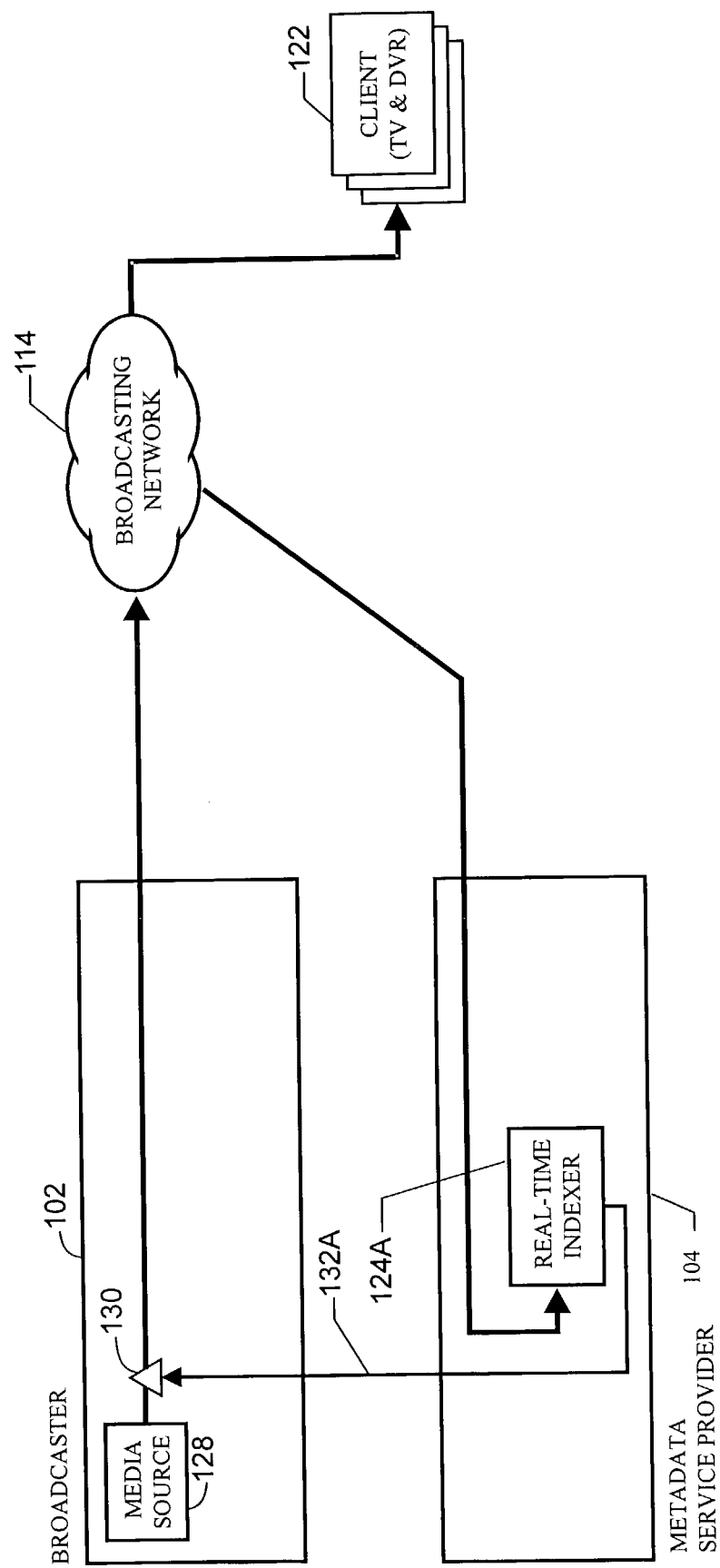

FIG. 1B shows a feedback loop (broadcaster>indexer>broadcaster>STB). FIG. 1C can be also considered as a kind of loop. The difference between FIGS. 1B and 1C is that the video stream is indexed before broadcasting, such as inside the broadcasting station, in FIG. 1C where as the broadcast stream is analyzed in FIG. 1B. In the case illustrated by FIG. 1D, the media stream is indexed before broadcasting and the metadata is delivered via the Internet, thus not forming a loop.

The viewer can record the video streams and use the delivered metadata in conjunction with the recorded video streams for advanced functionalities such as the navigation of content by highlight events.

The broadcasting networks 114 are typically terrestrial, cable, satellite, mobile, etc. The back channel data network 116 can include Internet, Intranet, PSTN, cable modem, satellite etc. The viewer's receiving device 122 is a typically a digital set-top box (STB) with DVR functionality.

In each of the scenarios described above, there is a real-time indexer 124A, 124B located in either a separate metadata service provider 104 or at the broadcaster 102, respectively. Further, each of the scenarios includes the case when the metadata for a TV program to be broadcast is available before broadcasting. This case can occur when the TV program is pre-indexed or rebroadcast.

Figure 1D:
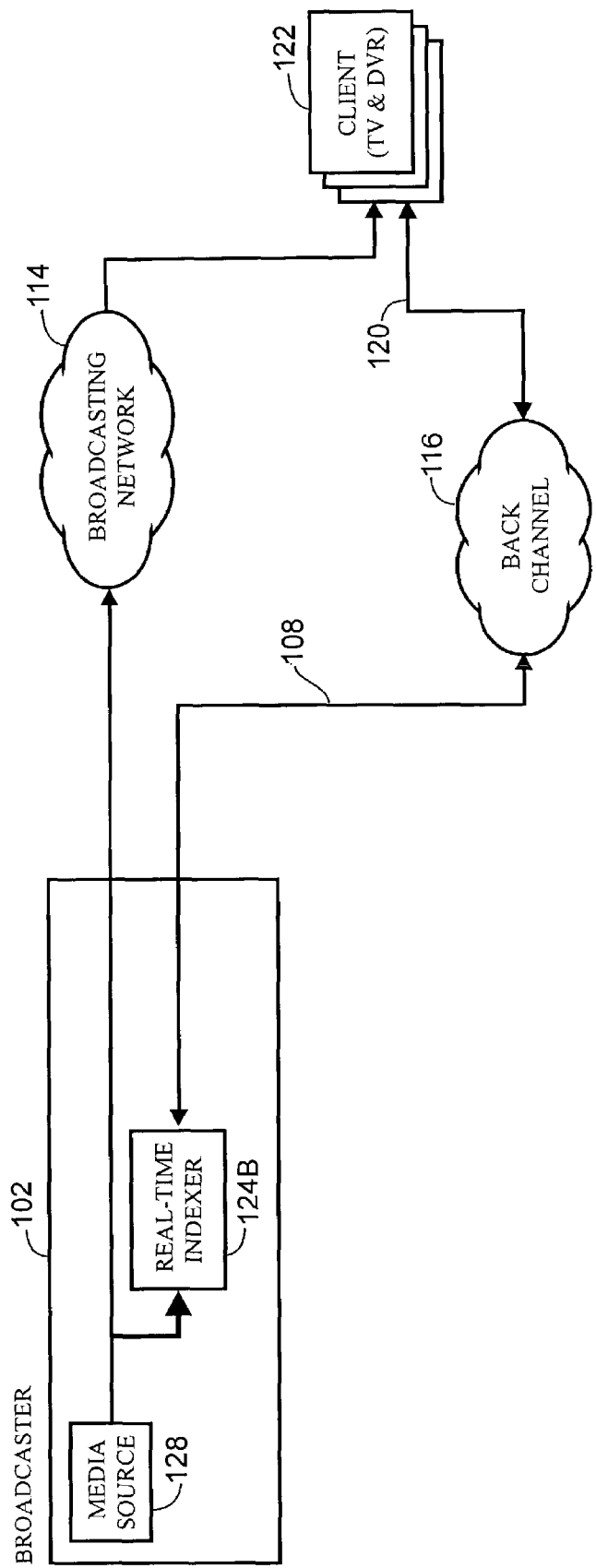

In FIG. 1A, the broadcast video signal is indexed and delivered to the STB. In FIG. 1B, the broadcast signal is indexed. In FIG. 1C, the signal before broadcasting is indexed. This case can occur when the signal is indexed inside the broadcaster. In FIG. 1D, the video signal is indexed before broadcasting and the metadata is delivered to STB through the backchannel. These four scenarios can be applied where metadata for video to be broadcast is not available, for example in the case of live sport programs. Further, it is generally assumed that the programs were recorded (e.g., in DVR). If the video stream files are already available before broadcasting, they can be indexed prior to broadcasting and thus a real-time indexer is not needed for indexing although it can be used to adjust the start time of the pre-indexed time-index in the metadata.

Real-Time Indexer

FIG. 2 illustrates, in greater detail, a real-time indexer 202 (corresponding to 124A, 124B in FIGS. 1A-1D). Media content is provided by a media source 218 (corresponding to 128 in FIGS. 1A-1D). The real-time indexer 202 comprises highlight markers 206, a main indexer 208, an optional (backup) main indexer 210, and a highlight template database 212 which are communicated through the computer network 214. (The optional main indexer 210 is provided for unexpected disasters such as encoder board crash or hard disk failures.) The highlight template database 212 provides various highlight templates that contain categorized or tree-structured highlight themes of events and objects. A desired highlight hierarchy can be built according to the categorized highlight themes of the highlight template which is selected by an operator. The operator can view programs on monitors (TVs) 204.

The highlight markers 206 are modules which are mainly responsible for quickly marking the positions corresponding to highlights of interests. Additionally, a detailed description for each marked highlight is generated in the main indexers 208 (and 210).

More specifically, the real-time highlight generation scheme comprises a two-step process: coarse indexing and fine indexing. The highlight marker 206 corresponding to a coarse indexer is used to mark a moment or time points of a highlight and to attach the marked highlight to relevant highlight themes selected from a highlight template by a human operator. The highlight 216 ("MARKED HIGHLIGHTS") captured at the highlight marker 206 is delivered to the main indexer 208 (and the optional backup main indexer 210) through the computer network 214. The main indexer 208 (or 210) corresponding to a fine indexer is used to refine the captured highlight 216 into a more complete (refined) description by attaching an exact time interval and a detailed description to the captured highlight 216.

During the fine indexing step, the exact time interval is obtained by any suitable technique for automatic shot detection and clustering, and a textual description is attached by using decoded closed-caption texts for the detected shots. The results from fine indexing automatically done at the main indexer 208 or 210 can be further refined by manual adjustment of time positions or additional annotations.

For example, the real-time highlight marking can be processed as follows. Before the start of an indexing process, an operator such as a football expert selects a football highlight template from various templates of sports games available from the highlight template database 212 and loads it into the highlight marker 206. While the operator is watching (viewing) a live football program (on TV 204), the operator uses the highlight marker 206 to mark desirable highlights (e.g., touch down, field goal, or interception) in real-time, with time stamps. The time information (time point or interval) and an optional short description about the marked highlight 216 are then immediately passed to the main indexer 208 (and backup main indexer 210) for fine indexing. Given an incoming analog or digital video source, the main indexer 208 (or 210) accurately associates the captured highlight information 216 to the video stream by manually adjusting the time positions and annotating textual descriptions, as well as by using available automatic indexing operations like shot detection, key frame extraction for the highlighted segment, and closed-caption text decoding.

After the refined description of a new highlight is generated, the main indexer 208 (or 210) inserts it into appropriate positions of a highlight hierarchy corresponding to the highlight template used. The resulting metadata can be expressed, for example, by using XML (eXtensible Markup Language). The resulting highlight hierarchy/metadata can be represented in proprietary formats or international open standard specifications on multimedia description such as TV-Anytime or MPEG-7 that are based on XML Schema.

The resulting metadata about highlights from the real-time indexer is delivered to DVRs in a variety of "delivery modes", including:

a) Incremental delivery: The metadata for most recently captured and refined highlight is delivered.
b) Periodic incremental delivery: At regular time intervals, the metadata for the newly captured and refined highlights after the last saving is delivered.
c) Periodic delivery: At regular time intervals, the whole metadata in its entirety with the most recently available information is delivered. That is, the whole up-to-date metadata is delivered repeatedly.
d) One time delivery: Immediately after the end of the broadcast program, the whole complete metadata is delivered.
e) Delayed one time delivery: At some time after the end of the broadcast program, the whole complete metadata is delivered. This mode does not support real-time service.
f) Delivery on request: The complete metadata is delivered whenever there is a request from DVR users. This mode is application when there is a two-way line available between the indexer and the DVR clients.

The delivery path of the metadata can be largely categorized into two: First, the metadata is delivered to a content guide server (not shown in the figure) in a broadcasting station (e.g., 102) for broadcast metadata delivery together in broadcast video stream in case of digital broadcasting. Second, the metadata is transferred through back channel data networks (e.g., 116) to the viewer's DVR. For each delivery path, the metadata can be delivered to DVRs depending upon the delivery modes described above.

The real-time indexer 202 of FIG. 2 is further described in conjunction with FIGS. 3, 3A, 3B, 3E, 4 and 5. Further details of the main indexer 208 are shown in and discussed with respect to FIGS. 3, 3A, 3B and 3E. Further details of the highlight marker 206 are shown in and discussed with respect to FIG. 4.

Main Indexer for Digital Source

FIG. 3 illustrates an exemplary configuration of the main indexer 302 (corresponding to 208, 210 in FIG. 2) that includes an indexing master 304 (see FIG. 5) as well as various hardware devices to deal with digital broadcast video sources 320. The broadcast digital stream 320 is simply stored in the persistent storage of indexing master 304 for fine indexing of the captured highlights. If the broadcast digital stream 320 is scrambled, the descrambler 307 is utilized.

One important aspect of providing quick metadata service for live broadcasting is to generate the metadata containing the time-based index synchronized to a broadcast program. This is possible because the broadcast video stream 320 contains the time information such as PCR (program clock reference) and PTS (presentation time stamps) in case of MPEG-2. Alternatively, since the current broadcast time is periodically available, the broadcasting time information can be utilized by the indexing master 304 to synchronize with the highlight marker 314 corresponding to 206 in FIG. 2.

The stream parser 305 extracts the broadcasting time from a broadcast digital stream and then sets the system clock in the indexing master 304 by the broadcasting time. The broadcasting time can be extracted from the transport packet containing System Time Table (STT) defined in Advanced Television System Committee (ATSC), or from the transport packet containing Time Data Table (TDT) defined in Digital Video Broadcasting (DVB). The TS packet for STT/TDT should not be scrambled as defined in ATSC or DVB standards. In order to synchronize the system clock in the highlight marker 314 with the system clock in the indexing master 304, the time of the system clock in the indexing master 304 is periodically transferred to the highlight marker 314. Thus, the highlight marker 314 can generate messages that include highlight events and its associated broadcasting times synchronized with the main indexer 302.

Alternatively, instead of transferring the broadcasting time to the highlight marker 314, the indexing master 304 that receives a message from the highlight marker 314 can adjust the transferred local time in the message to the system time of the indexing master 304 that is synchronized with the broadcasting time by adding a time offset. The value of time offset is computed from the local time of the highlight marker 314 contained in the message and the current time of the indexing master 304.

The digital source 320 would typically be a live broadcast stream or the output of a digital tape deck. The digital source is fed into the digital closed-caption (CC) decoder 308. The CC-text (closed-caption text) extracted from the digital source 320 by the digital closed-caption decoder 308 is passed to the indexing master 304 where the CC-text will be automatically associated with the captured highlights. If the CC-text functionality is not provided when there is a need to annotate some description, an operator could type in the textual description for the captured highlights.

One of the functions of the indexing master 304 is to playback arbitrary video segments repeatedly while working on the captured highlights produced by the highlight marker 314. For example, the operator of the highlight marker 314 could be so busy in marking highlights that he may miss out on capturing some crucial moments (other highlights). Clearly, these missing moments would not be found without playing back the video segments could contain the missing highlight scenes. One way of gaining such random access for playback to any portion of the video stream is to directly use the video stream stored in the storage of the indexing master 304. Upon receiving the playback request for a specific video segment, the indexing master 304 simply looks into the stored digital streams to obtain the relevant point of access to the requested video segment.

The metadata generated by the indexing master 304 is sent to user devices 122 as shown in FIGS. 1A and 1D or is sent to the broadcaster 102 as shown in FIGS. 1B and 1C.

Main Indexer with a Transcoder for Digital Source

FIG. 3A is a block diagram of another exemplary configuration of a main indexer 302a that includes an indexing master 304 and a transcoder 311 as well as various hardware devices to deal with digital video source 320.

As shown in FIG. 3 and described hereinabove, the digital source 320 can be applied to the main indexer 302a directly. However, for practical purposes, the digital source 320 may be transcoded into a low bit rate stream by using the transcoder 311. For example, if the digital source is a high bit rate stream such as a high definition TV (HDTV) stream, in order to deal with the stream, the indexing master 304 would be required to have a high performance computing power. Thus, for the indexing master 304 that may typically be a general personal computer (PC), the high bit rate stream into a low bit rate stream by using the transcoder 311.

Main Indexer Implemented with STB and PC for Digital Source

FIG. 3B is a block diagram of another exemplary configuration of a main indexer 302b that includes an indexing master 304 as well as various hardware devices to deal with digital video source 320. The main indexer 302b is, in this embodiment, divided into three subsystems—the STB 370, the video encoder 310 and the indexing master running in the personal computer (PC) 304.

As shown in FIG. 3 and described above, the digital source 320 can be directly applied to the main indexer 302b. However, for practical purposes, the digital source 320 may be "re-encoded" by using the video decoder 327, digital to analog converter (DAC) 379 and the video encoder 310 to avoid directly accessing descrambled original broadcast streams. Furthermore, the use of low bit rate for indexing requires less computation.

The video encoder 310, comprising an image capture/digitizer and a video compressor/coder, is responsible for transforming the analog source 309 into the digital formats such as ASF, MPEG-1, MPEG-2, etc. and storing the resulting digital stream into the persistent storage of indexing master 304 for fine indexing of the captured highlights In the case of the re-encoded broadcast stream, the broadcasting time contained in transport stream is lost when it is converted to analog signal by the video decoder 327 and DAC 379. Thus, the encoder 310 may insert the broadcasting time extracted by the stream parser 305 into the encoded stream.

Alternatively, the encoder can use the encoding start time with respect to the broadcasting time as the broadcasting time corresponding to the beginning (the first frame) of the stream stored in the indexing master 304. However, this method is usually not accurate since there is a time delay between a request for encoding and the start of encoding which usually takes more than a few seconds due to initialization and encoding latency of the video encoder 310.

Alternatively, a pattern generator 326 is utilized. The pattern generator 326 is a module embedded in the STB 370. The PC (indexing master 304) communicates with STB 370 through the control line 380 that could be a remote control. The indexing master 304 sends the pattern generator 326 a signal to generate a color pattern or any visual pattern such as texts including a program information such as broadcasting time and channel number of a program being broadcast. Then, the pattern generator 326 generates a color pattern that represents a program information including the broadcasting time acquired from the stream parser 305. The generated pattern is overlaid on the video signal in display buffer 378. The external video encoder 310 encodes the analog video signal that is the output of DAC 379 and stores it into the storage of the indexing master 304. The indexing master 304 reads the stored video from the storage for the purpose of time-based indexing For the specific purpose of time-stamping the broadcast stream, the indexing master 304 requests the pattern generator 326 to generate an artificial visual pattern corresponding to the broadcasting time output by the stream parser 305. Then, the pattern generator 326 generates a pattern which visually shows a color pattern in which the numbers representing time information are color-coded. The pattern is immediately sent to the display buffer 378 where the pattern is overlaid on the decoded video frame in display buffer 378. The time delay from the stream parser output to the overlay is usually negligible. The indexing master 304 can obtain the broadcasting time corresponding to a specific point/frame of the stream stored in the indexing master 304 by automatically analyzing the color pattern. In this way, the media time of the stored stream to be indexed can be associated with the broadcasting time.

The pattern (e.g., color pattern) is generated by the pattern generator 326 between the start and the end of encoding. Normally, the pattern is generated once at the broadcasting time called a reference point in system time of the indexing master, denoted by reference_point$_s$ since the system time of the indexing master is synchronized with the broadcasting time. Also, the media time corresponding to the reference point in system time of the indexing master, denoted by reference_point$_m$ is called a reference point in media time. The reference point in media time for the recorded digital stream can be obtained from the values of PTS or PCR corresponding to the frames containing the generated pattern. The pattern may be generated more often, such as at regular intervals, to improve the accuracy.

FIG. 3C illustrates an exemplary pattern generated by using structured color blocks (color-code) where each block is composed of several pixels. The structure of color-code comprises the header 360 and the payload 362. The header 360, in this embodiment, comprises a set of sync blocks and a sync end block in order to easily locate the structured color-code from the overlaid video frames. The payload 362 represents a broadcasting time and channel numbers. The payload 362 may include other information such as program title. A color-code value for each block represents a number and is defined as follows:

$$codevalue = \sum_{k=0}^{2} b^k \cdot round\left(\frac{c[k] \cdot (b-1)}{255}\right).$$

where b is a scale factor, and c[k] is a color component value of a pixel with k=0,1,2, each of which represents, for example, Red (R), Green (G) and Blue (B) component, respectively.

However, since there is usually a color distortion between the intended color code and its decoded value after superimposing and encoding, a color calibration is needed to compensate for the color distortion. In one embodiment, a calibration function may be defined as follows:

$R'=f(R, G, B, alpha)$, $G'=f(R, G, B, beta)$, $B'=f(R, G, B, gamma)$, where R, G and B are the values of the observed color of a pixel, and R', G' and B' are the calibrated color values of a pixel, and alpha, beta and gamma represent the parameter values that are experimentally determined or that are determined automatically by using test color patterns for calibration.

Synchronization of a Stored Digital Stream to be Indexed with Highlight Marker

The highlight marker 314 records the time information of the captured highlights (events) according to its local system time of highlight marker 314. This local system time, denoted by $mark\_in\_point_s$, is called a mark-in point in system time of highlight marker for the broadcast signal. In order to refine the captured highlight by manually adjusting an interval of the highlight with the indexing master 304, it is therefore important to obtain the media time for the corresponding video stream stored in the indexing master. The media time corresponding to the mark-in point in system time of highlight marker, denoted by $mark\_in\_point_m$ is called a mark-in point in media time. Thus, the value of $mark\_in\_point_s$ should be converted to the corresponding value of $mark\_in\_point_m$ because the indexing master works on the digital video stream stored in the indexing master. After the refinement of the $mark\_in\_point_m$, it is also crucial to obtain the broadcasting time (i.e. system time of the indexing master) corresponding to the adjusted $mark\_in\_point_m$ because all time information in the metadata is usually represented with respect to the broadcasting time line.

FIG. 3D shows the relationship between the system times of the highlight marker and the indexing master, and the corresponding media times of its stored digital stream where the system time of the highlight marker is assumed to be synchronized with that of the indexing master for simplicity. By using the $reference\_point_s$ and its corresponding $reference\_point_m$, any value of media time or frame for the stored video stream can be obtained from its corresponding system time of the highlight marker, and vice-versa. For example, for a given $mark\_in\_point_s$, its corresponding $mark\_in\_point_m$ is derived by the following equation:

$mark\_in\_point_m = reference\_point_m + (mark\_in\_point_s - reference\_point_s)$ (1)

Similarly, for a given $mark\_in\_point_m$, its corresponding $mark\_in\_point_s$ is also derived by the following equation:

$mark\_in\_point_s = reference\_point_s + (mark\_in\_point_m - reference\_point_m)$ (2)

Main Indexer for Analog Source

FIG. 3E is a block diagram of an exemplary configuration of a main indexer 302e that includes an indexing master 304 as well as various hardware devices to deal with analog video source.

In case of an analog source (signal) 318, the technique of the present invention is preferable to the method which is shown, for example, in FIG. 4 of the aforementioned U.S. Pat. No. 6,360,234 ("Jain"). Jain shows that the signal of the analog source 318 can be fed directly to the indexing master 304. Such a direct data path is different from what is shown in FIG. 3E. In the conventional configuration (e.g., Jain), the audio/video capture/digitizer board should reside inside the indexing master 304 and the digitized video frames are used for indexing. Consequently, the Jain configuration has a disadvantage that it requires an additional capture board in video cataloger workstation 111 shown in FIG. 4 of Jain, as well as its proprietary application program interfaces (APIs) to handle the capture functions. Further, if the digitized frames that are not encoded/compressed are used for indexing, they should be synchronized with the stored encoded video streams. Thus, it is preferable to use the encoded streams stored in the persistent storage of indexing master 304 for the purpose of indexing.

One important aspect of providing quick metadata service for live broadcasting is to generate the metadata containing time-based index synchronized to a broadcast program. In the exemplary configuration of FIG. 3E, the main indexer 302e comprises the analog CC decoder 306, the video encoder 310, the indexing master 304, and the pattern generator 326 that generates, in this configuration, an analog pattern and sends the analog pattern to the analog mixer 328 to mix the analog pattern with the video signal. Those modules perform similar processes as shown in FIG. 3B and described above. In the case of analog broadcasting, there is no broadcasting time in the analog source 318. Thus, in order to synchronize the main indexer 302e and the highlight marker 314 with the broadcasting time, a remote time-server (not shown) is utilized. The reference time 322 that actually represents the local broadcasting time can be acquired from a remote time-server, which would typically be based on the Internet standard protocol called NTP (Network Time Protocol). The time-server ensures accurate synchronization of the clocks of the highlight marker 314 (corresponding to 206 in FIG. 2) and the indexing master 304 that periodically send the time request to the time-server to obtain accurate time.

Highlight Marker

FIG. 4 illustrates an exemplary architecture for the highlight marker 402 (corresponding to 206, 314 in FIGS. 2, 3, 3A, 3B, and 3E) that functions as a coarse indexing module of the real-time indexer 202 in FIG. 2.

An optional CC-text manager module 404 receives CC-text from a CC-text decoder 422 in real-time, and presents the CC-text to a display screen so that a human operator can easily incorporate selected portions of the text into the description of the present highlight, simply by copy-andpasting the CC-text into the highlight marker's description field. The CC-text manager 404 can also extract keywords automatically from the CC-text and save them into a keyword dictionary, which is jointly managed by a template manager 418. The operator can then make an access to the dictionary to refer some keywords in it.

The clock 406, in case of analog broadcasting as shown in FIG. 3E, is periodically adjusted by a remote time-server. In case of digital broadcasting such as DVB and ATSC, the system time representing the current broadcast time is periodically broadcast, and it is decoded in the indexing master and can be delivered to the highlight marker to adjust the clock 406.

A graphical user interface (GUI) input 410 and a GUI update 408 are modules for interfacing with the operator, taking various inputs and updating the numerous GUI objects on the fly, respectively.

The highlight marker output 414 is a module to send the real-time metadata (coarse highlights) to the main indexer 208 in FIG. 2 when an operator decides to send the marked highlights. An exemplary message format for the metadata that is sent to the main indexer 208 in FIG. 2 is shown in FIG. 4A.

As shown in FIG. 4A, an exemplary message format 450 is structured with four layers: a top layer 452, a second layer 454, a third layer 456 and a fourth layer 458. The top layer comprises a message header field 460, a body length field 462, and a message body field 464. The message header field 460 specifies the type of messages being sent. The possible values for these types may include, for example, "Check Connection" and "Send Highlights". The former message type is used to check whether the main indexer 208 in FIG. 2 residing across the network is dead or alive, whereas the latter message type is used to indicate that the message itself contains information about captured highlights. The body length field 462 represents the length of the message body field 464. The message body field 464 comprises four parts as shown in the second layer 454. The second layer comprises a start time field 466, an end time field 468, a highlights field 470, and an annotation field 472. The start time field 466 and the end-time field 468 denote the mark-in and mark-out point in system time of highlight marker, respectively.

The highlights field 470 has two elements as shown in the third layer 456. The highlights length field 474 is a length of the highlight list field 476. The highlight list field 476 contains one or more highlight fields 478. Each highlight field 478 is made up of four fields: an ID length field 480, an ID field 482, a value length field 484, and a value field 486. The ID length field 480 is the length of the ID field. The ID field 482 contains a string to identify the type of the highlight (e.g., ID_TOUCHDOWN). The value length field 484 is the length of the value field. The value field 486 contains a textual description of the corresponding ID (e.g., "Touchdown"). The annotation field 472 is again divided into two fields: an annotation length field 488 for the size of a value field 490, and the value field 490 for textual annotation itself.

With reference again to FIG. 4, a highlight marker manager 412 plays a role of a central message controller, receiving the messages from source modules, making some intelligent decisions based on the messages and redirecting the messages to target modules so that the recipient modules may invoke operations specified in the messages. The highlight marker manager 412 also gets control over the configuration of network communication, such as the set-up of IP address and port number for the main indexer 208 in FIG. 2, so that the highlight marker output module 414 is able to communicate with the indexer correctly. The highlight mark backup 416 is a module to back up the marked highlights on a local host or remote servers in preparation for unexpected computing disasters. The backup data is against the eventuality of the highlight marker 402 crashing.

A template manager module 418 is to load appropriate highlight templates necessary for the stream to be indexed. Each highlight template comprises highlight themes that have already organized into a tree structure. The highlight templates can be classified into two kinds: highlight event templates and highlight objects templates. The highlight event templates define all significant types of highlight events for each individual genre (for example, football events) whereas the highlight object templates mostly retain the list of objects of interests (for example, the names of players participating in the ongoing match). Before the start of indexing, the template manager 418 loads the templates from the highlight template database 212 in FIG. 2 that resides at a local host or a remote server. The template manager 418 also enables the operator to edit the templates by providing a rich set of functions such as "Add a new highlight theme into an appropriate position of a highlight theme hierarchy", "Delete a highlight theme", or "Update a highlight theme". The modified templates can be saved on a local host or on a remote template server for future use.

An electronic programming guide (EPG) update module 420 can issue an "Update EPG" command with most recent EPG information to an external EPG manager directly (not shown) or to the main indexer for the purpose of fine EPG updating with a form of highlight markers. In response to this command, the EPG manager will update its EPG database with this new information. However, the EPG information maintained by the EPG manager often becomes obsolete or comes into conflict with newly developing situations. For example, sometimes a baseball match being broadcast may go into extra innings. Such occurrence of unexpected events that will affect a pre-announced programming schedule can be immediately detected or predicted by a human operator while doing real-time indexing, and can be sent to the EPG manager for the rescheduling (if appropriate) of the subsequent programs that come up after the baseball match.

The storage 421 in the highlight marker is used to store data by the modules in FIG. 4 such as CC-Text manager 404, highlight mark out 414, highlight mark backup 416, template manager 418 and EPG update 420.

Indexing Master

FIG. 5 illustrates an exemplary architecture for the indexing master 502 (corresponding to 304 in FIGS. 3, 3A, 3B, 3E), which is a fine indexing module, residing on the main indexer 208 or 210 of the real-time indexer 202 in FIG. 2. The digital stream to be indexed is stored in the storage 531 where the stream might be scrambled if necessary.

A highlight receptor module 504 performs the function of a server with regard to the highlight marker 206 in FIG. 2. Its primary objective is to monitor the communication channel between the indexing master 502 and the highlight marker 206 in FIG. 2, and receive all highlights captured by the highlight marker without errors. The connection or data transfer between the highlight receptor 504 and the highlight marker 206 in FIG. 2 can be achieved in many ways, typically by the widely known communication socket programming. The correctly received highlight information is passed on to a main indexer manager 516 for further processing, for example, attaching some detailed description to the highlight.

An offset manager 506 is responsible for synchronizing media time to reference time (refer to discussion of FIG. 3D, above). The clock 510, in case of analog broadcasting, is periodically adjusted by a remote time-server. In case of digital broadcasting such as DVB and ATSC, the system time representing the current broadcast time is periodically broadcast, and so it is decoded in the indexing master and used to adjust the clock 510.

There can arise a need for revising a metadata file even after the end of the real-time logging session. Such an off-line metadata file can be conveniently loaded into the memory of the indexing master 502 through the metadata load module 518. Furthermore, for a rebroadcast program, the metadata load module 518 is also utilized. The metadata load module 518 loads the metadata that was generated before. And then, the index master adjusts the time information in the metadata according to the broadcasting time of the corresponding rebroadcast program. The adjusted metadata is delivered to DVRs in a variety of "delivery modes" described above.

The metadata manager 520 is a software module for controlling the output of the metadata and the request for the metadata from client. Generally, the metadata manager gathers all the metadata in the memory available at the time of receiving the output request and writes the gathered metadata into a file or to a data communication channel. The metadata can be output periodically, in which case the metadata manager 520 should also schedule the timer events to occur precisely at the specified time interval. Furthermore, the metadata manager processes the client's request for the metadata received through the back channel 116 in FIGS. 1A and 1D. Alternatively, the metadata manager 520 can be located out of the indexing master 502 and can communicate with the indexing master through a network to deal with the client's request for metadata.

An EPG update module 515, as described above in the case of EPG update module of the highlight marker, can issue an "Update EPG" command with most recent EPG information to an external EPG manager (not shown) in response to a user (operator) input or to a "Update EPG" command sent from highlight markers. In response to this command, the EPG manager will update its EPG database with this new information.

Five core components (modules), shown within a dashed line, are provided for integrated real-time video indexing: a visual rhythm generator/management 522, a media player 524, a shot detector 526, a highlight tree builder 528, and a key frame list view module 530.

The visual rhythm generator/management module 522 is a component to decode an input encoded video stream to create a visual rhythm representation thereof. Generally, visual rhythm is a known technique whereby a video is subsampled, frame-by-frame, to produce a single image which contains (and conveys) information about the visual content of the video. It is useful, inter alia, for shot detection. A visual rhythm image is a long narrow image stripe with some distinctive visual patterns on it. The generation of Visual Rhythm is discussed in greater detail below with respect to FIGS. 11A-11D.

The media decoder/player module 524 is responsible for parsing video streams and showing the live broadcast on a player panel as well as playing back specific video segments designated by a user. The player can handle any video formats, for example, ASF, MPEG-1, MPEG-2 and MPEG-4.

The shot detector module 526 is a software module for detecting shots present in the video content. A shot is regarded as a minimum feasible video segment. A set of the shots often conveys a certain semantic meaning. The shots (group of shots) are basic building blocks to construct more intuitive and semantically meaningful content description tree. Any shot detection methods may be used, but the method proposed by H. Kim, et al. in "Visual rhythm and shot verification", Multimedia Tools and Applications, Kluwer Academic Publishers, Vol. 15, No. 3 (2001) is preferred for the present invention. In the paper, the definition and roles of the visual rhythm are also described in detail.

The highlight tree builder module 528 is responsible for automatically constructing a highlight hierarchy according to the list of categorized highlight themes in the highlight template used. Highlight themes or highlight theme categories/subcategories in the list of categorized highlight themes can be prepared statically before the indexing process or added into the list dynamically while the indexing is performed. In the first case, the indexing master 502 creates all the highlight themes in advance according to the predefined highlight theme categories/subcategories in the highlight template database. On the other hand, the dynamic creation makes new highlight themes in the run-time whenever it is necessary and adds them into the existing list. Compared with the dynamic creation, the static creation has a disadvantage that it will create many useless categories with no entries or highlights underneath them. It is common that the highlight theme category/subcategory classification will be different from genre to genre or from game to game. Furthermore, in case of sports games, the roster of participating players can be also changed at all times. For efficient real-time indexing, these kinds of data should be predefined into some "highlight templates" in advance. The template manager 508 communicates either through the highlight receptor 504 with the highlight marker 206 or the highlight template database 212 in FIG. 2 to carry out various template-related tasks, including creating a new template, deleting existing templates, reading the templates into the memory or updating the templates by adding elements into, deleting elements from, and changing elements of the highlight templates.

The key frame list view module 530 shows and manages all the key frames under the current category node. Each marked highlight is associated with a single representative image, called a "key frame". The key frame can be selected from any frames ranging over the interval of highlight. While watching the key frames, users can put some description into them or play back the corresponding video segments. While cataloging the content, the user gives the indexing master 502 a variety of input data such as annotation for highlight segments or button clicks to execute particular tasks. This kind of user input is received through the GUI input element 514. The GUI update element 512 is responsible for automatically detecting the GUI objects that require a display update and changing them with the most recent information.

A main indexer manger module 516 performs the function of a central hub for exchanging information (messages, signals, or data). The main indexer manger 516 collects all the messages from the source modules, and routes the messages through an internal decision network to the correct target modules. For example, the main indexer manger 516 receives coarse highlight information from the highlight receptor 504. The main indexer manger 516 then analyzes the information and routes it to the visual rhythm generator/management module 522, the key frame list view module 530 and the highlight tree builder module 528. The visual rhythm generator/management module 522 may use the received information to mark the location of the highlight on the visual rhythm. Similarly, the key frame list view module 530 may come up with the key frame image associated with the given highlight, and the highlight tree builder 528 automatically may locate the highlight at appropriate positions of a highlight hierarchy being generated.

Copyright and Trademark Notice

In the discussions that follow, the game of American style football is used as an example of the type of video programs that can be indexed utilizing the present invention. It should, however, clearly be understood that the applicant has no relationship with the National Football League (NFL) or any of its players, and defers to any and all trademarks and copyrights of the NFL and/or its players. Furthermore, it should be understood that although the present invention is being described in the context of a football game, it is applicable to any type of video program, such as theatrical presentations, news broadcasts, etc.

Metadata Service Using EPG

It is an object of the invention to provide a technique for indexing digitally broadcast TV programs based on broadcasting time or its equivalent representation, if NPT values are not available. One of the solutions to overcome the ambiguity with the concept of media time for broadcast TV programs as described previously, is to use broadcast time. Alternatively, the broadcast time can be represented as a sum of an arbitrary reference time and relative time with respect to the reference time. Thus, if a reference start time for each broadcast program is available, a media time with respect to the reference start time can be used for locating a part of media stream. For this purpose, the EPG that is delivered through the interactive network or broadcasting network can be utilized. The EPG contains the information such as start and end broadcasting times of broadcast programs. Thus, the media time for each broadcast program can be obtained relative to the start time of each broadcast program described by EPG. It should be noted that the start and end times contained in EPG are often inaccurate due to a variety of reasons such as unexpected change of broadcast schedule. However, the possible inaccuracy of EPG is not a problem in this case since the start time for each program is just used as an imaginary reference time point from which the media time is measured, but it is important for both indexing system and clients to use the same reference start time for each program. On the other hand, in case of broadcasting a program which has been already authored, the reference time of respective metadata can be adjusted by using updating EPG through EPG update module 420 or 515. If NPT values are also broadcast, they can be directly used to generate the metadata instead of broadcast times. Alternatively, broadcast times can be converted to the corresponding NPT values.

Highlight Templates

FIGS. 6(A, B and C) shows three exemplary highlight templates for football games in the highlight template database 212 in FIG. 2. In this example, there are two kinds (types) of highlight templates—highlight event template and highlight object template. However, the classification can be further subdivided in many other ways. In sports games, the highlight events are related with important actions or activities of the game (e.g., touch down, field goal, penalty, extra point), while the highlight objects are directly associated with the active players who might play a conspicuous role in the game. The highlight event or object template is a list of categorized keywords that are carefully chosen as key themes describing highlights. The contents of the highlight event/object templates will vary from genre to genre or game to game.

FIG. 6 shows a highlight event template 602 for football games, and two highlight object templates 604 and 606 for selected football players of the San Francisco 49ers and Minnesota Vikings football teams, respectively. In the highlight event template 602, there are thirteen football highlight event themes such as "Field goal", "Touchdown", "Extra point", "Two point conversion", "Long run", "Long pass", "Intercept", "Big hit", "Defensive pass interference", "Holding", "Offside", "Penalty", "Unsportsmanlike conduct". The first four are categorized as "Scoring", and the others as "Feature plays". Further, the "Scoring" category has a subcategory titled "Point after" which includes "Extra point" and "Two point conversion". The "Feature plays" category also has four subcategories of "Big gains", "Interceptions", "Big hits", and "Big penalties", each of which has their own highlight event themes. That is, the highlight event template 602 provides a list of categorized highlight event themes for football games.

Similarly, in the highlight object templates 604 and 606 for San Francisco 49ers and Minnesota Vikings, there are seven and nine famous players under the categories "SF 49ers" and "MN Vikings" respectively. In these highlight object templates for football games, the player names become the highlight object themes. The highlight object templates 604 and 606 provide two lists of categorized highlight object themes for the football teams. The players in the templates 604 and 606 could be organized/categorized with headings such as "Offense", "Defense", "Special Team" and, given the limited display space, could be prioritized by prominence (and a scrollbar included to access entries lower in the lists).

Highlight Hierarchy

FIG. 7 shows an exemplary highlight hierarchy that is automatically constructed by the highlight tree builder 528 in FIG. 5, and the relationship between the highlight hierarchy and the video highlights captured by the highlight marker 206 in FIG. 2. The highlight hierarchy 700 has the captured highlight instances as its leaf nodes that are grouped into non-leaf nodes representing highlight events or objects, thus giving a quick, concise, and diverse look at the contents by highlight events, players in action, slow motion of critical moments, highlight replay of featured plays, etc. The shape and depth of the highlight hierarchy depend on the highlight templates used. The highlight hierarchy 700 is constructed according to the three highlight event and object templates in FIG. 6.

The highlight hierarchy 700 has a root node 702 whose title explicitly implies that the hierarchy being constructed is for a football match between San Francisco 49ers and Minnesota Vikings. Generally, the root node 702 comprises any number of child nodes as long as they are necessary for the well-defined description of the highlights. One special node 704 labeled "Highlight collection" is reserved to keep all the captured highlights under this node in a temporal order of captured time. The other sibling nodes 706, 708, 710 and 712, called "category" nodes herein, are created to describe the highlight football events and objects (players), category by category, in more concrete ways. These category nodes are created according to the three highlight templates (602, 604, 606) in FIG. 6. There are two event categories "Scoring" and "Feature plays" in the highlight event template 602, and one object category "SF 49ers" and "MN Vikings" in the highlight object templates 604 and 606 in FIG. 6 respectively.

A category node may contain any number of subcategory nodes and highlight theme nodes each of which corresponds to subcategory or highlight event/object theme in the highlight templates used. For example, the category node "Scoring" 706 takes as children one subcategory node labeled "Point after" 718, and two highlight theme nodes labeled "Field goal" 714 and "Touchdown" 716. Again, the subcategory node "Point after" 718 has two highlight theme nodes "Extra point" 720 and "Two point conversion" 722. All those nodes correspond to the entries of the list of categorized highlight theme in the highlight event template 602 in FIG. 6.

Similarly, the category node "MN Vikings" 712 has nine highlight theme nodes according to the nine key players in the highlight object template 606 in FIG. 6, though only the two highlight theme nodes labeled "Lucas" 724 and "Hardy" 726 are shown up in FIG. 7. In the highlight hierarchy 700, the rectangular nodes with rounded corners (706, 708, 710, 712, 718, 760, 762, 764, 766) symbolize the category or subcategory nodes, and may be colored distinctively. The rectangular nodes without rounded corners symbolize the highlight theme nodes, and may be colored distinctively to distinguish them from the category/subcategory nodes. The rectangular node 704 with a heavy border and a "X" in it symbolizes a special node labeled "Highlight collection", and may also be provided with visual indicia indicating its distinctiveness from the other types of nodes in the tree diagram.

Some captured highlights are marked on the timeline 730 at the bottom of the figure. Five highlights are shown together with one or more highlight themes that are attached to the highlights by the highlight marker 206 in FIG. 2. The attached highlight themes describe the type of the highlight events and the players involved in the highlight. For example, the captured highlight 732 represents a moment for "Touchdown" by "Lucas". In the figure, three highlights 732, 734 and 738 have highlight event and object themes and the other two highlights 736 and 740 have highlight event theme only. As mentioned above, the "Highlight collection" node 704 of the highlight hierarchy is a place to keep all the captured highlights in a temporal order for the content being indexed. FIG. 7 shows the five highlight instances 732, 734, 736, 738 and 740 as children 742, 744, 746, 748 and 750 of this node. In the figure, the captured highlight instances 742, 744, 746, 748 and 750 under the "Highlight collection" node 704 are represented as black circular nodes.

According to the invention, as soon as the highlights are captured, the highlight tree builder 528 in FIG. 5, will automatically register the highlights into appropriate positions of the highlight hierarchy being generated according to their highlight themes attached. That is, each highlight instance under the "Highlight Collection" node 704 is reassigned to the specific highlight theme nodes in order to enable the quick, easy, and diverse navigation of the content by specific theme (actions or players). For example, as soon as the highlight 732 is captured, three instance nodes (one 742 for "Highlight collection" 704, another 752 for "Touchdown" 716, and the other one 754 for "Lucas" 724) are created and added into the hierarchy, as shown in the figure. In the case of the highlight 740, it has a single highlight theme so only two instance nodes (one 750 for "Highlight collection" 704, and the other one 756 for "Touchdown" 716) are created and inserted into the hierarchy. In the figure, the reassigned highlight instance nodes are represented as white circular nodes.

GUIs of Highlight Marker and Indexing Master

FIG. 8 is an example GUI object to visualize the operation of the highlight marker 206 in FIG. 2, a coarse indexer. The highlight marker comprises five functional regions: list of captured highlights 802, list of highlight events 804, list of highlight objects (players) 806, panel of control buttons 808, and text input 810.

All the captured highlights come under the list of captured highlights 802. Each highlight entry may have five data fields: an indicator 812 to check whether the captured highlight has been sent to the main indexer 208 in FIG. 2, a flag field 814 to represent the status or special information about the current entry, a field 816 for mark-in point in system time of highlight marker to describe a time point of capturing the highlight, an field 818 for mark-out point in system time of highlight marker to describe a time point of the end of the highlight, and a highlight theme field 820 to briefly describe the type of the highlight events and the objects involved in the highlights. The mark-in point 816 is required, but the mark-out point 818 is optional. The flag field 814 displays several tiny icons (arrow, finger, analog tape, etc.) to symbolize, for instance, whether the current entry is for the replay of prior highlights, or whether the current entry is concerned with the report of games occurring in other places.

The icons in the field 814 are "redundant" visual representations of the five special events corresponding to the five control buttons 808 labeled "GU start", "GU end", "Highlight replay", "Slow motion" and "Other stadium" (which are also described in the highlight theme field 820). When one of the special events is captured by clicking on one of their corresponding control buttons, their description will be shown in the highlight theme field 820 and its corresponding icon will also be shown at the flag field 814. This symbolic representation is intended as a visual aid to a human operator.

Before the start of indexing, a human operator of the highlight marker 206 in FIG. 2 searches the highlight template database 212 in FIG. 2 for the matching highlight templates. In case of indexing of a football game, the operator might select a football event template such as the template 602 and two football object templates such as the player templates 604 and 606 in FIG. 6. The selected templates are then loaded into the highlight marker. The loaded football event template is displayed on the list of highlight events 804 by enumerating all possible highlight event themes defined in the template. Similarly, the two selected football object templates are displayed on the list of highlight objects 806. If the operator captures a particular highlight and double-clicks some highlight event or object themes describing the highlight on the list of highlight events 804 or objects 806, then the selected highlight event or object themes are put into the highlight theme field 820 of the list of captured highlight 802. The highlight event and object templates can be defined a priori and maintained throughout the entire system, the real-time indexer 202 in FIG. 2. The templates can be edited by adding, deleting, and updating highlight themes or highlight theme categories in the templates. Also, the edited templates can be saved again into the highlight template database 212 in FIG. 2 for future use.

Some useful control buttons for the user making inputs are deployed on the panel of control buttons 808. The "Mark-in" and "Mark-out" buttons are used to capture the start and the end time stamp of captured highlights, respectively. The "Send" button is used to send the specified highlight such as the highlight 822 to the main indexer 208 in FIG. 2, a fine indexer. Different sports have different names to designate the division of the playing time: to name a few, quarter for football, inning for baseball, set for tennis, and period for ice hockey. This division of the playing time is called GU (Game Unit) herein. The "GU start" and "GU end" buttons are for recording the beginning and the end time of the game units, respectively. Some critical moments or turning points of the game are shown repeatedly during the live sports broadcast. The "Highlight replay" button is triggered to catch such moments or scenes. Further, the "Slow motion" button is for capturing the highlights replayed in slow motion. During the broadcast of a sports game, it is frequently observed that another reporter in other stadiums appears on the TV screen and reports the scores and status of the other games taking place at the same time. "Other stadium" button is to seize the very moment of reporting the scores or status of such games.

The five control buttons "GU start", "GU end", "Highlight replay", "Slow motion" and "Other stadium" except "Mark-in", "Mark-out" and "Send" buttons represent special highlight event themes which usually occur in many sports games. By clicking the buttons, their corresponding event themes are added into the specified highlight such as the one 824.

A short description or additional annotation about the highlight can be entered by the user in the text input field 810.

Although not illustrated in the highlight hierarchy such as the one 700 in FIG. 7, there may be a category node labeled "Special events" as a child of the root node (e.g., 702). The Special Events category node would have five highlight theme nodes labeled "GU start", "GU end", "Highlight replay", "Slow motion" and "Other stadium", respectively, as children nodes. Each captured highlight instance having specific special events is located under the corresponding highlight theme node as a child (highlight instance node). Thus, users can selectively browse and navigate only small set of highlights according to their favorite special events. The five special events can be expanded or edited according to the genre.

A simple scenario for using the GUI of the highlight marker in FIG. 8 is as follows.

- a) Before start of indexing, the user elects and loads appropriate highlight templates from the highlight template database 212 in FIG. 2.
- b) While watching a live broadcast program such as a sports game on the TV 204 in FIG. 2, the operator makes an input by clicking on the "Mark-in" button when a critical moment of interest is happening. A new highlight entry will be created in the list of captured highlights 802 and the captured time stamp is recorded into its "Mark-in" field 816. The "Mark-out" button can be clicked any time hereafter, if the mark-out point in system time of highlight marker has got to be captured as well.
- c) Determine the highlight event themes for the captured moment, if any, by referring to the categorized list in the list of highlight events 804. The selected highlight event themes will be inserted into the highlight theme field 820 of the new entry.
- d) Likewise, determine the highlight object themes (players) associated with the selected highlight, if any, in the list of highlight objects 806.
- e) Likewise, determine any special event themes associated with the selected highlight, if any, by clicking some of the five buttons in the panel of control buttons 808.
- f) Type in (enter) some detailed explanation about the highlight into the text input 810, if necessary.
- g) Now click the "Send" button to deliver the highlight to the main indexer 208 in FIG. 2. After the successful delivery, the check mark will appear on the column 812.

FIG. 9 is an exemplary GUI object to visualize the operation of the indexing master 304 of the main indexer 302, 302a, 302b and 302e (corresponding to 208 or 210 in FIG. 2) in FIGS. 3, 3A, 3B and 3E respectively, a fine indexer. The GUI 900 for the indexing master 304 in FIGS. 3, 3A, 3B and 3E comprises six interacting windows: a visual rhythm 902, a list of adjacent frames 904, a highlight hierarchy 906, a list of highlighted key frames 908, a video player 910, and an information panel 912.

The visual rhythm window 902 displays the visual rhythm with some blue triangles. A special symbol, such as a blue triangle, on the top of the visual rhythm signifies the location where a shot boundary is found. Only a contiguous portion of the overall visual rhythm need be displayed at any given time. Any suitable sub-sampled image with means for indicating the shot boundaries can be substituted for the visual rhythm and special symbol. Visual rhythm is described in greater detail with respect to FIGS. 11A-E.

As a frame 914 is selected on the visual rhythm 902, the neighboring frames 916 around (immediately before and after) the selected frame 914 show up in the list of adjacent frames window 904, which allows one to find the frame discontinuity (i.e., shot boundary) simply by looking over the sequence of consecutive frames, thereby to create a new shot or to delete the falsely detected shots. A similar blue triangle 918 as the one (916) on the visual rhythm for the selected shot also appears on the first frame of a shot. The frame with star symbol 920 means that it is a key frame of the shot. Further, the window 904 can be toggled to show the key frames of the detected shots, instead of the sequence of continuous frames.

The highlight hierarchy window 906 maintains the highlight hierarchy like the one depicted in FIG. 7. The way of expanding and collapsing tree nodes is similar to the well-known Windows Explorer on Microsoft Windows.

The list of highlighted key frames window 908 lets the user keep the list of all the key frames of captured highlights. As a new highlight is captured, its key frame is registered into the end of this list.

The video player window 910 is used to play back ordinary video segments or highlighted video segments on demand, with VCR-like controls such as play, stop, pause, fast forward, fast backward, and so on. Further, this window can be switched to display the live video stream being broadcast.

The information panel window 912 is a place to display some detailed information that may be produced during the fine indexing process. Some examples of such information are the highlights just received from the highlight marker 206 in FIG. 2 or the shots detected on the fly.

Using the above windows (902, 904, 906, 908, 910, 912), the process of elaborating or refining (fine indexing) a new captured highlight can proceed as follows. Upon receiving a new highlight from the highlight marker 206 in FIG. 2, the indexing master 304 in FIGS. 3, 3A, 3B, 3E first figures out where to put the captured highlight on the visual rhythm 902, then indicates the presence of the highlight at the computed location with a visually-distinctive (e.g., colored) bar segment 922 under the detected shot on the visual rhythm (since the highlight typically occurs over an interval). At the same time, a highlight instance node 924, which may also be colored so as to be noticeable (and in the same color as the colored bar segment 922 so as to indicate an association therewith), corresponding to the newly accepted highlight is automatically created and included into the highlight hierarchy under the special node labeled "Highlight collection". The corresponding key frame 926 is also emphasized by making the edge of the frame prominent, such as in the same color as the colored segment 922. Similarly, another two highlight instance nodes are made under the highlight theme nodes labeled "Touchdown" and "Player 1" though only the instance node 928 under the "Touchdown" is shown in the figure. This node 928 may be emphasized by using the same color as the colored bar segment 922. It should be understood that, even if the four objects 922, 924, 926 and 928 look different in form and appearance, they actually represent the same concept or internal data structure.

After this automatic manipulation by the indexing master, many other manual operations may ensue. For example, if an operator (user) wants to adjust the interval of the current highlight, he can resize the length of the bar segment 922, as desired, by drag-and-dropping the ends of the bar segment 922. The length of the bar segment 922 represents the duration of the current highlight relative to that of whole video being indexed. Also, if the operator wants to attach a short description to the current highlight, he can click the right mouse button on the image 926 or the instance node 924 or 928, which will cause a text annotation box pop up.

GUIs of Highlight Browser

FIGS. 10A-10E demonstrates five examples of TV screenshots of a typical highlight browser for football games running on DVR clients. Using the metadata including the highlight hierarchy 700 in FIG. 7 that is delivered in real time, the DVR client allows a viewer to effectively browse through the lengthy content in many ways.

Figure 10A:
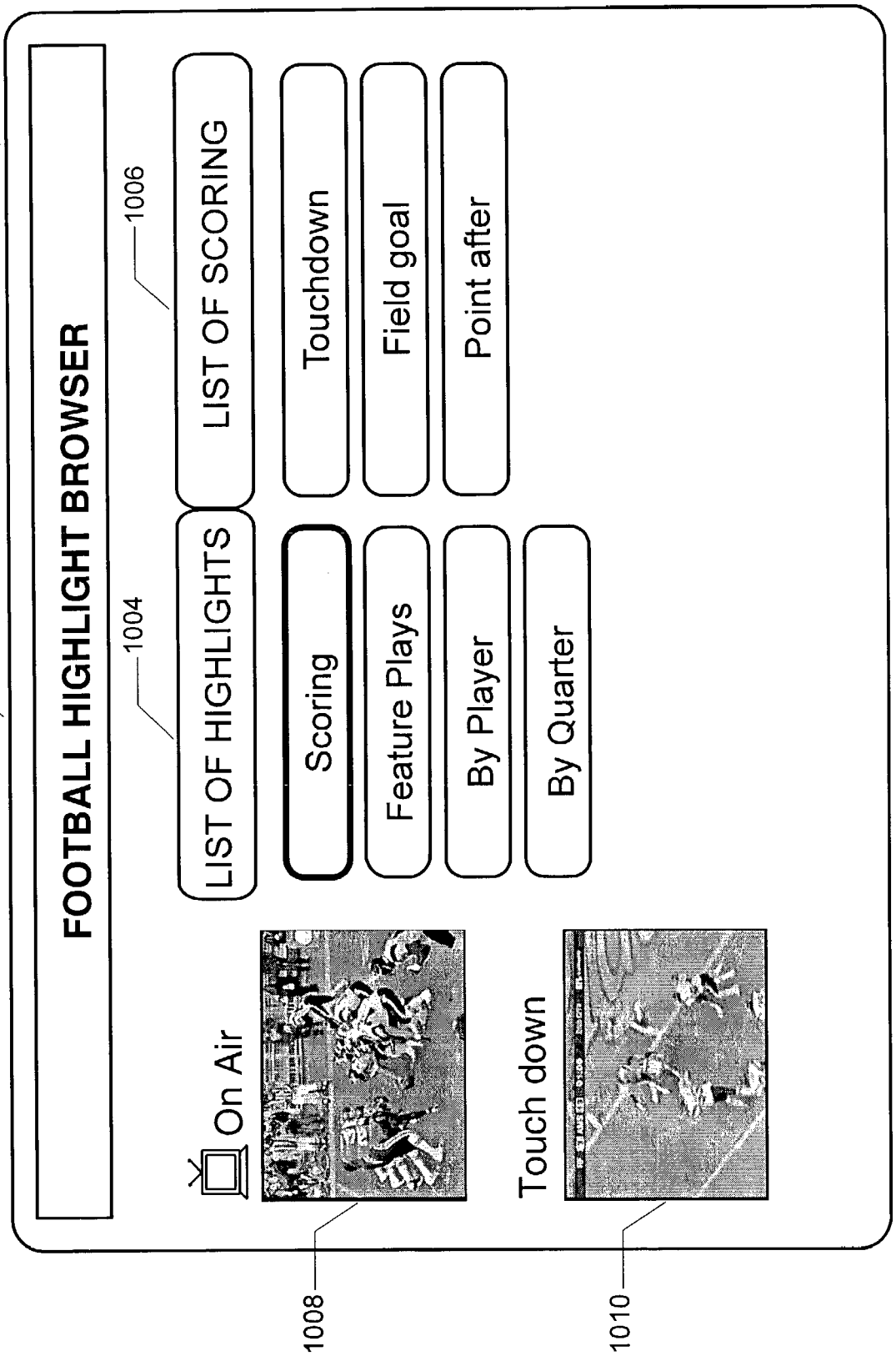

The screenshot in FIG. 10A shows a first level page 1002 of the highlight browser for such metadata service on TV screen. The first level page 1002 visualizes the status of four major components: a view of main menu 1004, a view of secondary menu 1006, a view of broadcast program 1008, and a view of key frame 1010. The view of main menu 1004 provides a list of menu items that are derived from the category nodes of the highlight hierarchy 700 in FIG. 7. Four top browsing menus are provided in the view of main menu 1004: "Scoring", "Feature plays", "By player", and "By quarter".

The menu items "Scoring" and "Feature plays" are for the "Scoring" 706 and "Feature plays" 708 category nodes in FIG. 7, respectively. The menu item "By player" is for the "SF 49ers" node 710 and "MN Vikings" 712 category nodes. The menu item "By quarter" is for the "Highlight collection" node 704 that contains highlight instances in a temporal order. The "Touchdown" submenu item of the "Scoring" menu item is described with respect to FIG. 10B. The "Feature Plays" menu item is described with respect to FIG. 10C. The "By Player" menu item is described with respect to FIG. 10D. The "By Quarter" menu item is described with respect to FIG. 10E.

When the "Scoring" menu item is selected, its submenus will appear on the view of secondary menu 1006. When the viewer navigates through the menu items of the views of main menu 1004 or secondary menu 1006, a key frame of a representative highlight instance for the main or submenu item having current attention will be displayed in the view of key frame 1010. Also, while navigating the menus, the view of broadcast program 1008 shows the program being broadcast.

Figure 10B:
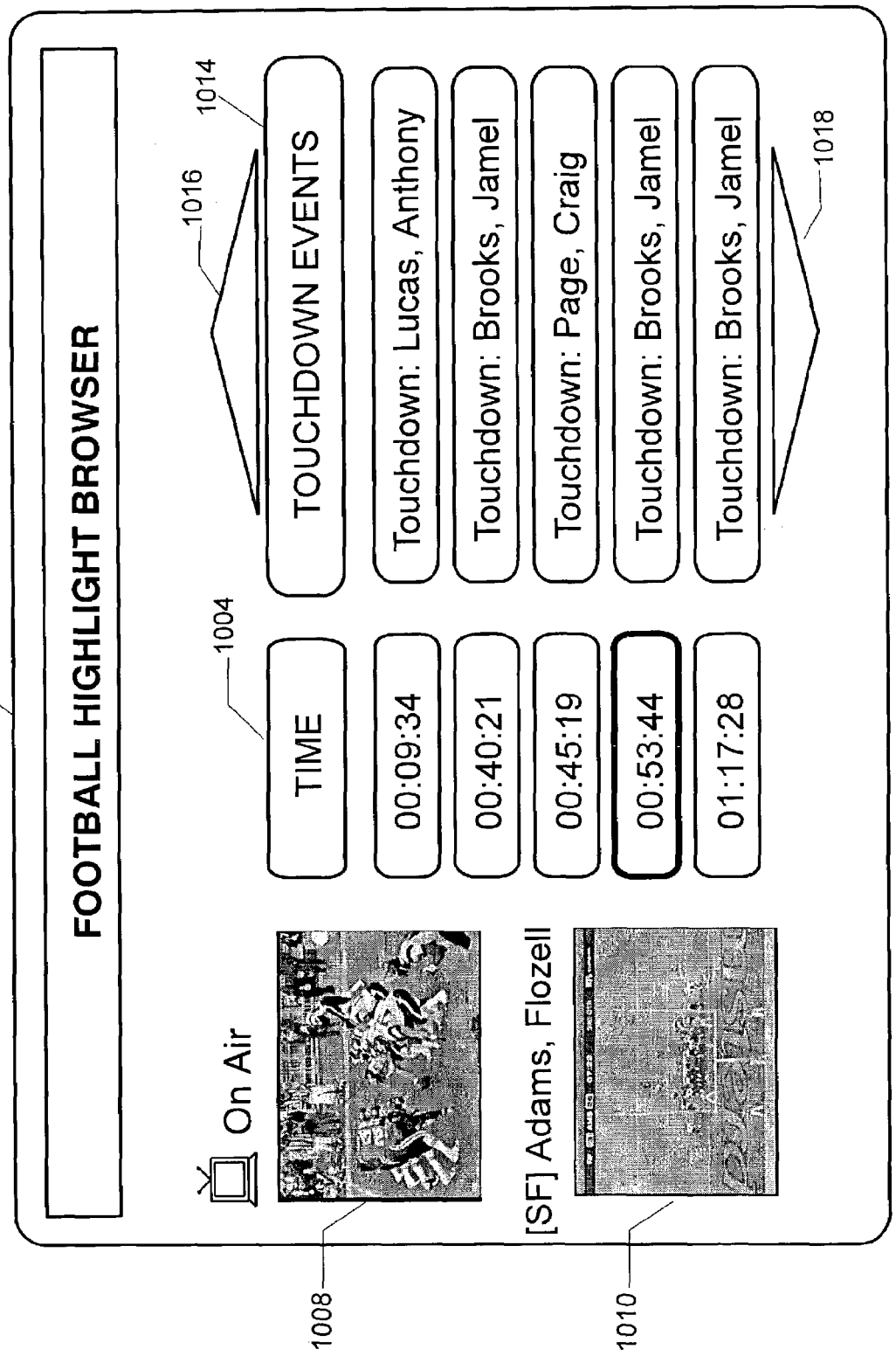

If the viewer chooses the submenu item "Touchdown" in FIG. 10A, a list of highlights 1014 will show up, as illustrated in the screenshot 1012 of FIG. 10B. This second level page 1012 in FIG. 10B visualizes the status of three major components: a view of highlights 1014, a view of broadcast program 1008, and a view of key frame 1010. The difference between the first and second level pages 1002 and 1012 is that, in the second level page, the view of highlights 1014 appears instead of the two views of main and secondary menu 1004 and 1006. The view of highlights 1014 provides a list of highlight instances that belong to the selected submenu item "Touchdown". If the list has many instances that cannot be displayed on a single screen, two scroll buttons 1016 and 1018 will appear. The viewer can use the scroll buttons to see any part of the list of all touchdowns occurring during the entire game. When the viewer selects a highlight instance (e.g., Touchdown: Brooks, Jamel), the second level page 1012 will disappear and the selected highlight will be played on the whole TV screen.

Figure 10C:
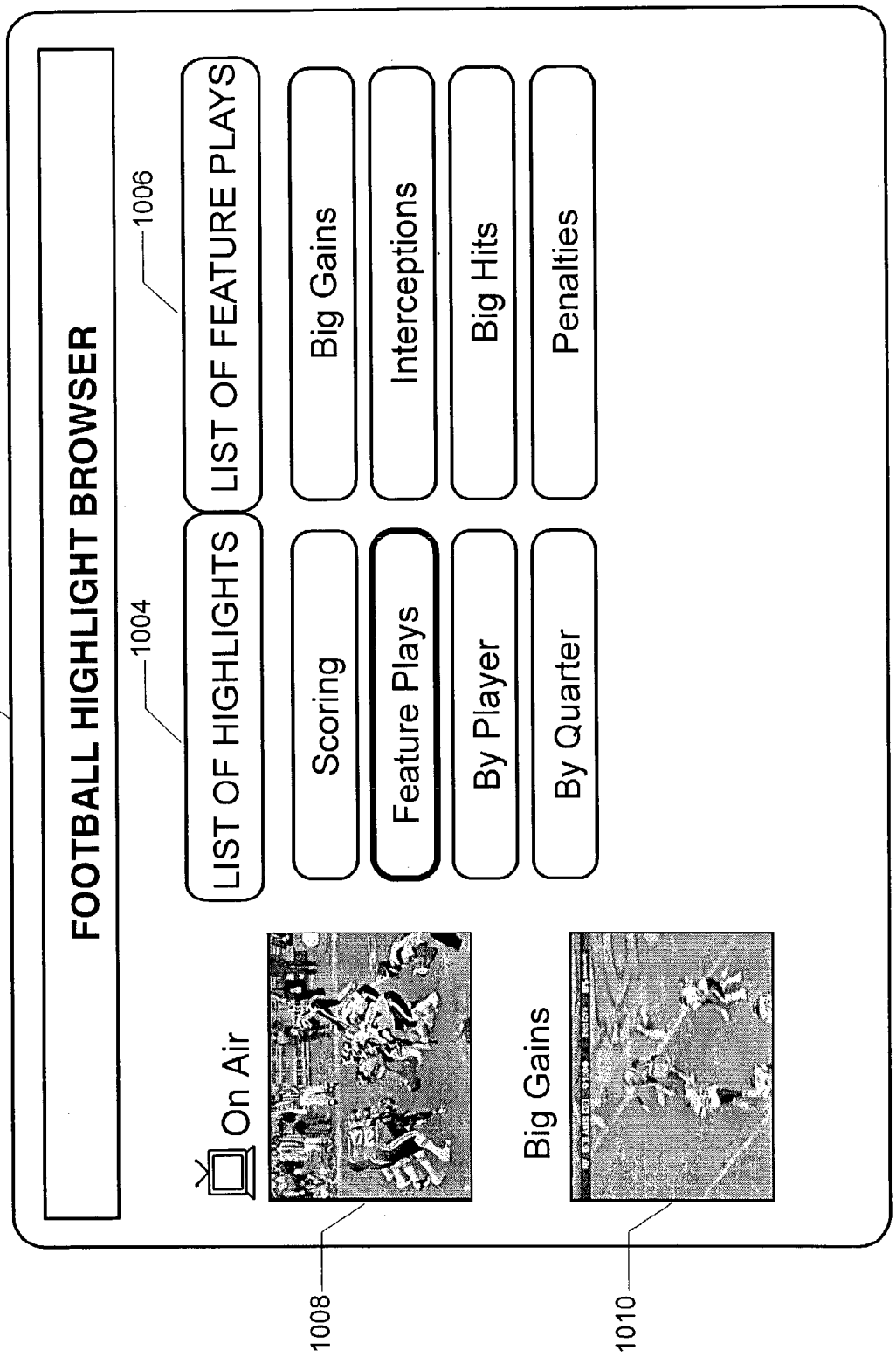
Figure 10D:
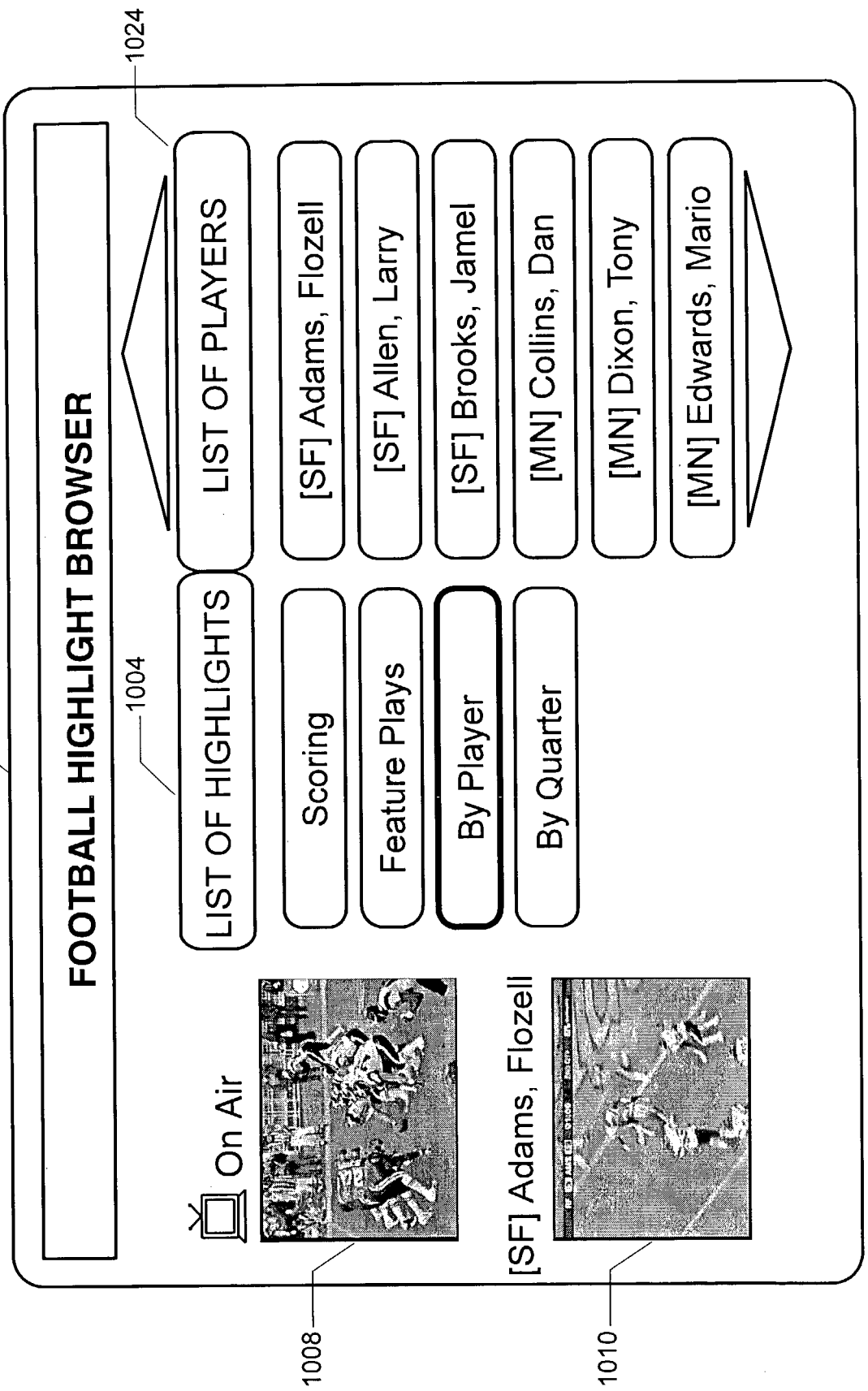
Figure 10E:
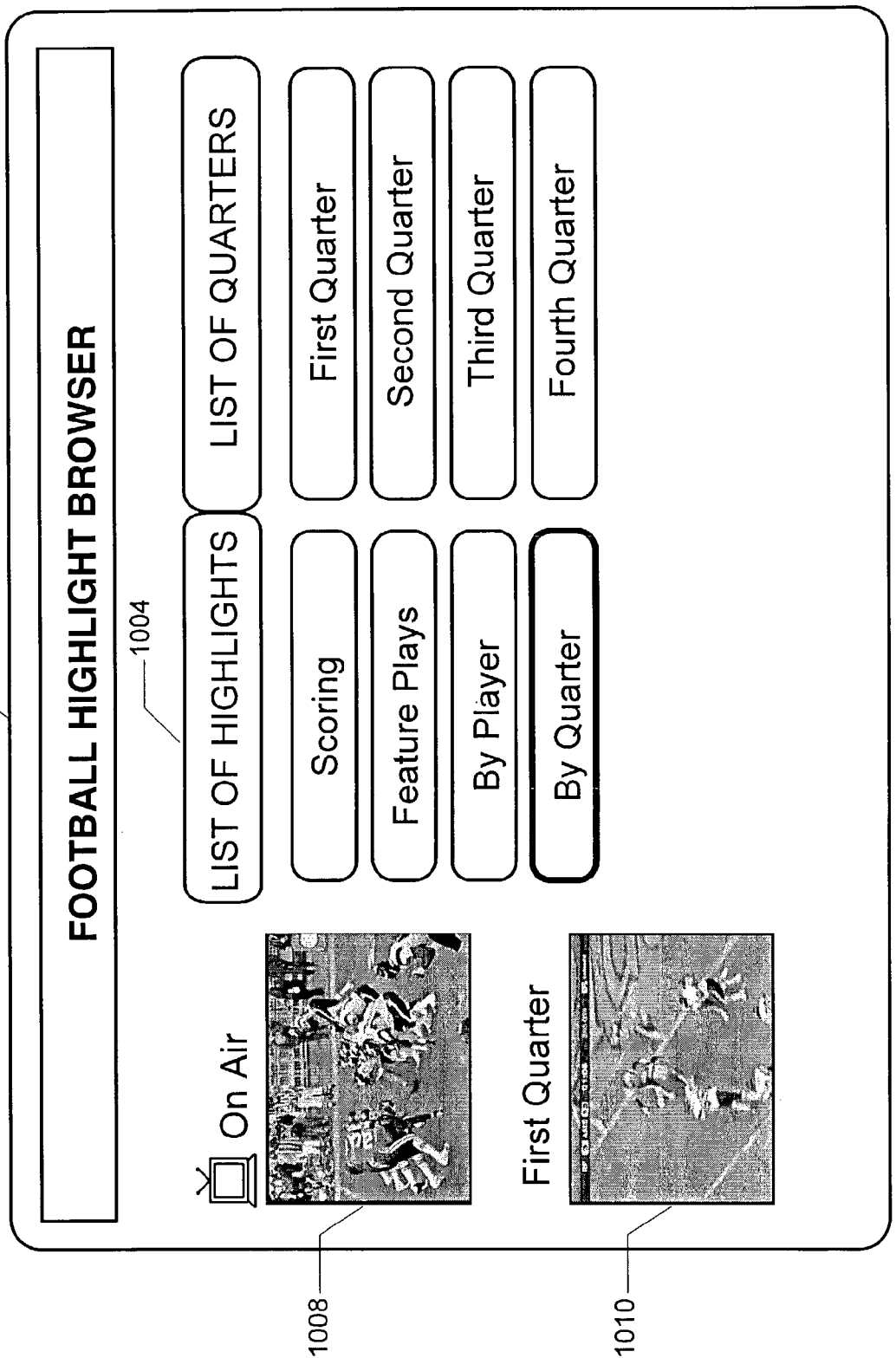

Likewise, FIGS. 10C, 10D, and 10E are screenshots 1020, 1022, and 1026 of first level page when the "Feature plays", "By player", and "By quarter" menus are selected, respectively. In any case, the viewer can look over the list of submenus to select what he wishes to watch. Further, the screen layout may be rendered differently from user to user according to the viewer's personal taste or viewing preference. In FIG. 10D, for example, if San Francisco 49ers is the viewer's favorite football team, then only the players of San Francisco 49ers may appear in the view of secondary menu 1024. This kind of customization can allow the viewer to get personalized highlights of his favorite team or players.

In use, the user (TV viewer) may control the highlight browser interactively with a DVR remote controller. The browser may be controlled by as few as six buttons on a DVR remote controller: a metadata button, four direction buttons (pointing to up, down, left and right respectively) and a play button (which may be located at the center of the four direction buttons). When the metadata button is pressed, the browser (GUI) appears on TV screen instead of the broadcast program. If the metadata button is pressed again, the GUI disappears and the broadcast program appears again in the whole screen. The metadata button acts as a toggle. The four direction buttons are used for navigating main/submenu items and highlights. The play button is used for playing a selected highlight.

Generating Visual Rhythm

As mentioned above, visual rhythm is a known technique whereby a video is sub-sampled, frame-by-frame, to produce a single image (visual timeline) which contains (and conveys) information about the visual content of the video. It is useful, inter alia, for shot detection. A visual rhythm image is typically obtained by sampling pixels lying along a sampling path, such as a diagonal line traversing each frame. A line image is produced for the frame, and the resulting line images are stacked, one next to the other, typically from left-to-right. Each vertical slice of visual rhythm with a single pixel width is obtained from each frame by sampling a subset of pixels along a predefined path. In this manner, the visual rhythm image contains patterns or visual features that allow the viewer/operator to distinguish and classify many different types of video effects, (edits and otherwise), including: cuts, wipes, dissolves, fades, camera motions, object motions, flashlights, zooms, etc. The different video effects manifest themselves as different patterns on the visual rhythm image. Shot boundaries and transitions between shots can be detected by observing the visual rhythm image which is produced from a video. Visual Rhythm is described in an article entitled "An efficient graphical shot verifier incorporating visual rhythm", by H. Kim, J. Lee and S. M. Song, Proceedings of IEEE International Conference on Multimedia Computing and Systems, pp. 827-834, June, 1999.

FIGS. 11(A-D) shows some examples of various sampling paths drawn over a video frame 1900. FIG. 11A shows a diagonal sampling path 1902, from top left to lower right, which is generally preferred for implementing the techniques of the present invention. It has been found to produce reasonably good indexing results, without much computing burden. However, for some videos, other sampling paths may produce better results. This would typically be determined empirically. Examples of such other sampling paths 1104 (diagonal, from bottom left to top right), 1106 (horizontal, across the image) and 1108 (vertical) are shown in FIGS. 11B-D, respectively. The sampling paths may be continuous (e.g., where all pixels along the paths are sampled), or they may be discrete/discontinuous where only some of the pixels along the paths are sampled, or a combination of both.

FIG. 11E is a diagram showing a portion 1110 of a visual rhythm image. Each vertical line in the visual rhythm image is generated from a frame of the video, as described above. As the video is sampled, the image is constructed, line-by-line, from left to right. Distinctive patterns in the visual rhythm indicate certain specific types of video effects. In FIG. 11E, straight vertical line discontinuities 1120A, 1120B, 1120C, 1120D, 1120E, 1120F, 1120G and 1120H in the visual rhythm image 1100 indicate "cuts", where a sudden change occurs between two scenes (e.g., a change of camera perspective). Wedge-shaped discontinuities 1130A, 1130C and 1130D, and diagonal line discontinuities 1130B and 1130E indicate various types of "wipes" (e.g., a change of scene where the change is swept across the screen in any of a variety of directions).

Capturing Highlights

FIG. 12 is the flowchart of a process for capturing coarse highlights, which is executed on the highlight marker 206 in FIG. 2. This process is performed in tight collaboration with a fine indexing process in FIG. 13 that makes coarse highlights into complete ones. This tight cooperation between the two processes, sharing the knowledge about captured highlights, is one of significant features disclosed by the present invention.

FIG. 14 is a flowchart showing the highlight registration process referred to in FIG. 13.

FIG. 15 is a flowchart showing the regular indexing process referred to in FIG. 13.

FIG. 16 is a flowchart showing the visual rhythm creation process referred to in FIG. 13.

The coarse indexing process begins at step 1202 followed by step 1204 where the establishment of data connection with the indexing master 304 in FIGS. 3, 3A, 3B and 3E is inspected. This inspection continues until the connection is successfully established. After the successful establishment, the control proceeds to step 1206 to start up a certain initialization and read appropriate highlight event/object templates into the memory from the highlight template database 212 in FIG. 2. It is these templates that simplify the capturing process so that it requires only a couple of mouse clicks on the GUI of the highlight marker in FIG. 8. The start time of a certain highlight, the mark-in point in system time of highlight marker, is captured at step 1208 and the process proceeds to step 1210 to decide (determine) if more ancillary data should be attached to the highlight. If not, the captured highlight is immediately sent to the indexing master 304 in FIGS. 3, 3A, 3B and 3E for further processing at step 1224. Alternatively, when the connection cannot be established in the step 1204, the highlight marker can skip the connection step and go on the following processes using local storage 421 to save marked highlights and to load templates stored in the local storage 321. When the connection is available, the highlight marker sends the marked highlights stored in local storage 421 to the main indexer.

In a step 1226 it is decided (determined) whether capturing still remains to be done. If so (yes), then the control gets back to step 1208 to capture another highlight. If not, the capturing process ends at step 1228.

If the decision at step 1210 is positive (yes), the type of the ancillary data is determined at step 1212. If the type determined is "Event Type", the control moves to step 1214 to attach highlight event themes into the captured highlight. Similarly, the highlight object themes, the short description, the mark-out point in system time of highlight marker, the special event themes ("GU start", "GU end", "Highlight replay", "Slow motion" and "Other stadium" in FIG. 8) can be added into the current highlight at steps 1216, 1218, 1220, 1222 respectively. After the addition of such an ancillary data, the control now loops back to step 1210 to repeat the process of determining whether more ancillary data is needed, and what type, until the result of step 1210 is negative (no).

FIG. 13 is a flowchart of the detailed process that is performed on the indexing master 304 of the main indexer 302, 302a, 302b and 302e in FIGS. 3, 3A, 3B and 3E to refine the coarse metadata received from the highlight marker 206 in FIG. 2. The elaboration (refining) process begins at step 1302 and proceeds to step 1304 to instruct the video encoder 310 in FIGS. 3B and 3E to start the encoding process. The indexing master 304 also instructs the pattern generator 326 in FIGS. 3B and 3E to start the generation of a specific artificial pattern to one or a few frames at step 1306. By this request, the very moment of the time of the request is coded into the pattern as the reference point in system time of the indexing master.

In the case of digital broadcasting illustrated in FIGS. 3 and 3A, the indexing master just starts to records a broadcast stream instead of processing the steps 1304 and 1306. The reference point in system time of the indexing master is acquired from the broadcasting time contained in the broadcast stream.

This reference point in system time of the indexing mater is used to correctly convert or calculate the mark-in point in system time of the received highlight acquired at step 1208 in FIG. 12 into the corresponding mark-in point in media time. (see, e.g., FIG. 3D) Thus any captured highlight having the mark-in point in system time of the highlight marker can be located on the visual timeline (e.g., visual rhythm) that is based on media time of the encoded video.

The real-time highlight marking process of the invention involves the highlight marker 206 in FIG. 2 and the indexing master 304 in FIGS. 3, 3A, 3B and 3E, which communicate with each other via typically TCP/IP-based networks. These two modules (parties) get connected and get ready for real-time indexing operation at step 1308. The indexing master (304) forks a new thread at step 1310. The new thread 1312 is dedicated to generating a visual rhythm and detecting shots in parallel. The detailed process of this thread is described in FIG. 16. The original thread of the process now moves to step 1314, where it fetches a message from a system message queue. The step 1318 decides the type of the message. For "Highlight Metadata" message which is the coarse highlight received from the highlight marker, the process proceeds to step 1316 to carry out the highlight registration process, and subsequently gets back to the step 1314 to handle another (next) message. The highlight registration process is described with respect to FIG. 14. For "Done" or "Quit" message, the control moves to step 1322 to stop the video encoder 310 in FIGS. 3B and 3E, followed by end step 1324. In case of digital broadcasting illustrated in FIGS. 3 and 3A, the step 1322 stops the recording of a digital broadcast stream. Lastly, if the message in step 1318 turns out to be anything but these messages, it will be concerned with other indexing activities, which are handled by the process 1320 (Refer to FIG. 15 for detail). Now control returns to step 1314 for another message.

FIG. 14 is a flowchart showing the highlight registration process that was introduced at step 1316 in FIG. 13. The registration process starts at step 1402 and goes to step 1404, where the computation to find out the correct mark-in point in media time of a new highlight is executed (see FIG. 3D), using the mark-in point in system time of the highlight marker, the reference point in system time of the indexing master and the reference point in media time saved at step 1208 in FIG. 12, step 1306 in FIG. 13 and step 1612 in FIG. 16 respectively. The computation is performed using the equation (1).

A special symbol (or graphical icon) such as the colored bar segment 922 in FIG. 9 to represent the presence of the highlight is inserted upon (adjacent) the visual rhythm at step

1406. Some highlight instance nodes corresponding to the new highlight entry are then added into the existing highlight hierarchy at 1408 as described in FIG. 7. In the step 1410, the GUI objects of the indexing master in FIG. 9 such as visual rhythm and highlight hierarchy are updated (redraw, repaint) with the latest information, as soon as possible, in order that changes in GUI objects may be detected. Finally, the process completes at step 1412.

FIG. 15 is a flowchart of the detailed process for general indexing operations other than "Highlight Metadata" operation, which was presented at step 1320 in FIG. 13. The process starts at step 1502. The input message is inspected at step 1504 to decide (determine) if it belongs to one of six types: "Visual Rhythm", "Shots", "Tree", "Playback", "Output", and "GUI Update".

a) "Visual Rhythm". For this message, the process will execute one of the operations possible on visual rhythm GUI object 902 in FIG. 9 at step 1506, which includes adjusting highlight interval, creating a new highlight, deleting highlight, and annotating highlight.

b) "Shots" type: Execute one of the operations at step 1508 such as: create shot, delete shot, change the boundary (boundaries) of shot, and change the key frame of shot.

c) "Tree type: Execute one of the operations at step 1510 such as: browse the highlight hierarchy, delete highlight entries from the hierarchy, and change annotation.

d) "Playback" type: Execute one of the operations at step 1514 such as: play the specified video segment whether it is highlighted or not, pause the video, and stop the video.

e) "Output" type: Output metadata to the broadcaster 102 or DVR client 122 in FIGS. 1A-1D at step 1516 according to the delivery modes described.

f) "GUI Update" type: Update the GUI objects in FIG. 9 marked "out-of-date" by redrawing them with the latest data at step 1512.

With the operations of the "Shots" type, a user can adjust highlight interval. The time information related with the adjusted interval is described according to media time, that is, mark-in point in media time internally. However, when the metadata including the time information is transferred to the DVRs with the "Output" operation, all the mark-in points in media time related with the adjusted intervals are converted into their corresponding mark-in points in system time of the indexing master that is synchronized with the broadcasting time using the equation (2). After completing the respective operation, the control moves to step 1518, where the control is returned to the caller process 1320 in FIG. 13.

FIG. 16 is a flowchart for the visual rhythm (VR) creation process, as implemented in the present invention. This process was spawned as a thread in FIG. 13. The thread begins at step 1602, followed by a sanity check at step 1604 that decides whether it is able to read the input video file. If the check fails, it loops back to itself. Otherwise, the thread reads one video frame into an internal buffer at step 1606. At step 1608, a check is made to know whether the reference point in media time has already been obtained or not. The reference point in media time is a start time stamp (media time) of the pattern generated by the pattern generator 326 in FIGS. 3B and 3E. If the reference point in media time has been obtained, the thread goes to step 1614. Otherwise, another check is made at step 1610 to decide whether the pattern is detected or not. If the pattern is not detected, the thread also goes to step 1614. Otherwise, the thread reads the start time (media time) of the pattern within the input video file, and then saves the start time into a persistent storage as the reference point in media time at step 1612. At step 1614, the thread generates one vertical line of visual rhythm by extracting the pixels along the predefined path across the video frame and appending the extracted slice of pixels to the existing visual rhythm. At step 1616, a check is made to decide if a shot boundary occurs on the current frame. If so, then the thread proceeds to step 1618 where the detected shot is saved into the global list of shots and a shot mark is inserted on the visual rhythm, followed by the step 1620 where a key frame of the detected shot is chosen (selected), and followed by the step 1622 (compare 1410), where any GUI objects altered by this visual rhythm creation process are invalidated to be redrawn any time soon in the near future. If the check at step 1616 fails, the thread goes to step 1622. At step 1624, another check is made whether to reach the end of the input file. If so, the thread completes at step 1626. Otherwise, the thread loops back to step 1606 to read the next frame.

Download Scenario

The quick metadata service for live broadcasting described hereinabove will be very useful for live contents such as sports games, opening the ballots for election campaigns, and the like. However, it might not be useful for the contents that are not sensitive to prompt viewing. For example, most programs of home shopping channels consist of repetitive semantic units that provide similar information with almost the same or similar scenes such as pre-produced promotional video of a specific shopping item, home shopping models wearing dresses for sale, or shopping host running on a treadmill for sale. In order to provide metadata services for broadcast channel such as home shopping categories, another technique called "download scenario" is preferred.

In the download scenario, a home shopping channel reserves a time slot for broadcasting a specially edited program that consists of core segments of all broadcast programs of a day as a summary of shopping items of the day. The edited summary program will be broadcast along with its metadata when a viewer rating is lowest such as a slot from 4 to 5 A.M. For each broadcast program, the metadata describes start time and duration of a segment of the broadcast program in the edited summary program, a title and shopping items of the broadcast program. The metadata is either broadcast together with video streams within broadcast stream through the broadcasting network, or in a separate stream through the back channel as in the case of the quick metadata service scenario described in FIGS. 1A, 1B, 1C and 1D. Users with DVR can record the summary program along with its descriptive metadata using EPG (Electronic Program Guide). When they have time to view the recorded summary program, they can choose some specific segments of the broadcast programs that contain shopping items of their interest. That is, with the summary program with its metadata, users can selectively view essences of all broadcast programs of a day. This could, for example, be beneficial in increasing revenues of shopping channels.

Metadata Delivery Using EPG Scheme

The metadata described in proprietary formats or in international open standard specifications such as MPEG-7 or TV-Anytime can aid the DVR users to browse predefined video segments corresponding to highlights of the video. Therefore when such segmentation metadata are available to the DVR users, they can select a video segment of interest and play directly from the beginning of the selected segment.

Most of the DVRs are capable of handling the EPG data multiplexed within a digital broadcast stream, or delivered via the back channel data network 116. The current EPG data scheme focuses on providing information related to a single program as a whole, such as of announcing future programs and providing critical information about the current and future programs through Event Information Table (EIT) defined in Program and System Information Protocol (PSIP) for ATSC or SI (System Information) for DVB.

A scheme is disclosed to represent the segmentation metadata for browsing based on the current EPG data scheme. Thus, the EPG can be utilized to provide extra functionalities such as video browsing for exiting DVRs with minor modification of existing EPG software.

In Table I, viewers can know that Movie 4 starts in 6:30 pm lasting up to 8:00 pm and users can select Movie 4 through any input device such as a remote control to record it in the DVR. The (C) is an additional marker (or icon) which can be added in order to indicate that the segmentation metadata for the program will be delivered through the updated EPG in the near future. Therefore, through Table I and Table II, the user can know that the segmentation metadata for Movie 4 will be available in the near future. Table II shows the recorded list after Movie 4 has been successfully recorded in the DVR. Thus, after broadcasting a program whose metadata is available, the updated EPG data related to the program can be delivered to the users of the DVR to allow them to easily reach the segment of interest from the recorded programs. The EPG information related to the program described by the EIT in ATSC PSIP or DVB SI is allowed to be updated at anytime for correction. Therefore, the EIT related to Movie 4 is updated such that the updated EIT contains information of the three segments comprising Movie 4. Therefore, it can be thought of as though the updated EIT contains information related to each of the segments. In this way, the EPG scheme can be utilized to deliver the segmentation metadata for a program.

In the case of TABLE III, "Movie 4" is divided into 3 segments and the updated EIT information is used such that Movie 4 now comprises 3 independent movies named "Movie 4—Chapter 1", "Movie 4—Chapter 2", and "Movie 4—Chapter 3". Therefore if the DVR keeps track of the update of the EIT related to the recorded program and update the recorded list according to the updated EIT as shown in TABLE III once the updated EIT is signaled, DVR users can easily browse the program by selecting the segments of interest for playback from the updated recorded list showing Chapter 1 or Chapter 2 or Chapter 3 for Movie 4 in this example.

Table IV illustrates another method of combining the EPG to build a recorded list through the updated EPG. Since Table III can take up much space in case a movie is segmented into several segments, the segments can be grouped into the main program as in Table IV. In case the segments are grouped into a main program, a marker (or icon) is displayed to indicate that such a program is composed of several segments and once clicked it is expanded to show the EPG data related to each segment. For example, Table IV shows a marker (E) next to Movie 4 to indicate that Movie 4 is composed of several segments described by the EPG. When the Movie 4 is selected through input device such as a remote control, it is then expanded to show the EPG information of each segment as shown in Table III. In this way, a metadata for hierarchical browsing can be delivered by using the EPG scheme.

TABLE I

| Channel 2 Sep. 5, 2002, Thursday | | | |
|---|---|---|---|
| Sep. 5 | 6:00 pm | 7:00 pm | 8:00 pm |
| Channel 1 | Movie 1 | | Movie 2 |
| Channel 2 | Movie 3 | Movie 4 (C) | Movie 5 |
| Channel 3 | Movie 6 | Movie 7 | Movie 8 |

TABLE II

| RECORDED LIST | | |
|---|---|---|
| CHANNEL | TIME & DATE | TITLE |
| Channel 1 | Sep. 3, 2002 5:30 pm-6:00 pm | Football |
| Channel 2 | Sep. 5, 2002 6:30 pm-8:00 pm | Movie 4 (C) |
| Channel 1 | Sep. 3, 2002 5:30 pm-6:00 pm | Football |
| Channel 2 | Sep. 5, 2002 6:30 pm-7:10 pm | Movie 4 - Chapter 1 |
| | Sep. 5, 2002 7:10 pm-7:40 pm | Movie 4 - Chapter 2 |
| | Sep. 5, 2002 7:40 pm-8:00 pm | Movie 4 - Chapter 3 |

TABLE IV

| RECORDED LIST | | |
|---|---|---|
| CHANNEL | TIME & DATE | TITLE |
| Channel 1 | Sep. 3, 2002 5:30 pm-6:00 pm | football |
| Channel 2 | Sep. 5, 2002 6:30 pm-8:00 pm | Movie 4 (E) |

Fast Access in DVR

FIG. 17 is a block diagram illustrating a DVR. The DVR comprises a CPU 1714 and a dual-port memory RAM 1712, and also includes a HDD 1710 and a user controller 1716. The dual-port RAM 1712 is supplied with compressed digital audio/video stream for storage by either of two pathways selected and routed by a switcher 1708. The first pathway comprises the tuner 1704 and the compressor 1706 and is selected by 1708 when an analog broadcast stream is received. The analog broadcast signal is received from the tuner 1704 and the compressor 1706 converts the signal from analog to digital form. The second path way comprises the tuner 1702 (and DEMUX 1716) and is selected in case the received signal is digital broadcast stream. The tuner 1702 receives the digital broadcast stream which is sent directly to RAM 1712 since the received broadcast stream is already in digital compressed form (no compressor is needed). The decoder 1730 such as commercially available MPEG-2 decoder is responsible for decoding a broadcast live video stream. The decoded frames are stored in display buffer 1742 which are displayed on the display device 1720.

As described above, a DVR can play the stored media digitally recorded in HDD 1710. And in case of digital broadcast, the broadcast stream is broadcast in MPEG-2 transport stream and then the transport stream itself is usually stored in HDD 1710 of DVR. Alternatively for some DVRs, only the payloads of transport packets are stored. In case of analog broadcasting, the analog video is usually encoded into MPEG-2 program stream. At the DVR client, a user can play a video segment of interest of the recorded program by using the delivered metadata that was generated by the indexing system. The issue at the client side is the efficient random access to the media positions described by the metadata in order to provide quick start of playing from the given media positions.

The fast access to a given media position requires the knowledge on the byte position of the recorded media corresponding to the broadcasting time or its equivalent representation, or NPT values if present. As described earlier, the use of PTS values for random access is not appropriate since it requires more computation for parsing into PES layers as well as descrambling. Further, broadcast time is more appropriate for the media localization since PTS can be varied when the same media is rebroadcast later. For media localization, the present invention uses either broadcasting time itself or alternatively the representation of the broadcasting time by using EPG start time and media time. For digital broadcasting, the broadcasting time can be obtained from the transport packet containing STT defined in ATSC, or from the TDT defined in DVB. In other words, the use of broadcasting time such as STT/TDT for media localization provides two advantages: i) The TS packet for STT/TDT shall not be scrambled as defined in ATSC or DVB standards. ii) Parsing TS packets for STT/TDT is computationally efficient than parsing the PES packets for PTS since a PES packet consists of multiple TS packets, thus requiring deeper level of the parsing process. Also, NPT values can be used for media localization if they are broadcast since they are usually present in private section of MPEG-2 transport streams that is not scrambled.

Furthermore, if the bit rate of broadcast is a constant bit rate (CBR) such as 19.4 Mbps (as defined in ATSC), the CBR can be used to fast access the position of media that indicated by the time in metadata by using skipping a bulk of bytes of which length is estimated by using the values of PCR, or alternatively by assuming CBR.

The fast random access in client side is a very important aspect, because a client device usually uses a low speed CPU 1714 (Central Processing Unit) to reduce a cost. Furthermore, fast random access is also important to provide trick mode such as fast forward/fast backward. Thus the method of random access should be efficient. The present invention discloses a method of fast access to a particular position within a media stream by using broadcasting times in STT or TDT, or NPT values both of which are carried in the unscrambled parts of the TS packets. Thus, when a digitally broadcast stream is recorded in DVR, it is advantageous to record the transport stream itself including broadcasting times.

One of methods disclosed in the present invention allowing a fast random access to the recorded stream is to use a byte-offset table that contains a set of temporally-sampled reference times such as broadcasting times or media times and its corresponding byte positions of the file for the recorded stream as shown FIG. 18. The client DVR generates and stores a list of the bytes (Byte Position$_n$ 1810) and the corresponding reference times such as broadcasting times or media times (TIME$_n$ 1820). The byte-offset table may be generated while the video stream is being recorded, or after the video stream is recorded.

In case of analog broadcast signal shown in FIG. 3E, the system time of an analog DVR should be synchronized with the system clock in the indexing master 304 via a remote time-server in order to access the position of the encoded and recorded stream that is pointed by the time-indices contained in the metadata generated from the main indexer. Further, when an analog broadcast signal is encoded and then recorded in the analog DVR, it is advantageous to record the stream as well as the temporally-sampled system times of an analog DVR in the form of the offset table in FIG. 18 since no time information is usually delivered with the analog broadcast signal. Alternatively, the encoded stream multiplexed with the temporally-sampled system times can be stored.

Frame-Accurate Access to a Recorded Stream Pointed by Metadata

FIG. 19 illustrates one possible approach for frame-accurately accessing a temporal position or frame of a recorded video, pointed by a time-index contained in the metadata generated by the real-time indexer 202 in FIG. 2. The video stream 1920 is a stored broadcast stream that is indexed by the real-time indexer 202 and the video stream 1930 is a recorded stream of the same broadcast program in the client DVR. The duration of the video stream 1920 is usually not exactly equal to that of the video stream 1930 because it is difficult to record the videos at the exactly same time in the real-time indexer and DVRs.

After the DVR receives the metadata associated with the recorded program from the real-time indexer, the DVR should locate the position of recorded video stream corresponding to the time described in the received metadata. In order to locate the position, DVR system time should be synchronized with the system time of real-time indexer. However, even though the DVR system time is synchronized with the system time of real-time indexer using remote time server or the broadcasting time carried in the broadcast stream, the DVR usually cannot frame-accurately access to a recorded stream pointed by metadata due to the various reasons: In case of analog broadcasting, the encoding delay in DVR usually takes more than several seconds. In the case of digital broadcasting, the accuracy of the broadcasting time delivered within the broadcast stream is within a second due to the rounding effect according to the time representation format, (the system time of STT or TDT shall be represented by using a second unit), specified in ATSC and DVB. Thus, in order to provide a frame-accurate access to a recorded stream pointed by metadata, a new method is needed.

The present invention is based on a video analysis technique. Although there could be a variety of visual patterns characterizing the specific frames of a video, a set of time durations of the consecutive shots of a video segment stored in the DVR could be utilized to match with the corresponding video segment used for indexing. Therefore, if the start time of the video segment in the DVR and the start time of the corresponding video segment in the real-time indexer can be estimated, the position of the recorded stream in DVR pointed by the time-index contained in the metadata can frame-accurately be accessed.

As shown in FIG. 19, the real-time indexer generates a list consisting of the start time TIME$_i$ and duration D$_i$ of each detected shot (i=1, . . . ,n). Each shot is conservatively detected to reduce the false alarm. The real-time indexer performs any suitable automatic shot boundary detection method on the video stream and stores the list. It should be noted that the shot boundary detection is applied to the whole video stream in the real-time indexer. Then, the metadata including a start time of the first shot and a set of shot durations for a short portion (for example, 2 minutes) of the stored video stream 1920 is delivered to the DVR. For example, TIME$_2$ and (D$_2$, D$_3$, D$_4$), is sent to the DVR. The metadata is delivered through a variety of pathways. In case of analog broadcast, the vertical blank interval (VBI) can be also used for delivery. Once the DVR receives the metadata of a stored program, the DVR performs a shot boundary detection algorithm, preferably the same method as that used in the real-time indexer, starting from the predetermined time before the position of the recorded stream 1930 corresponding to TIME$_2$. Thus, a list of time durations of the consecutive shots of the stored program, for example, (D$_{R1}$, D$_{R2}$, and D$_{R3}$) is obtained along with TIME$_{R1}$ representing the start time of the first shot boundary. Since the CPU speed is usually low in most of commercially available DVR, the hot boundary detection is only performed for a short portion (for example, 2 minutes) of the stored video stream 1930.

When the set of values (D$_2$, D$_3$, D$_4$) matches the set (D$_{R1}$, D$_{R2}$, and D$_{R3}$), the exact system time offset between the real-time indexer and the DVR can be obtained through calculating the difference between TIME$_2$ and TIME$_{R1}$. For frame accurate access, the values of TIME$_2$, (D$_2$, D$_3$, D$_4$), TIME$_{R1}$, (D$_{R1}$, D$_{R2}$, and D$_{R3}$) should be accurate to the extent of 1/30 seconds. Such accuracy can be obtained by using PTS or PCR values of the recorded streams, for example. If two sets do not match, the real-time indexer sends another set of values to the DVR and the same process is performed. In this way, it is possible to frame-accurately access to the position of the recorded stream in DVR pointed by the time-index contained in the metadata. Alternatively, the DVR can send ($D_{R1}$, $D_{R2}$, and $D_{R3}$) and $TIME_{R1}$ to the real-time indexer for synchronization.

Thumbnails and Visual Rhythm Images

In various figures of this patent application, small pictures may be used to represent thumbnails, key frame images, live broadcasts, and the like. FIG. 20 is a collection of line drawing images 2001, 2002, 2003, 2004, 2005, 2006, 2007, 2008, 2009, 2010, 2011, 2012 which may be substituted for the small pictures used in any of the preceding figures. Generally, any one of the line drawings may be substituted for any one of the small pictures. Of course, if two adjacent images are supposed to be different than one another, to illustrate a point (such as key frames for two different scenes), then two different line drawings should be substituted for the two small pictures.

FIG. 21 is a diagram showing a portion 2100 of a visual rhythm image. Each vertical line (slice) in the visual rhythm image is generated from a frame of the video, as described above. As the video is sampled, the image is constructed, line-by-line, from left to right. Distinctive patterns in the visual rhythm image indicate certain specific types of video effects. In FIG. 21, straight vertical line discontinuities 2110A, 2110B, 2110C, 2110D, 2110E, 2110F, indicate "cuts" where a sudden change occurs between two scenes (e.g., a change of camera perspective). Wedge-shaped discontinuities 2120A and diagonal line discontinuities (not shown) indicate various types of "wipes" (e.g., a change of scene where the change is swept across the screen in any of a variety of directions). Other types of effects that are readily detected from a visual rhythm image are "fades" which are discernable as gradual transitions to and from a solid color, "dissolves" which are discernable as gradual transitions from one vertical pattern to another, "zoom in" which manifests itself as an outward sweeping pattern (two given image points in a vertical slice becoming farther apart) 2150A and 2150C, and "zoom out" which manifests itself as an inward sweeping pattern (two given image points in a vertical slice becoming closer together) 2150B and 2150D.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the invention most nearly pertains, and such variations are intended to be within the scope of the invention, as disclosed herein. A number of examples of such "variations" have been set forth hereinabove.

What is claimed is:

1. A method of providing metadata service, comprising:
supplying a broadcast stream from a broadcaster to a metadata service provider and a user's receiving device, said broadcast stream comprising TV and audio programs and system times in a System Time Table (STT) for Advanced Television System Committee broadcasts or a Time Data Table (TDT) for Digital Video Broadcasting broadcasts;
at the metadata service provider, extracting said system time from either said STT or said TDT; transcoding said broadcast stream while associating each frame of said transcoded stream with said system times; and analyzing said transcoded stream to generate metadata associated with said stream, said metadata having one or more timestamps; and
delivering said metadata having said timestamps to the user's receiving device, whereby said timestamps are represented in said system times in STT or TDT to identify one or more particular locations corresponding to said timestamps in said received broadcast stream to which said metadata is applicable.

2. Method, according to claim 1, wherein:
the step of analyzing the broadcast stream and generating associated metadata is performed at a metadata service provider location that receives the broadcast stream from the broadcaster positioned at another location.

3. Method, according to claim 1, wherein: the step of delivering the metadata to the user's receiving device is performed through a back channel comprising at least one of Internet, Intranet, PSTN, cable modem, and satellite.

4. Method, according to claim 1, wherein: the step of delivering the metadata to the user's receiving device is performed by delivering the metadata to a multiplexer of the broadcaster through a feedback channel; and broadcasting the metadata together with the broadcast stream.

5. Method, according to claim 1, wherein: the step of analyzing the broadcast stream and generating associated metadata is performed before broadcasting.

6. Method according to claim 1, wherein: the step of delivering the metadata to the user's receiving device is performed by multiplexing the metadata with the broadcast stream.

7. Method, according to claim 1, wherein: the metadata of a broadcast program is inserted into an electronic programming guide (EPG) data field and sent to a user.

8. Method, according to claim 1, wherein: said timestamps are represented in media time defined by subtracting the start time that is described in an EPG for the broadcast program from said timestamps.

9. Method, according to claim 1, wherein the user's receiving device comprises a digital set-top box (STB) with digital video recorder (DVR) capability.

10. Method, according to claim 1, wherein said associating each frame of said transcoded stream with said system times comprises stamping artificial visual patterns corresponding to system times onto a buffered version of said broadcast stream.

11. Method, according to claim 1, additionally comprising storing the broadcast stream in the user's receiving device.

12. Method, according to claim 1, wherein said analyzing comprises a coarse indexing step and a fine indexing step.

13. Method, according to claim 1, wherein said analyzing is performed according to a template.

14. Method, according to claim 13, wherein said template includes a highlight template having a list of highlight categories.

15. Method of indexing an audio/video program, in real time, comprising:
coarse indexing by a processor-implemented highlight marker according to a plurality of highlight templates providing lists of categorized highlight themes, said coarse indexing comprising capturing desirable highlights by marking a moment of said highlights, and attaching relevant highlight themes selected from said highlight templates to said captured highlight in real time while viewing the video program, said highlight templates being stored in a computer-readable memory;

associating each frame of the audio/video program with system times extracted from a System Time Table (STT) or Time Data Table (TDT);

delivering said captured highlights with said attached themes to a processor-implemented main indexer; and fine indexing by said main indexer comprising refining said coarse indexing by obtaining an exact start timestamp from the system times and duration for said captured highlight and associating the exact start timestamp and duration with the captured highlight.

16. Method, according to claim 15, wherein said plurality of highlight templates are provided before the start of said coarse indexing process.

17. Method of random accessing to one or more frames of a broadcast program, comprising: receiving, at a receiving unit, an MPEG transport stream from a broadcasting network;

recording the MPEG transport stream;

reading information required for randomly accessing locations by analyzing the MPEG transport stream; and randomly accessing locations in one of said recorded or received MPEG transport stream according to system times extracted from either a System Time Table (STT) for Advanced Television System Committee broadcasts or a Time Data Table (TDT) for Digital Video Broadcasts that are associated with each frame of the recorded or received transport streams.

18. Method, according to claim 17, wherein said reading information comprises: extracting a system time and its byte position from one of said recorded or received transport streams;

generating a byte-offset table that contains system times and corresponding byte positions; and storing the byte-offset table.

19. Method, according to claim 18, wherein said randomly accessing further comprises:

reading the stored byte-offset table; and seeking the position of the recorded MPEG transport stream using the byte-offset table that contains the byte position and its corresponding system time.

20. Method, according to claim 17, wherein said randomly accessing further comprises:

extracting a system time and its byte position from one of said recorded or received transport streams; and seeking a byte position according to a system time from the MPEG transport stream.

21. Method, according to claim 20, wherein seeking a byte position according to a system time further comprises:

predicting the required position by multiplying a relative time by a constant bit rate and adding the result to the start position of the recorded MPEG transport stream, if a broadcast signal is broadcast with a constant bit rate; and refining said byte position by adding or subtracting according to a difference in time between the required system time and the system time contained in a transport packet located at that position.

* * * * *